(12) United States Patent
Eisenberger

(10) Patent No.: US 10,239,017 B2
(45) Date of Patent: *Mar. 26, 2019

(54) SYSTEM AND METHOD FOR CARBON DIOXIDE CAPTURE AND SEQUESTRATION

(71) Applicant: Peter Eisenberger, Princeton, NJ (US)

(72) Inventor: Peter Eisenberger, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,143

(22) Filed: Jan. 26, 2018

(65) Prior Publication Data

US 2018/0214822 A1   Aug. 2, 2018

Related U.S. Application Data

(60) Continuation of application No. 15/227,425, filed on Aug. 3, 2016, now Pat. No. 9,878,286, which is a
(Continued)

(51) Int. Cl.
*B01D 53/02* (2006.01)
*B01D 53/62* (2006.01)
(Continued)

(52) U.S. Cl.
CPC ............ *B01D 53/62* (2013.01); *B01D 53/04* (2013.01); *B01D 53/08* (2013.01); *B01D 53/81* (2013.01); *B01D 53/82* (2013.01); *B01D 53/83* (2013.01); *B01D 53/96* (2013.01); *B01J 20/08* (2013.01); *B01J 20/103* (2013.01); *B01J 20/22* (2013.01); *B01J 20/262* (2013.01);
(Continued)

(58) Field of Classification Search
CPC ........ B01D 2251/304; B01D 2251/604; B01D 2253/106; B01D 2253/20; B01D 2253/25; B01D 2257/504; B01D 2258/06; B01D 53/62; B01D 53/82; B01D 53/83; B01D 53/96; B01J 20/22; B01J 20/28042; B01J 20/3425; B01J 20/3466; F01N 3/0857
See application file for complete search history.

(56) References Cited

U.S. PATENT DOCUMENTS 3,466,138 A * 9/1969 Routsis ............... H01M 8/0662
423/230
6,387,337 B1 * 5/2002 Pennline ................ B01D 53/08
422/216
(Continued)

*Primary Examiner* — Christopher P Jones
(74) *Attorney, Agent, or Firm* — Paul Sutton; Barry Magidoff

(57) ABSTRACT

A method for removing carbon dioxide directly from ambient air, using a sorbent under ambient conditions, to obtain relatively pure $CO_2$. The $CO_2$ is removed from the sorbent using process heat, preferably in the form of steam, at a temperature in the range of not greater than about 130° C., to capture the relatively pure $CO_2$ and to regenerate the sorbent for repeated use. Increased efficiency can be achieved by admixing with the ambient air, prior to contacting the sorbent, a minor amount of a preferably pretreated effluent gas containing a higher concentration of carbon dioxide. The captured carbon dioxide can be stored for further use, or sequestered permanently. The above method provides purified carbon dioxide for further use in agriculture and chemical processes, or for permanent sequestration.

7 Claims, 35 Drawing Sheets

Related U.S. Application Data division of application No. 14/643,429, filed on Mar. 10, 2015, now Pat. No. 9,433,896, and a division of application No. 13/098,370, filed on Apr. 29, 2011, now Pat. No. 8,500,855.

(60) Provisional application No. 61/443,061, filed on Feb. 15, 2011, provisional application No. 61/351,216, filed on Jun. 3, 2010, provisional application No. 61/330,108, filed on Apr. 30, 2010.

(51) Int. Cl.

| | | |
|---|---|---|
| *B01D 53/04* | (2006.01) | |
| *F01N 3/08* | (2006.01) | |
| *B01J 20/28* | (2006.01) | |
| *B01D 53/08* | (2006.01) | |
| *B01J 20/08* | (2006.01) | |
| *B01J 20/10* | (2006.01) | |
| *B01J 20/22* | (2006.01) | |
| *B01D 53/81* | (2006.01) | |
| *B01D 53/82* | (2006.01) | |
| *B01D 53/83* | (2006.01) | |
| *B01D 53/96* | (2006.01) | |
| *B01J 20/34* | (2006.01) | |
| *B01J 20/26* | (2006.01) | |

(52) U.S. Cl.
CPC ... *B01J 20/28016* (2013.01); *B01J 20/28042* (2013.01); *B01J 20/28097* (2013.01); *B01J 20/3425* (2013.01); *B01J 20/3466* (2013.01); *F01N 3/0857* (2013.01); *B01D 2251/304* (2013.01); *B01D 2251/604* (2013.01); *B01D 2252/204* (2013.01); *B01D 2253/104* (2013.01); *B01D 2253/106* (2013.01); *B01D 2253/20* (2013.01); *B01D 2253/25* (2013.01); *B01D 2257/504* (2013.01); *B01D 2258/06* (2013.01); *B01D 2259/4009* (2013.01); *Y02A 50/2342* (2018.01); *Y02C 10/04* (2013.01); *Y02C 10/08* (2013.01); *Y02P 20/152* (2015.11)

(56) References Cited

U.S. PATENT DOCUMENTS

| | | | | |
|---|---|---|---|---|
| 8,163,066 | B2 * | 4/2012 | Eisenberger | B01D 53/1475 95/107 |
| 8,500,855 | B2 * | 8/2013 | Eisenberger | B01D 53/04 95/107 |
| 8,500,857 | B2 * | 8/2013 | Eisenberger | B01D 53/0407 95/107 |
| 8,500,858 | B2 * | 8/2013 | Eisenberger | B01D 53/1475 95/139 |
| 8,500,859 | B2 * | 8/2013 | Eisenberger | B01D 53/1475 95/139 |
| 8,500,860 | B2 * | 8/2013 | Eisenberger | B01D 53/0407 95/107 |
| 8,500,861 | B2 * | 8/2013 | Eisenberger | B01D 53/0407 95/107 |
| 9,028,592 | B2 * | 5/2015 | Eisenberger | B01D 53/047 95/107 |
| 9,061,237 | B2 * | 6/2015 | Eisenberger | B01D 53/1475 |
| 9,227,153 | B2 * | 1/2016 | Eisenberger | B01D 53/0407 |
| 9,555,365 | B2 * | 1/2017 | Eisenberger | B01D 53/1475 |
| 9,878,286 | B2 * | 1/2018 | Eisenberger | B01D 53/62 |
| 2002/0083833 | A1 * | 7/2002 | Nalette | A62B 11/00 95/139 |
| 2006/0051274 | A1 * | 3/2006 | Wright | B01D 53/1475 423/220 |
| 2008/0031801 | A1 * | 2/2008 | Lackner | B01D 53/62 423/438 |
| 2008/0138265 | A1 * | 6/2008 | Lackner | B01D 53/62 423/224 |
| 2008/0289495 | A1 * | 11/2008 | Eisenberger | B01D 53/1475 95/107 |
| 2008/0289500 | A1 * | 11/2008 | Eisenberger | B01D 53/1475 95/139 |
| 2008/0314246 | A1 * | 12/2008 | Deckman | B01D 53/02 95/130 |
| 2009/0134008 | A1 * | 5/2009 | White | B01D 15/00 204/157.42 |
| 2009/0232861 | A1 * | 9/2009 | Wright | A01N 59/04 424/405 |
| 2010/0242728 | A1 * | 9/2010 | Radosz | B01D 53/04 95/106 |

\* cited by examiner

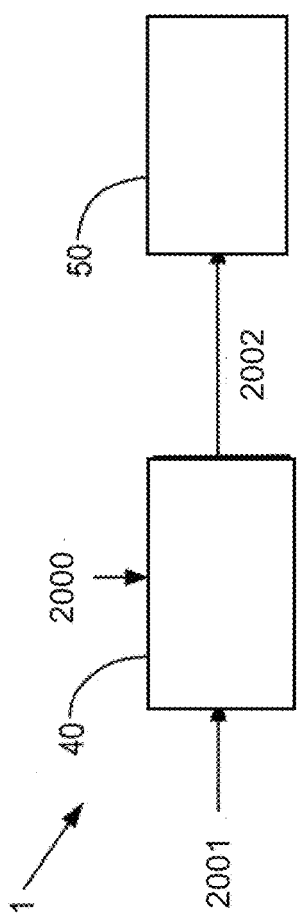
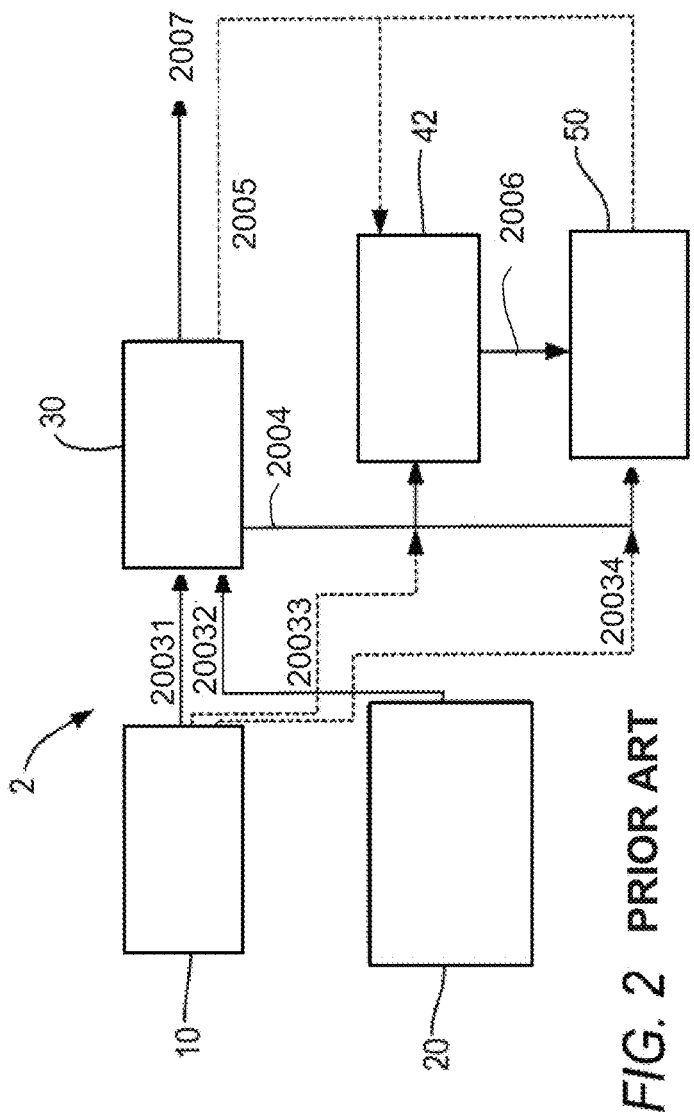

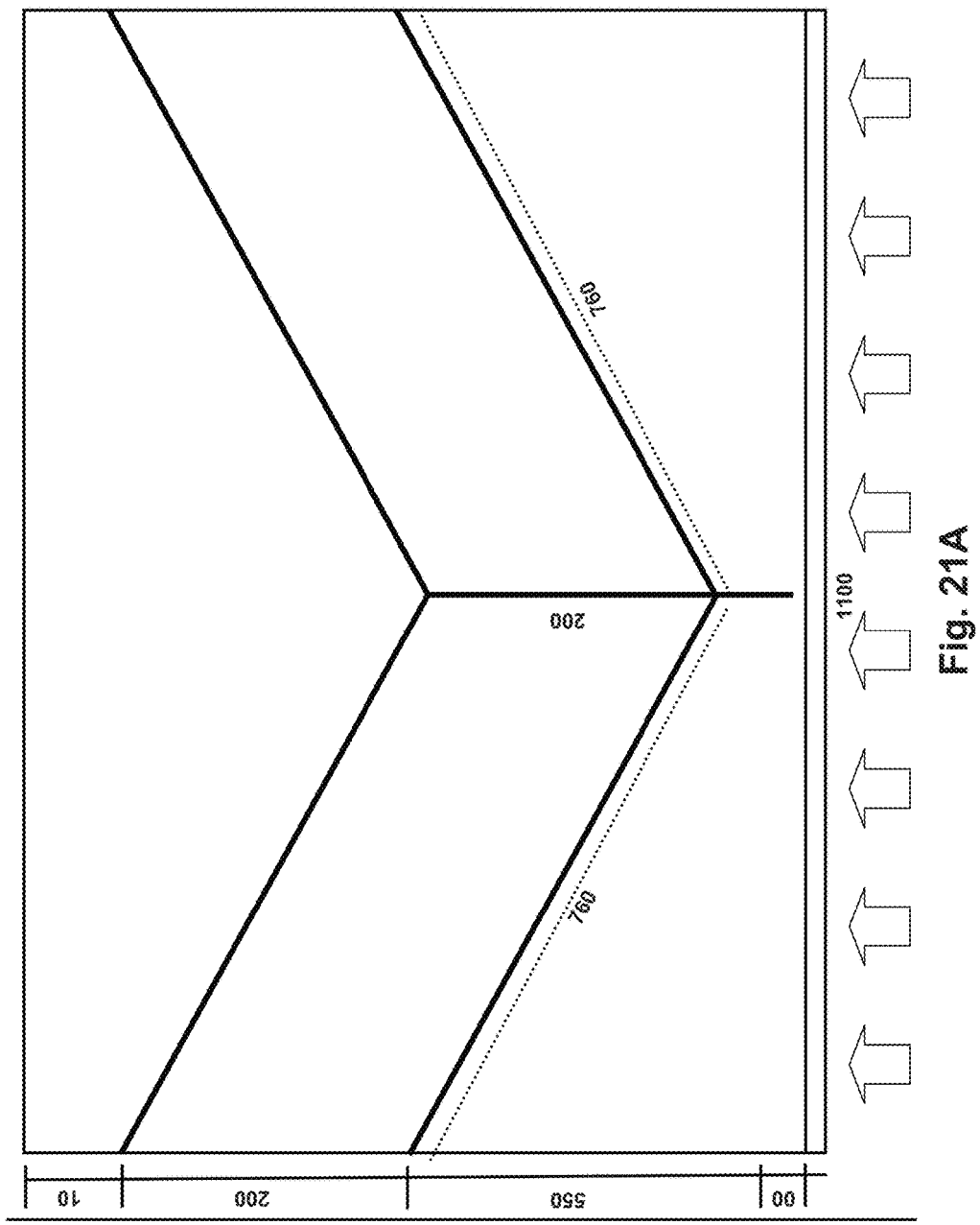

SYSTEM AND METHOD FOR CARBON DIOXIDE CAPTURE AND SEQUESTRATION

This application is a continuation of U.S. patent application Ser. No. 15/227,425 filed on Aug. 3, 2016, which is a divisional of U.S. patent application Ser. No. 13/098,370 filed on Apr. 29, 2011, now U.S. Pat. No. 8,500,855, and a divisional of U.S. patent application Ser. No. 14/643,429 filed on Mar. 10, 2015, now U.S. Pat. No. 9,433,896; and claims the benefit or priority pursuant to 35 U.S.C. 119(e) from a U.S. Provisional Patent Application having Application No. 61/330,108 filed Apr. 30, 2010; from a U.S. Provisional Patent Application having Application No. 61/351,216 filed Jun. 3, 2010 and from a U.S. Provisional Patent Application having Application No. 61/443,061 filed Feb. 15, 2011.

BACKGROUND OF THE INVENTION

The present invention relates to systems and methods for removing greenhouse gases from an atmosphere, and in particular to systems and methods for removing carbon dioxide from an atmosphere.

U.S. application Ser. No. 12/124,864
  As explained in U.S. application Ser. No. 12/124,864,
    a. there is much attention currently focused on trying to achieve three energy related and somewhat conflicting energy related objectives: 1) provide affordable energy for economic development; 2) achieve energy security; and 3) avoid the destructive climate change caused by global warming. However, there is no feasible way to avoid using fossil fuels during the rest of this century if we are to have the energy needed for economic prosperity and avoid energy shortfalls that could lead to conflict.
    b. It is mostly undisputed that an increase in the amount of so-called greenhouse gases like carbon dioxide (methane and water vapor are the other major greenhouse gases) will increase the temperature of the planet.
    c. It is clear that there is no solution that only reduces human contributions to carbon dioxide emissions that can remove the risk of climate change. With air extraction and the capability to increase or decrease the amount of carbon dioxide in the atmosphere one can in principle compensate for other greenhouse gases like methane that can change their concentrations and cause climate change.

SUMMARY OF THE INVENTION

The present invention provides further new and useful system and method concepts for removing carbon dioxide from a mass of carbon dioxide laden air by directing the $CO_2$ laden air through a sorbent structure that binds (captures) $CO_2$, and removing $CO_2$ from the sorbent structure (and thereby effectively regenerating the sorbent structure) by using process heat, preferably in the form of steam, to heat the sorbent structure. In this application, the sorbent structure preferably comprises an amine that binds to $CO_2$, and which is carried by a substrate, which can be in the form of solid particles or be a monolithic sorbent structure. Regardless of whether the substrate is a bed of particulate material or a monolithic form, the sorbent will be preferably adsorbed on the surfaces of the substrate. In addition, in this application, reference to a "mass" (or "flow" or "stream") of "$CO_2$ laden air (or carbon dioxide laden air)" means air at a particular location with a concentration of $CO_2$ that is similar to the concentration of $CO_2$ in the atmosphere at that particular location, and at the temperature at that location.

It was previously thought that when carbon dioxide laden air is directed through a substrate that is coated with (or has embedded in it) a sorbent that absorbs or binds carbon dioxide, to remove the carbon dioxide from the air. Process heat converted into the form of steam or other medium (e.g. gas) is directed at the sorbent, to separate the carbon dioxide from the sorbent (so the carbon dioxide can be drawn off and sequestered), and to regenerate the sorbent (so that the sorbent can continue to be used to remove carbon dioxide from the air).

In one of its basic aspects, this application provides additional structures and techniques for separating carbon dioxide from carbon dioxide laden air, and using process heat to separate carbon dioxide from a sorbent and regenerate the sorbent.

Moreover, in another of its aspects, this application provides some additional structures and techniques that can be used to capture carbon dioxide from carbon dioxide laden air, and using process heat to separate carbon dioxide from a sorbent and regenerate the sorbent, and which further enables the carbon dioxide separation and regeneration to be practiced directly in line with a source of flue gases that would otherwise emanate directly from that source and direct carbon dioxide laden air into the atmosphere.

In addition, this invention provides a relatively low cost and relatively pure $CO_2$ source for such beneficial uses as feeding algae farms for biofuel production, where the capture costs represent the entire cost of the $CO_2$ supply.

These and other features of this invention are described in, or are apparent from, the following detailed description, and the accompanying drawings and exhibits.

BRIEF DESCRIPTION OF THE FIGURES AND EXHIBITS

FIGS. 1-9 illustrate the system and method concepts described in an earlier US application by this same inventor, U.S. Ser. No. 12/124,864; Specifically,
  a. FIG. 1 is a generalized block diagram of a system for removing carbon dioxide from an atmosphere according to an exemplary embodiment of the invention of U.S. Ser. No. 12/124,864;
  b. FIG. 2 is a block diagram of a system for removing carbon dioxide from an atmosphere according to an exemplary embodiment of the invention of Ser. No. 12/124,864;
  c. FIG. 3 is a block diagram of an air extraction system according to an exemplary embodiment of the invention of Ser. No. 12/124,864;
  d. FIG. 4 is a map illustrating a global thermostat according to an exemplary embodiment of the invention of Ser. No. 12/124,864;
  e. FIG. 5 is a block diagram of a system for removing carbon dioxide from an atmosphere according to an exemplary embodiment of the invention of Ser. No. 12/124,864;
  f. FIG. 6 is a schematic illustration of one version of a medium for removing carbon dioxide from an atmosphere and for removing carbon dioxide from the medium, according to the invention of Ser. No. 12/124,864;
  g. FIG. 7 is a schematic illustration of another version of a medium for removing carbon dioxide from an atmosphere and for removing carbon dioxide from the medium, according to the invention of Ser. No. 12/124, 864;

h. FIG. 8 is a schematic illustration of still another version of a medium for removing carbon dioxide from an atmosphere and for removing carbon dioxide from the medium, according to the invention of Ser. No. 12/124, 864; and i. FIG. 9 is a schematic illustration of yet another version of a medium for removing carbon dioxide from an atmosphere and for removing carbon dioxide from the medium, according to the invention of Ser. No. 12/124, 864.

FIGS. 10a and 10b-1, 2 schematically illustrate two versions of a structure and technique for removing carbon dioxide from carbon dioxide laden air, and regenerating the sorbent that absorbs or binds the carbon dioxide, according to the principles of the present invention; FIG. 10a, where Absorption Time is significantly greater than Regeneration Time; and FIG. 10b-1, 2, where Absorption Time is approximately equal to Regeneration Time;

Figure 10A:
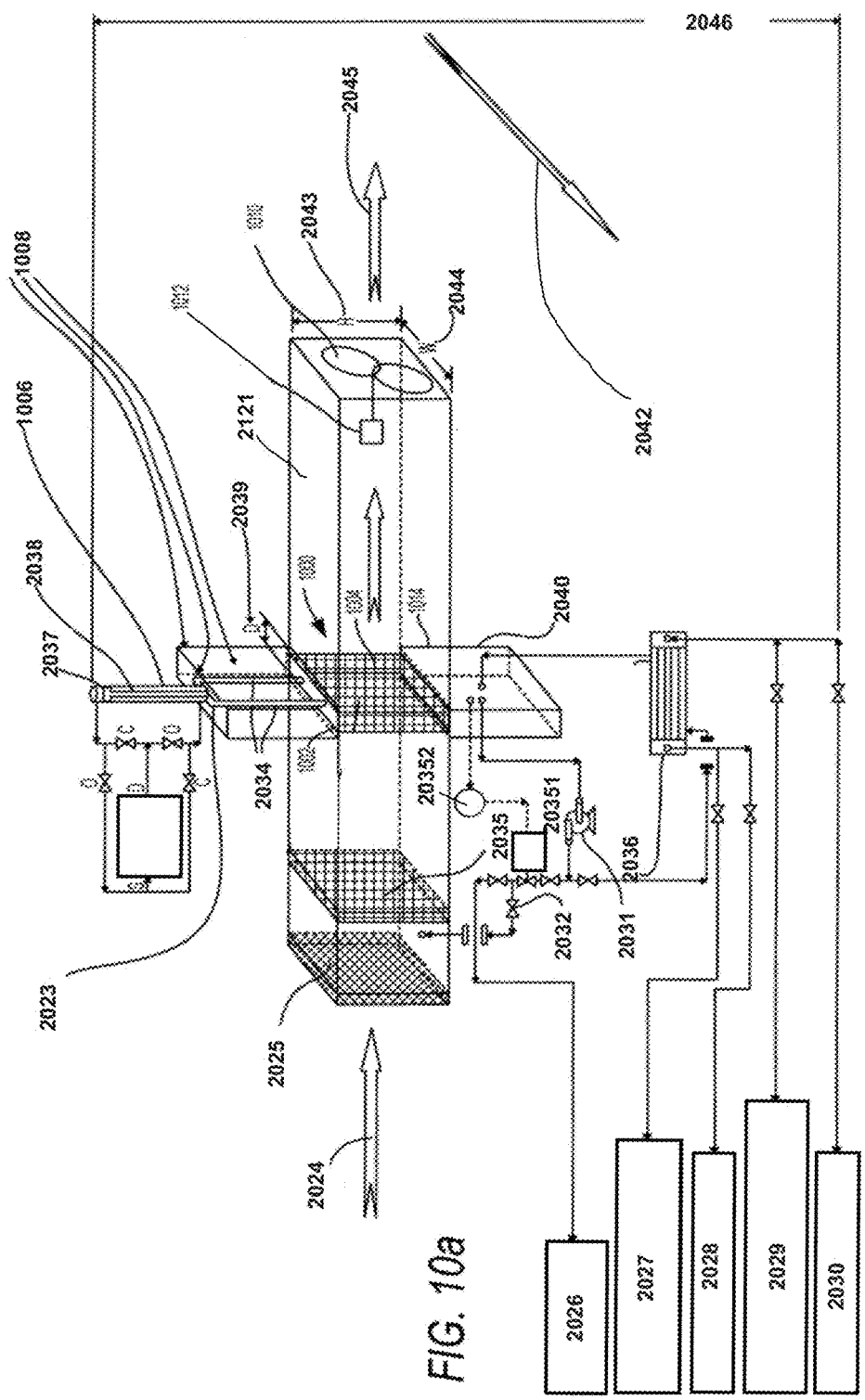
FIGS. 10c and 10d are top and side views of one form of elevator structure for use in the system and method of FIGS. 10a and 10b-1, 2, in one of its operating positions.
FIGS. 10e and 10f are top and side views of the elevator structure of FIGS. 10c and 10d, in another of its operating positions.
Figures 1, 10B:
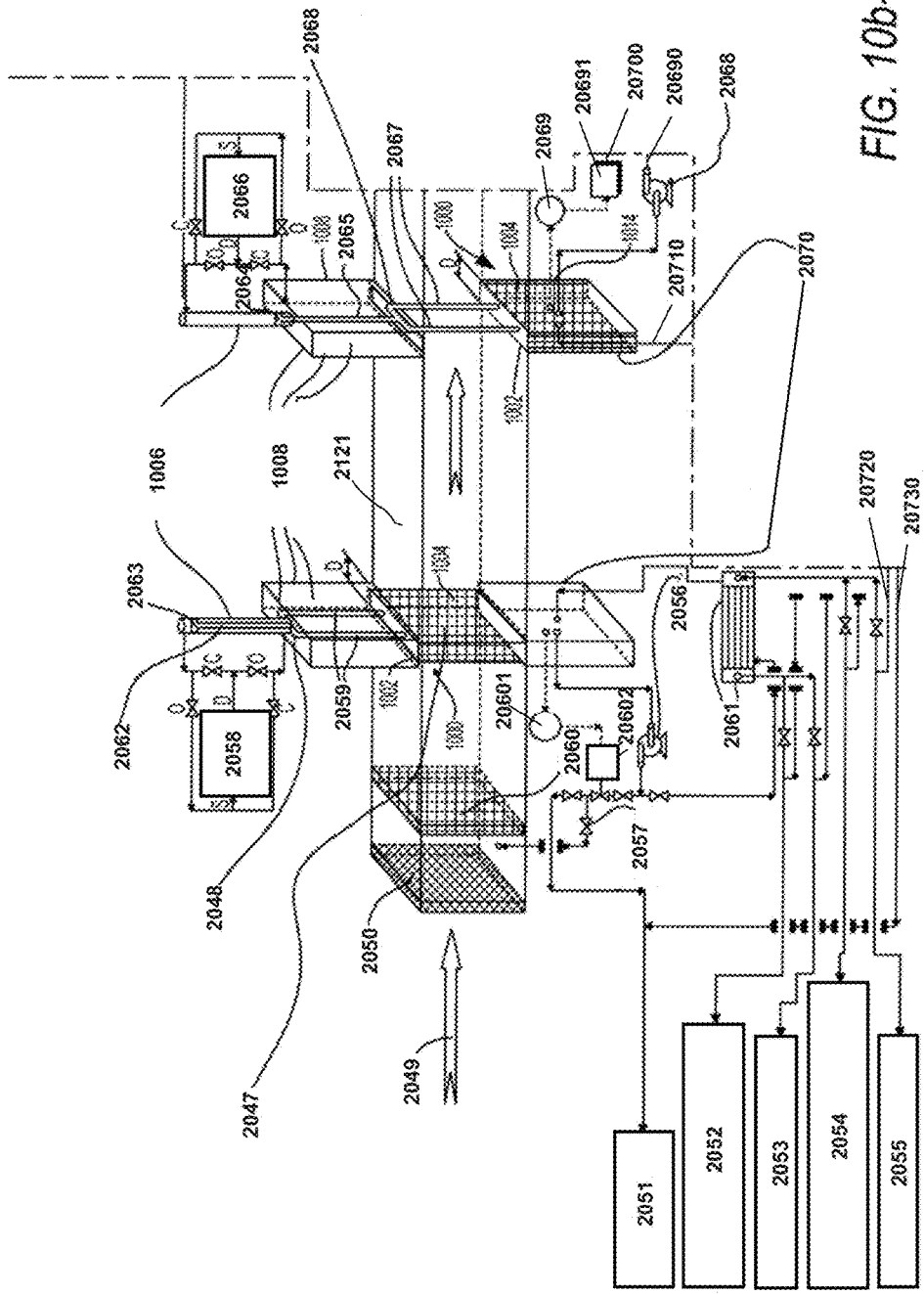
Figures 2, 10B:
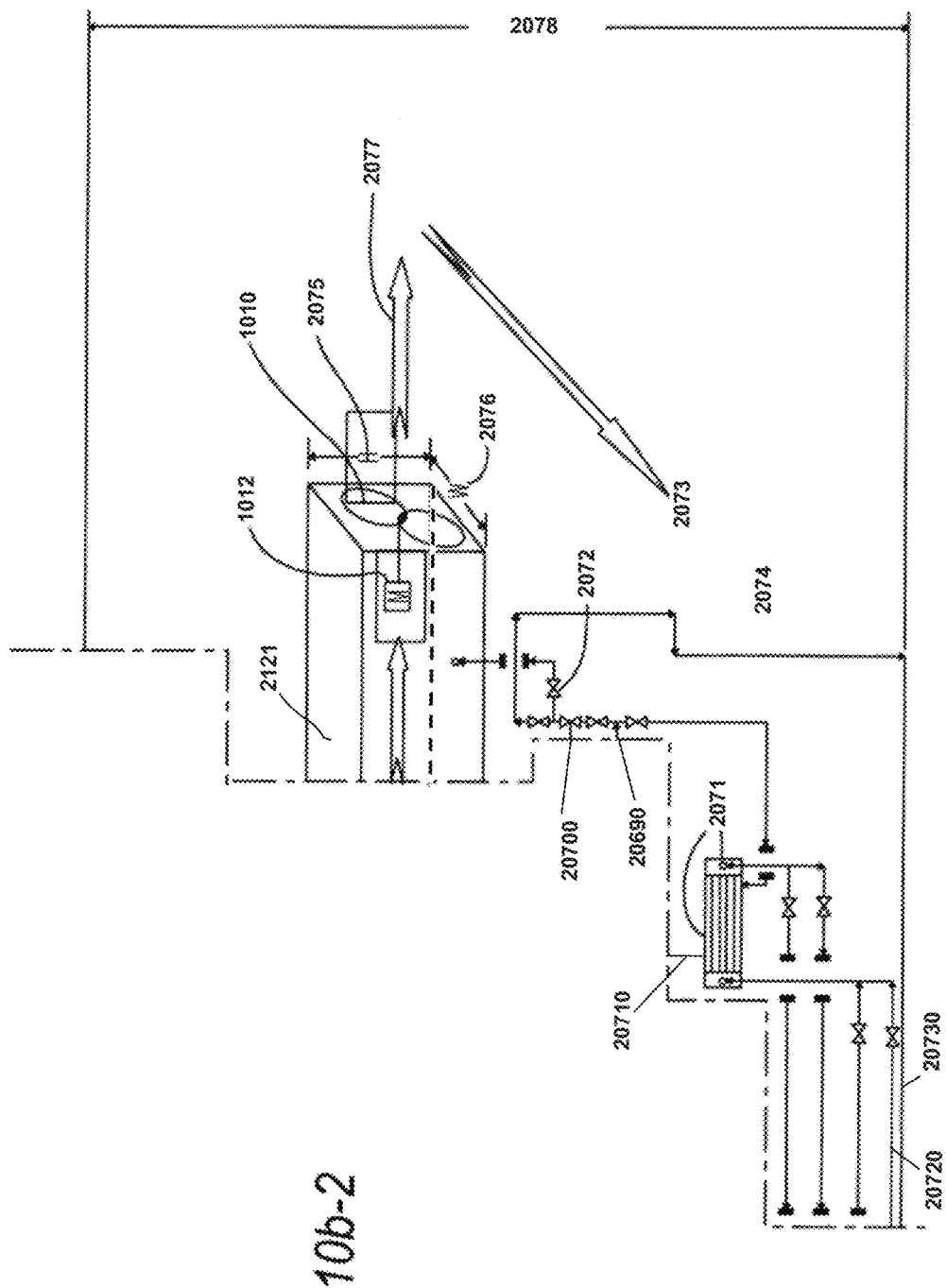
Figure 10C:
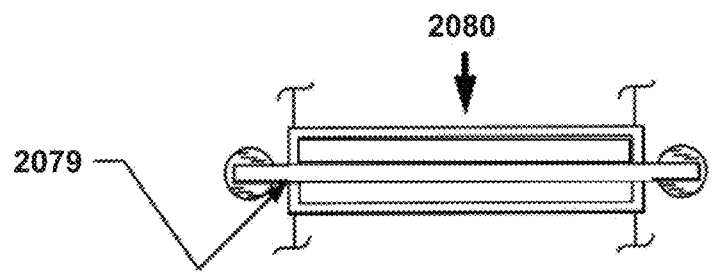
Figure 10D:
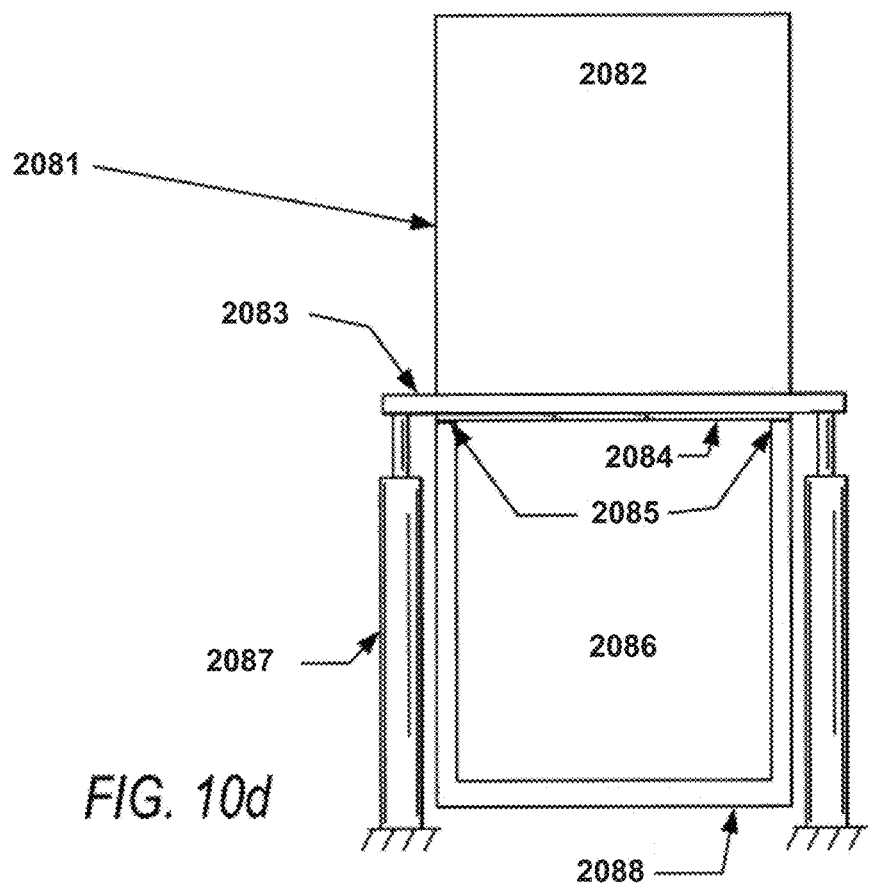
Figure 10E:
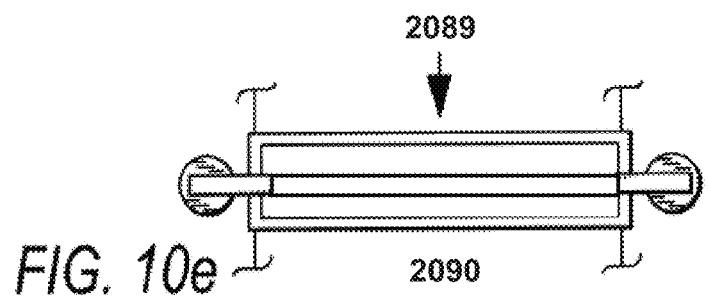
Figure 10F:
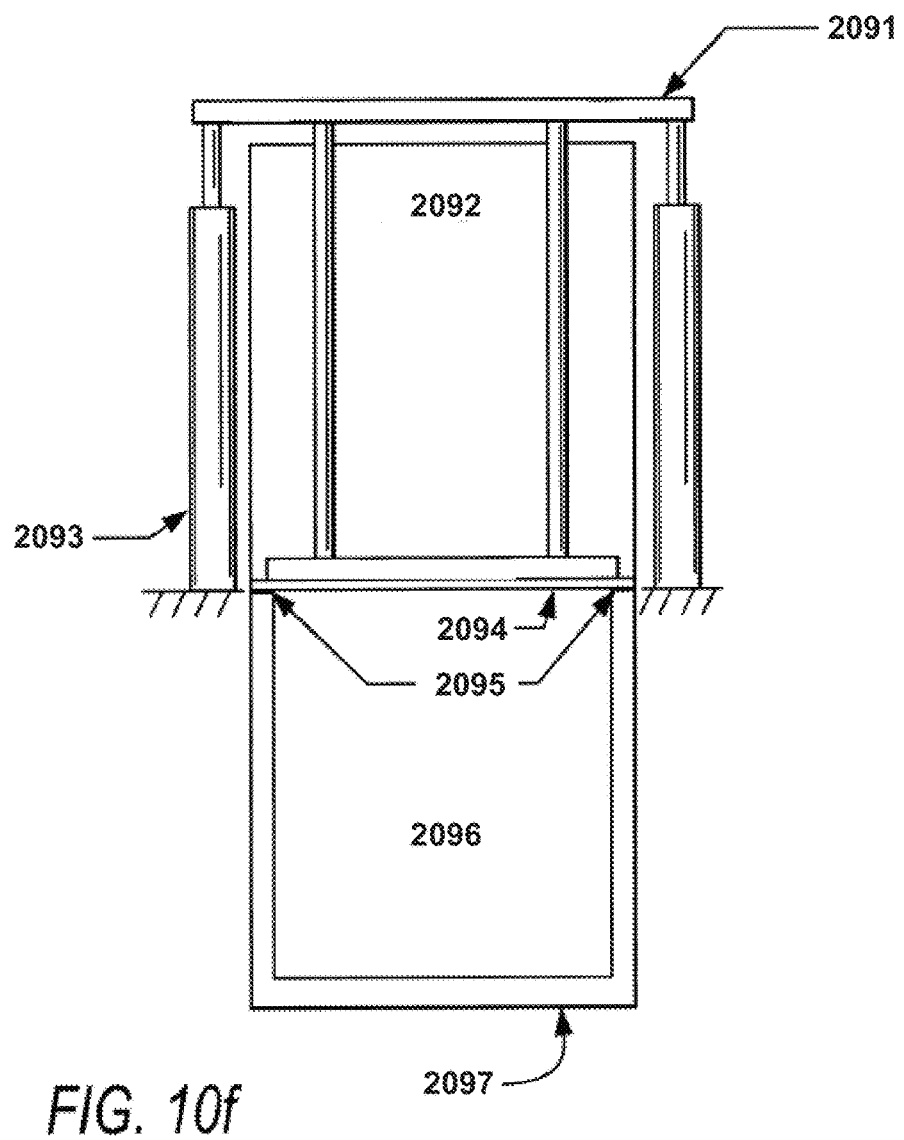
Figure 10G:
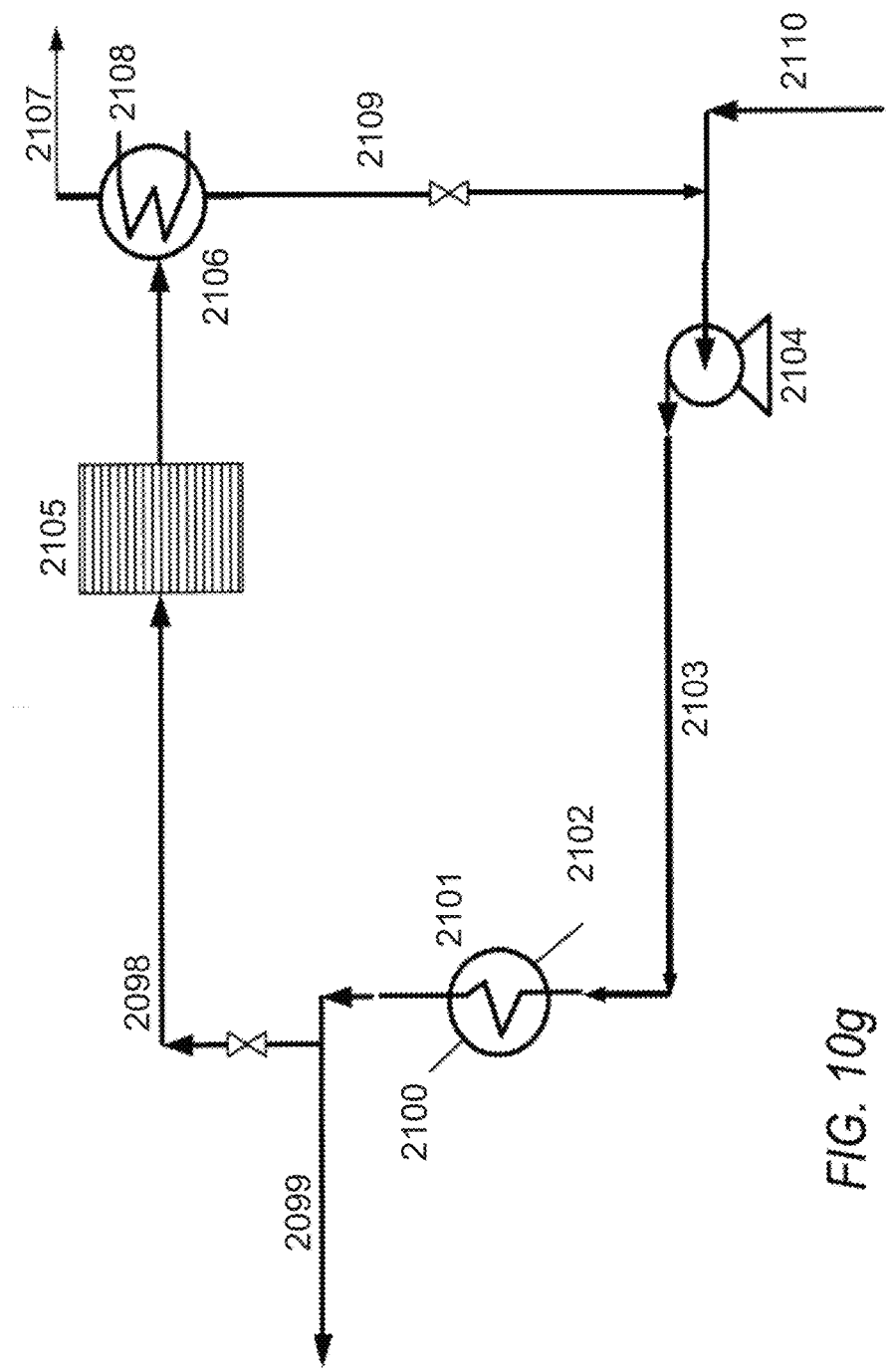

FIG. 10g schematically shows details of structure that can be used to strip the captured $CO_2$ and regenerate the sorbent, in accordance with the principles of the present invention.

Figure 10H:
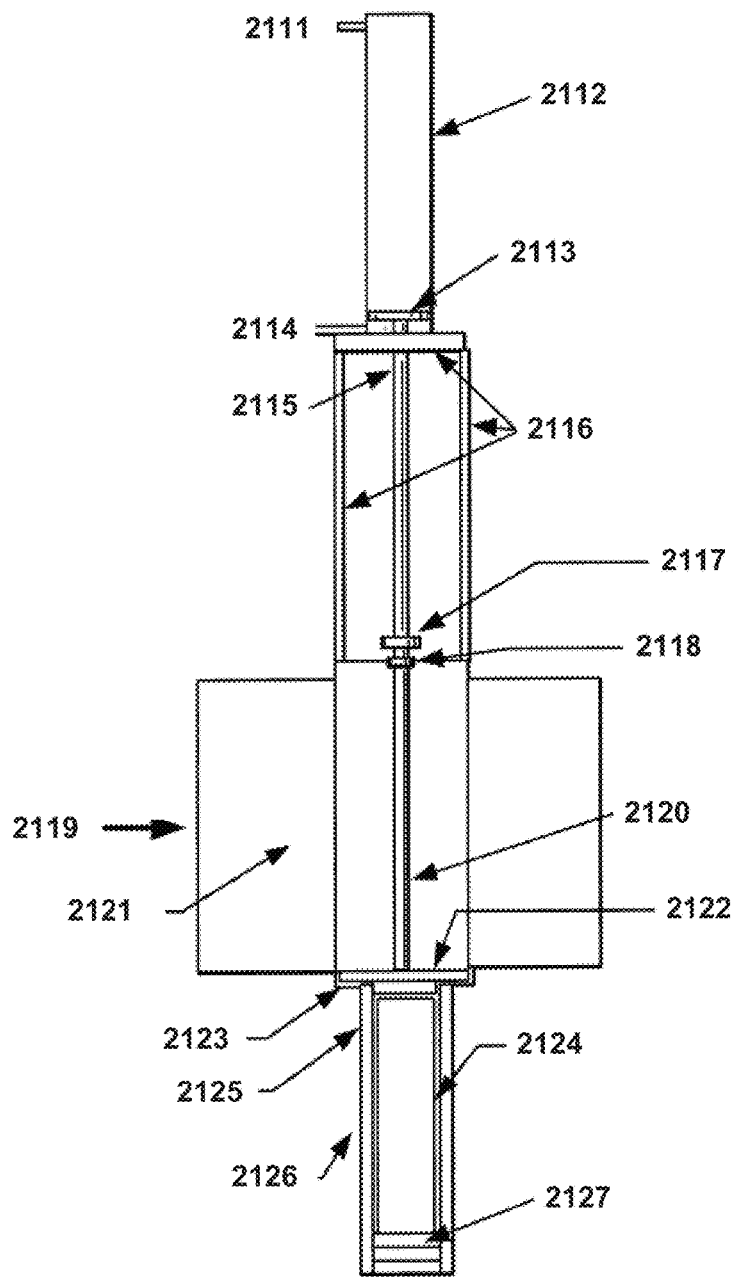
Figure 11A:
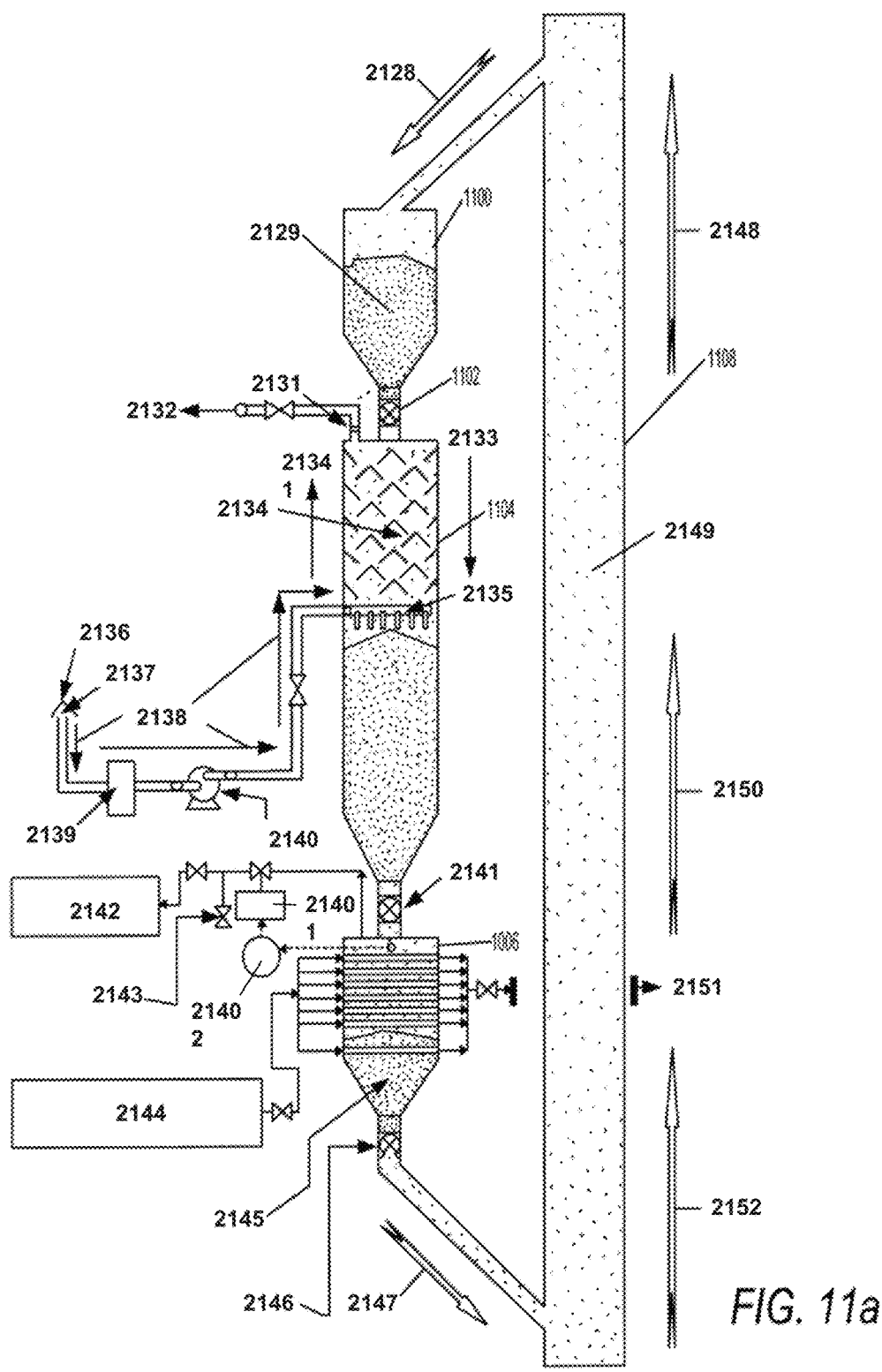
Figure 11B:
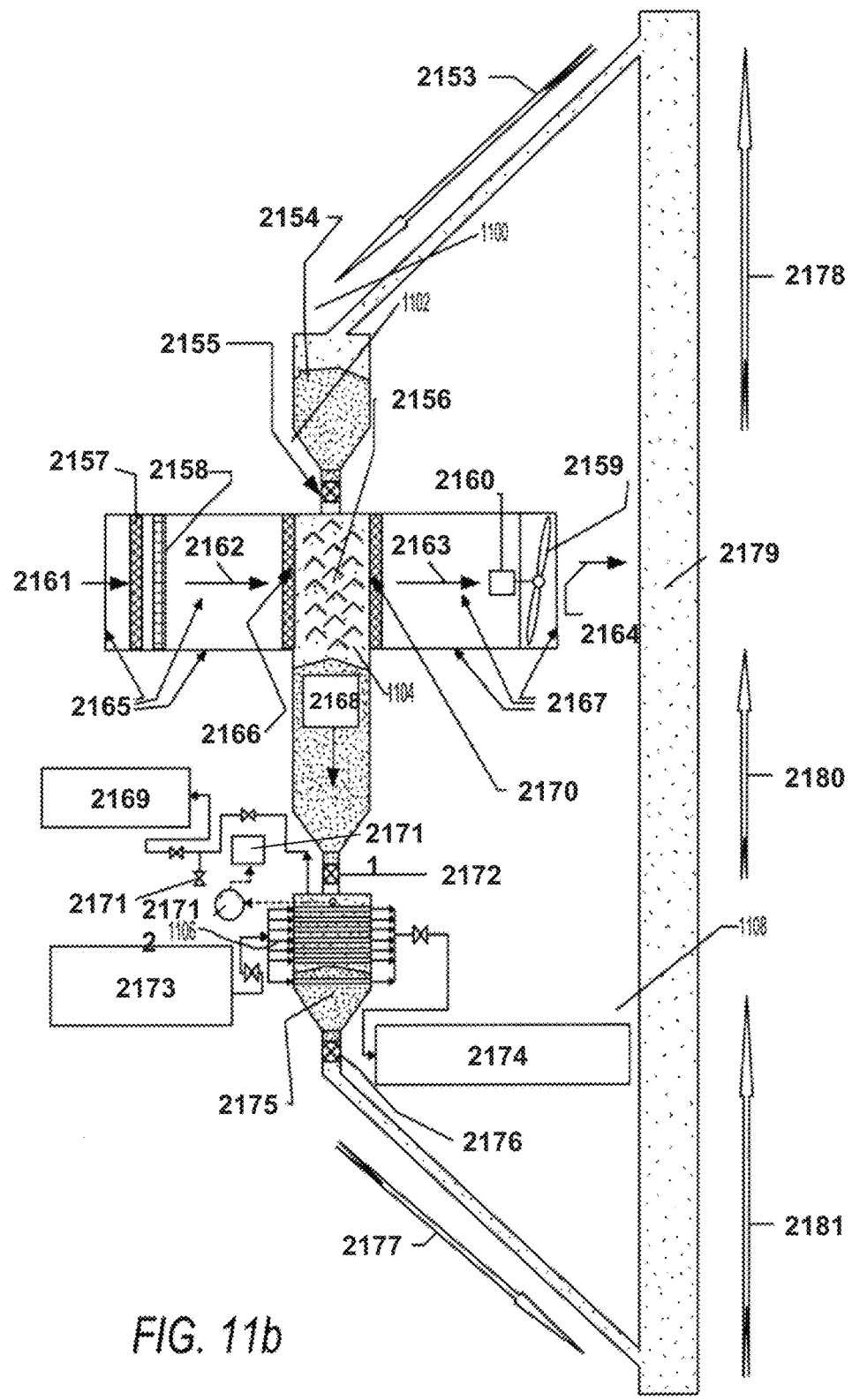
Figure 12:
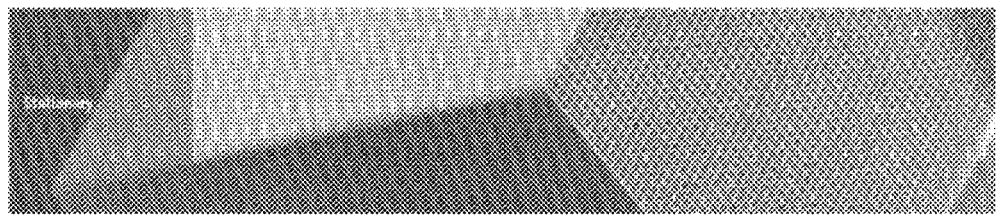

FIG. 10h is a schematic, enlarged illustration of the basic principles of the elevator structure of the embodiment of FIGS. 10a and 10b-1, 2;

FIGS. 11a and 11b schematically illustrate two other versions of a structure and technique for of removing carbon dioxide from carbon dioxide laden air, and regenerating the sorbent that absorbs or binds the carbon dioxide, according to the principles of the present invention;

FIG. 12 is a schematic illustration of a monolithic, sorbent support structure, of a type produced by Corning under the trademark Celcor®, that can be used as a sorbent substrate, in accordance with the principles of the present invention.

Figure 13:
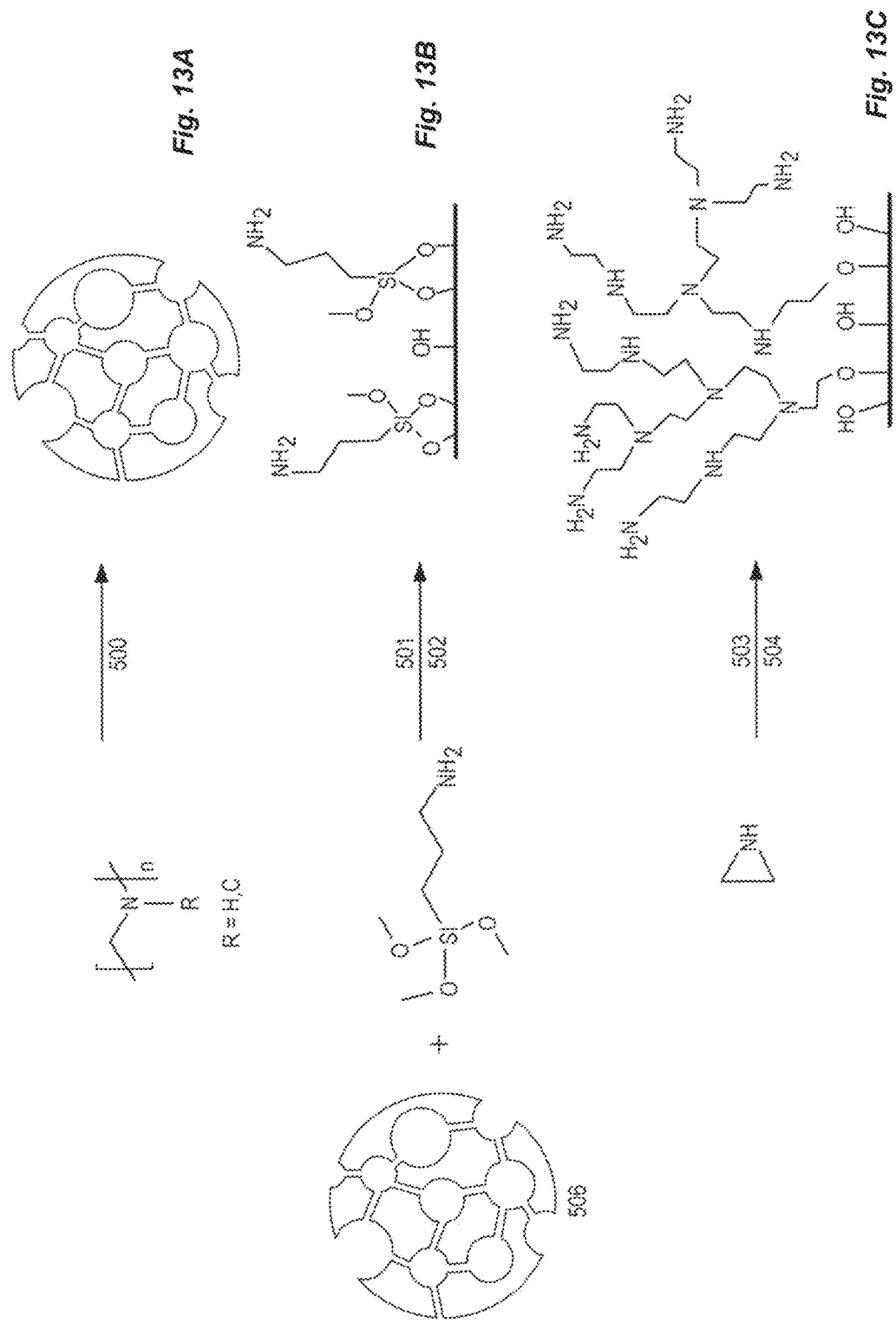
Figure 14:
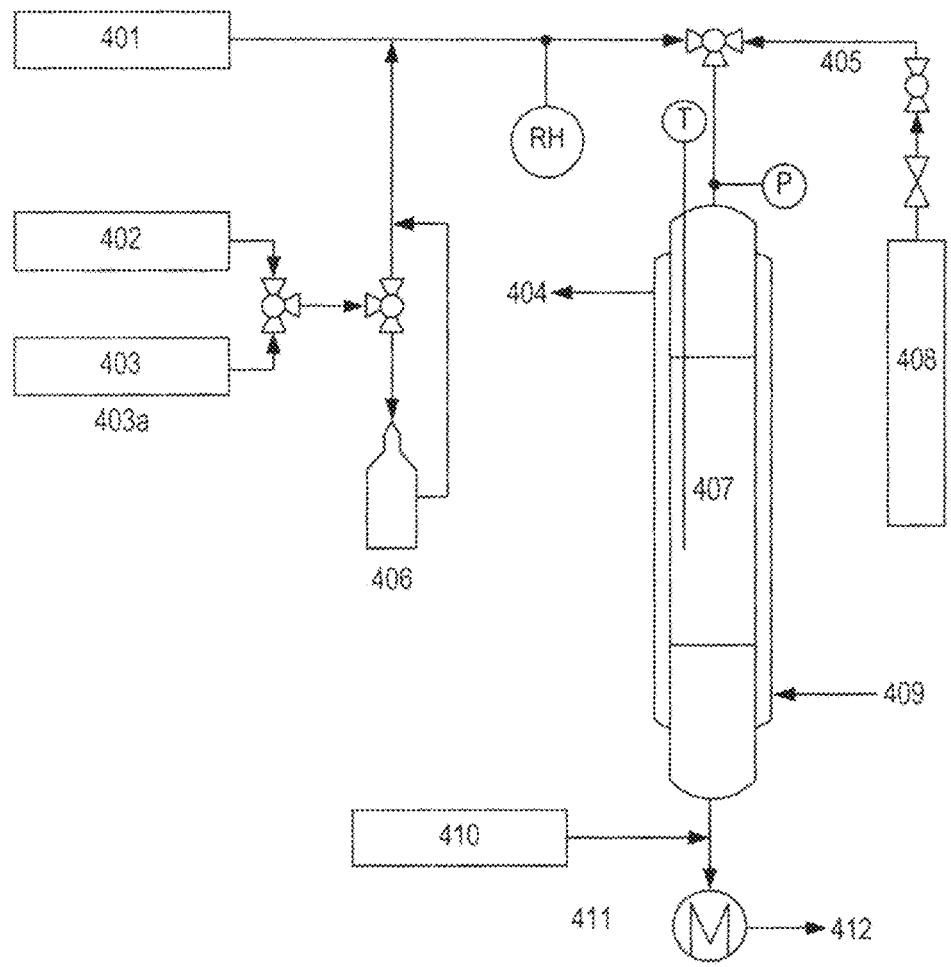
Figure 15:
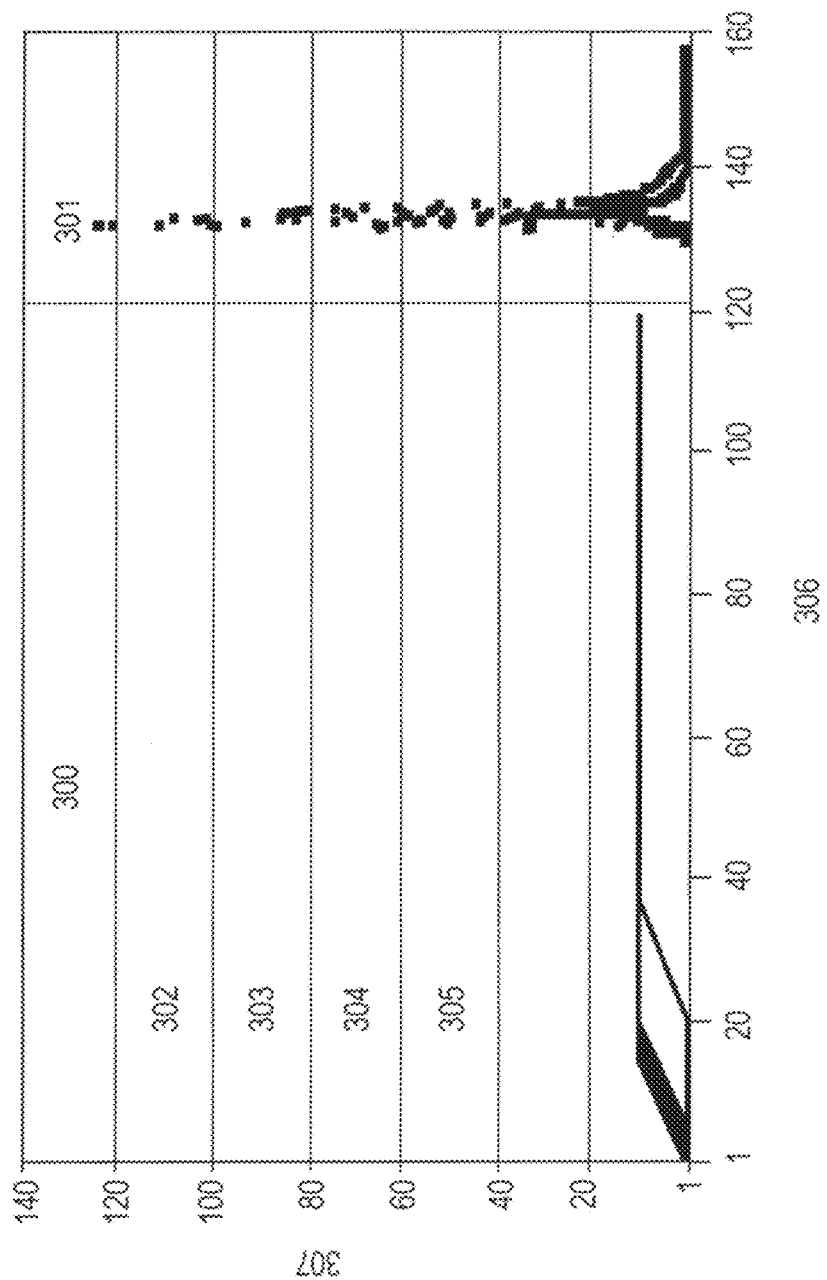
Figure 16:
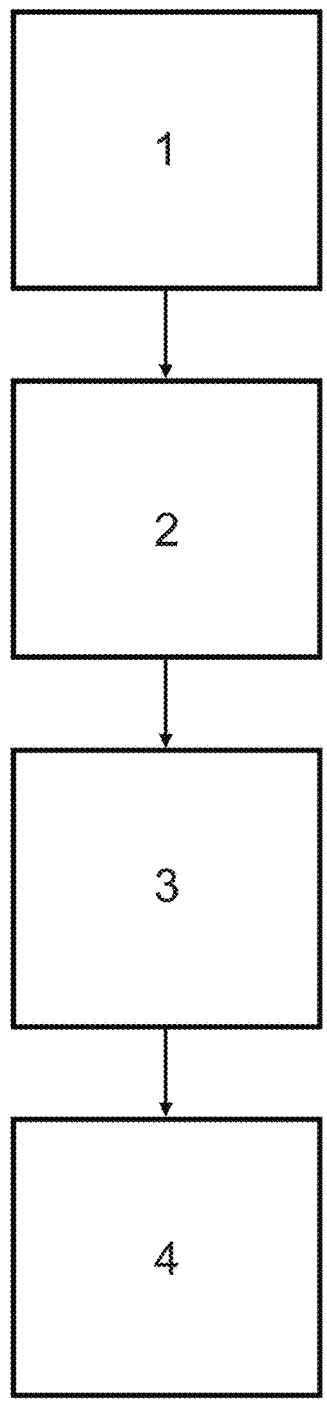
Figure 17A:
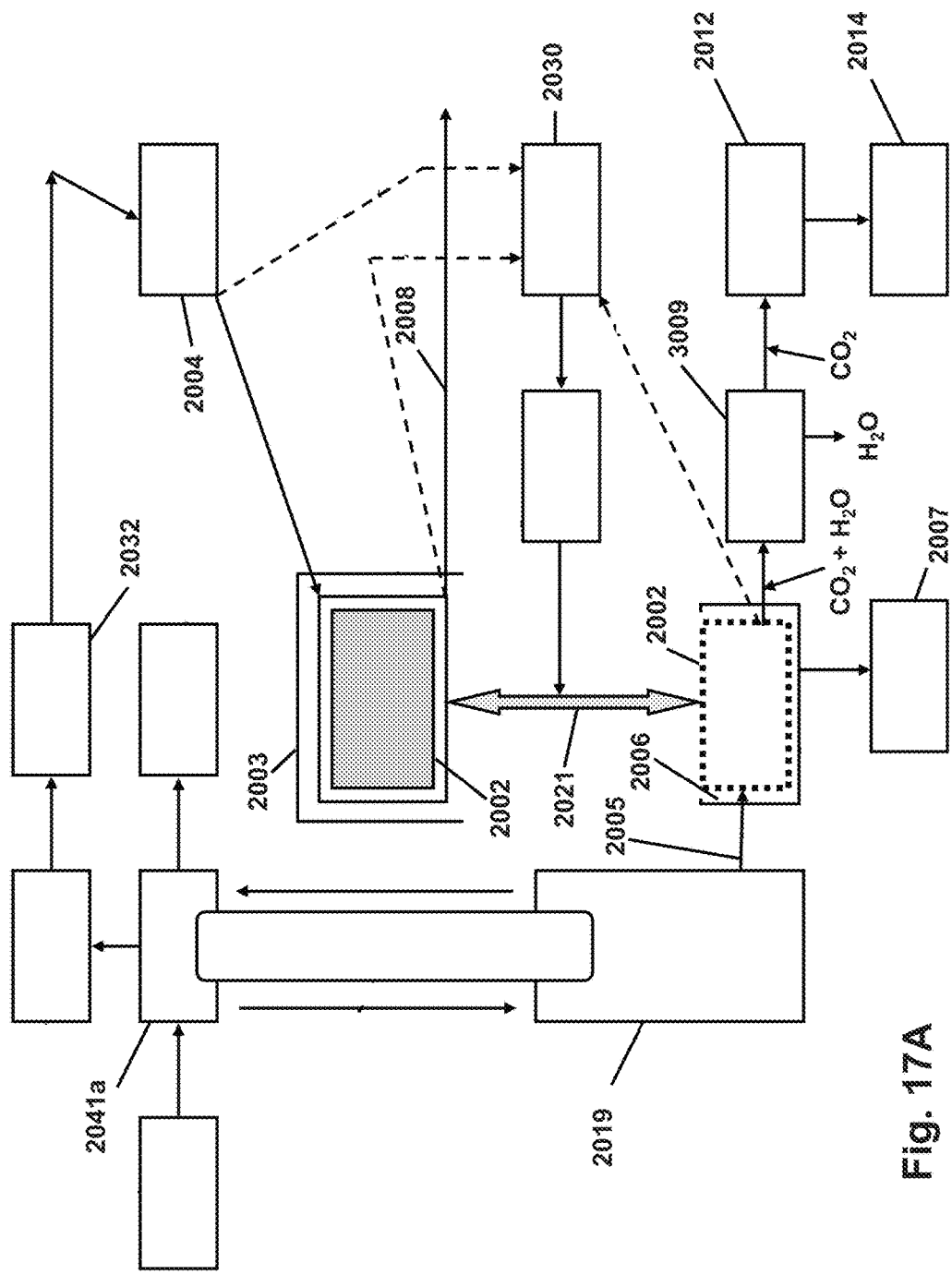
Figure 17B:
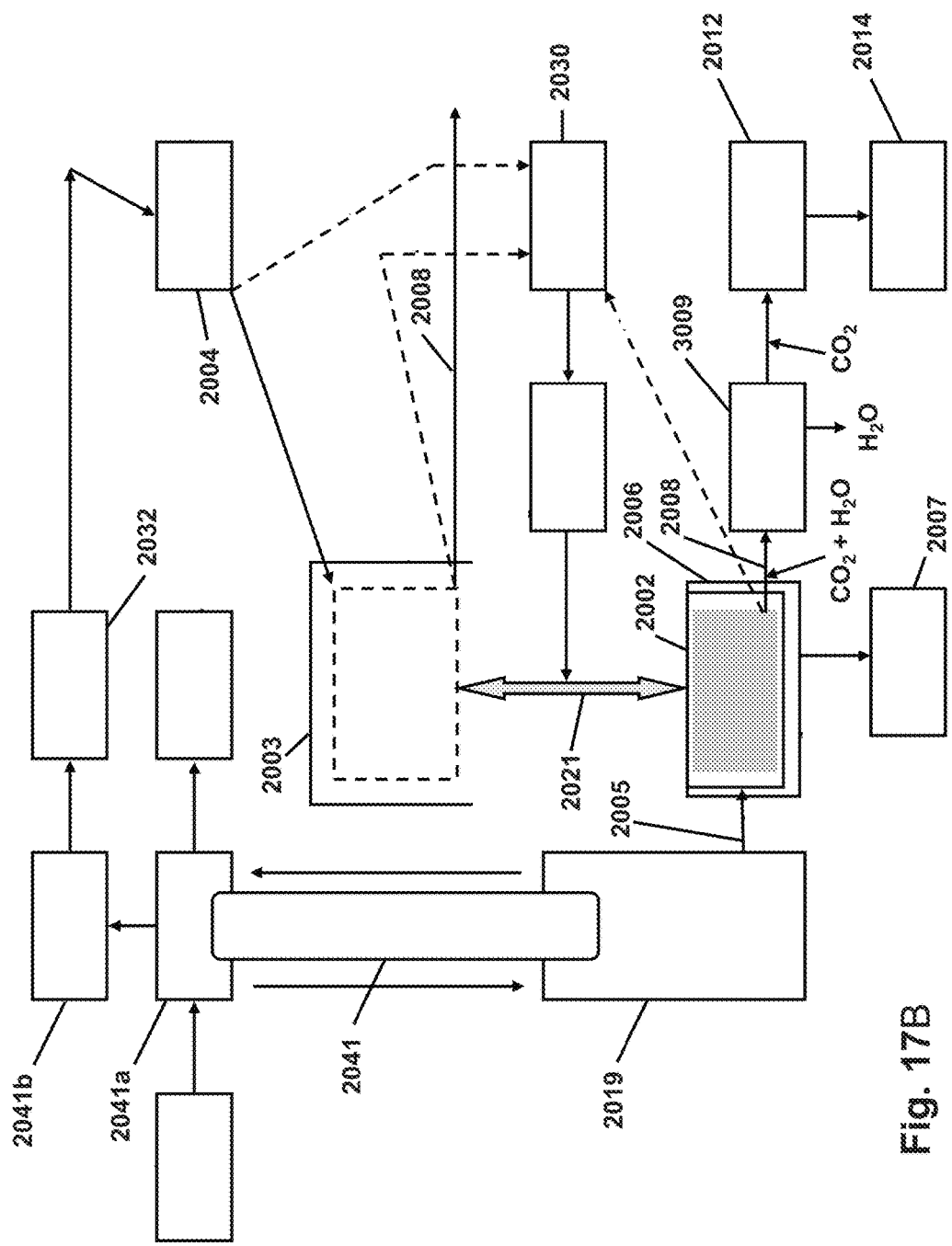
Figure 18A:
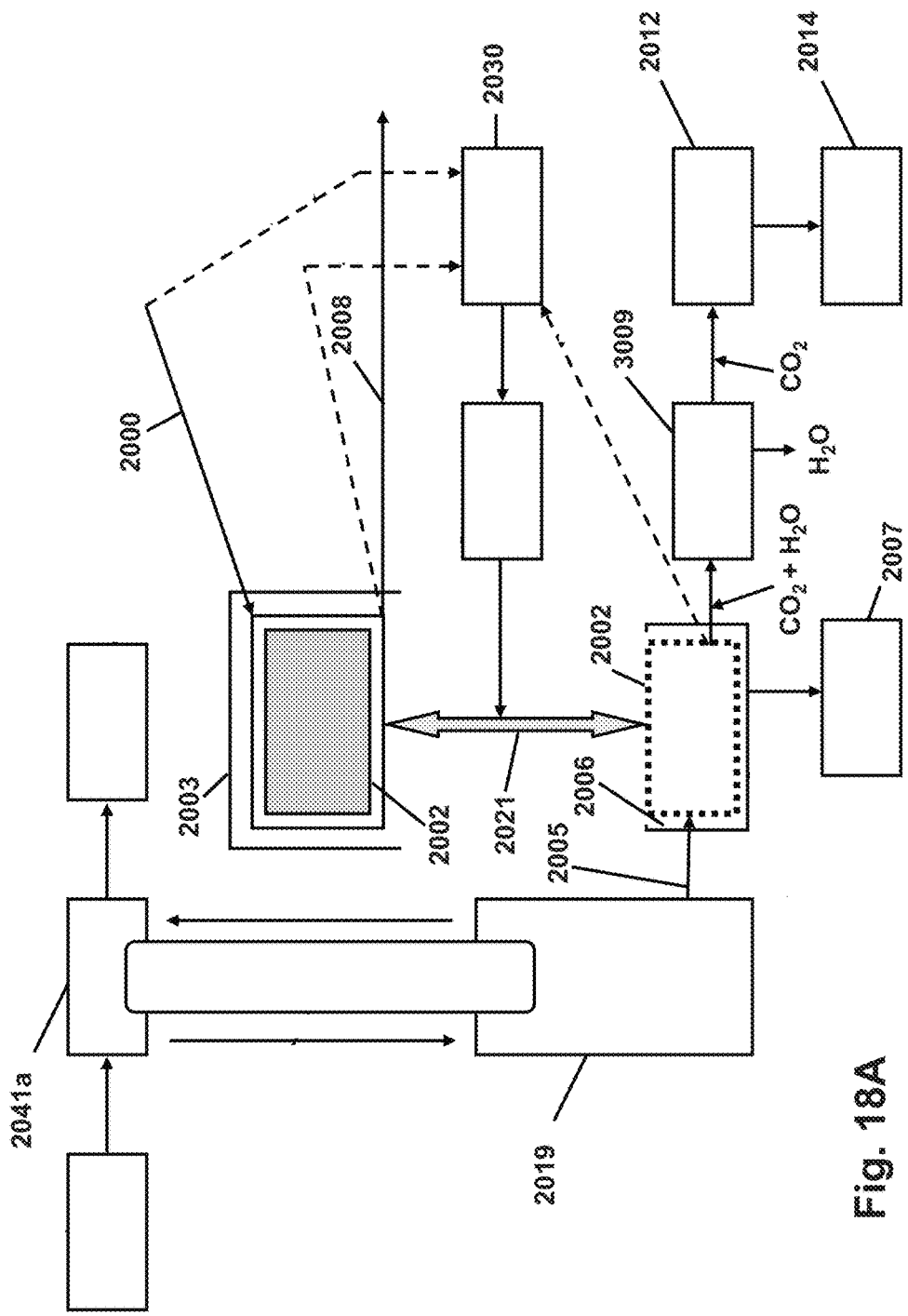
Figure 18B:
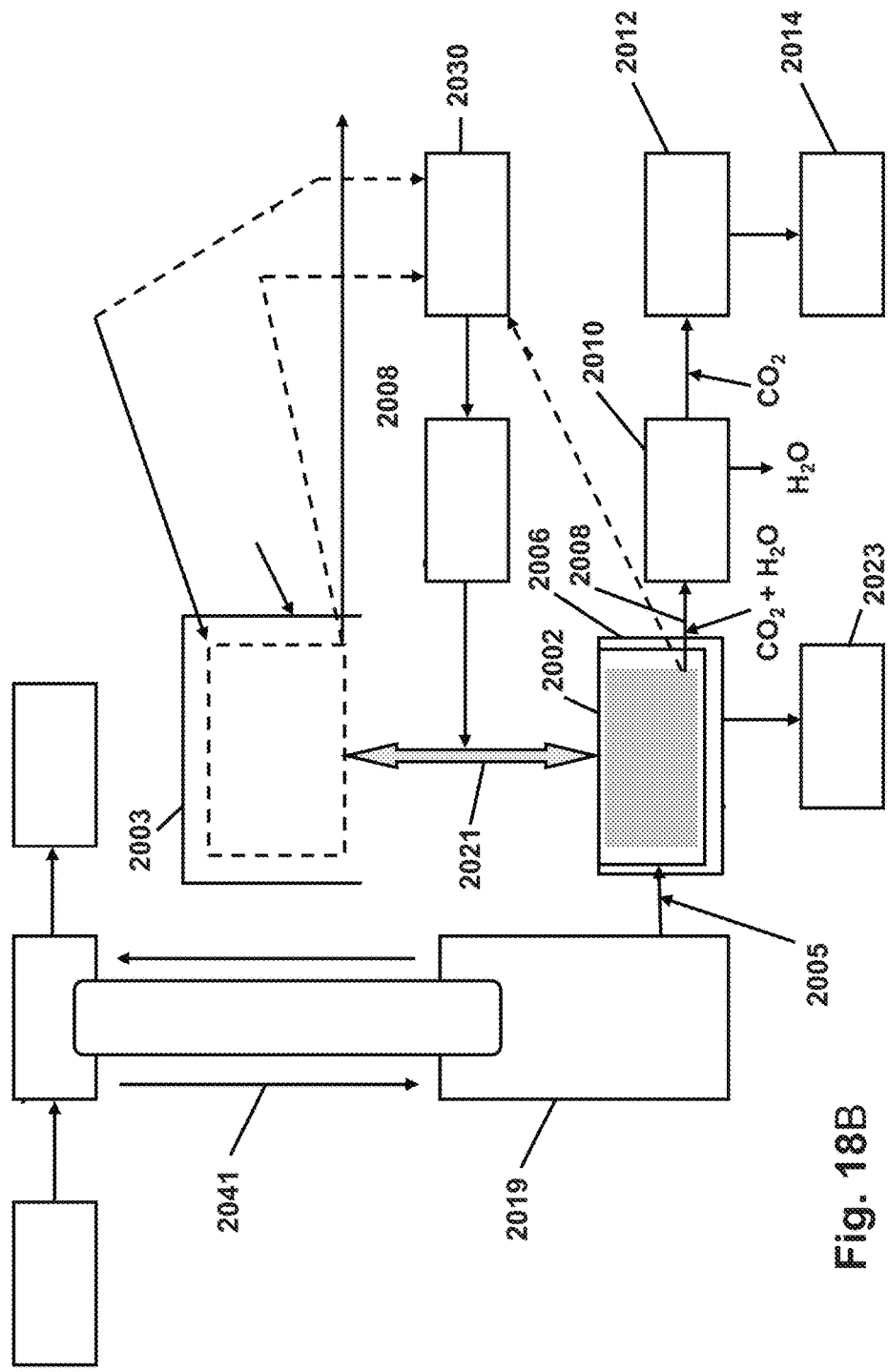
Figure 19:
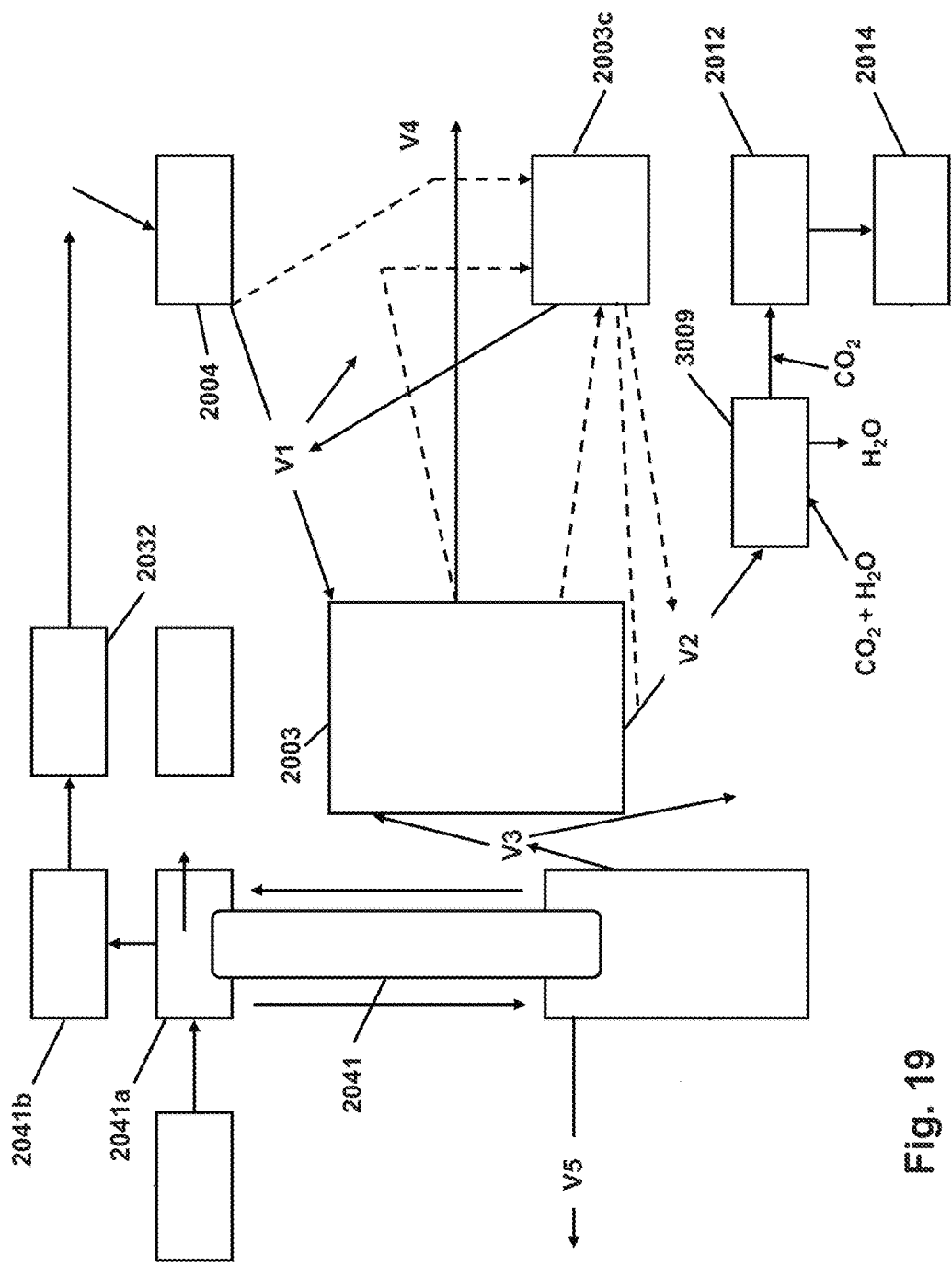
Figure 20:
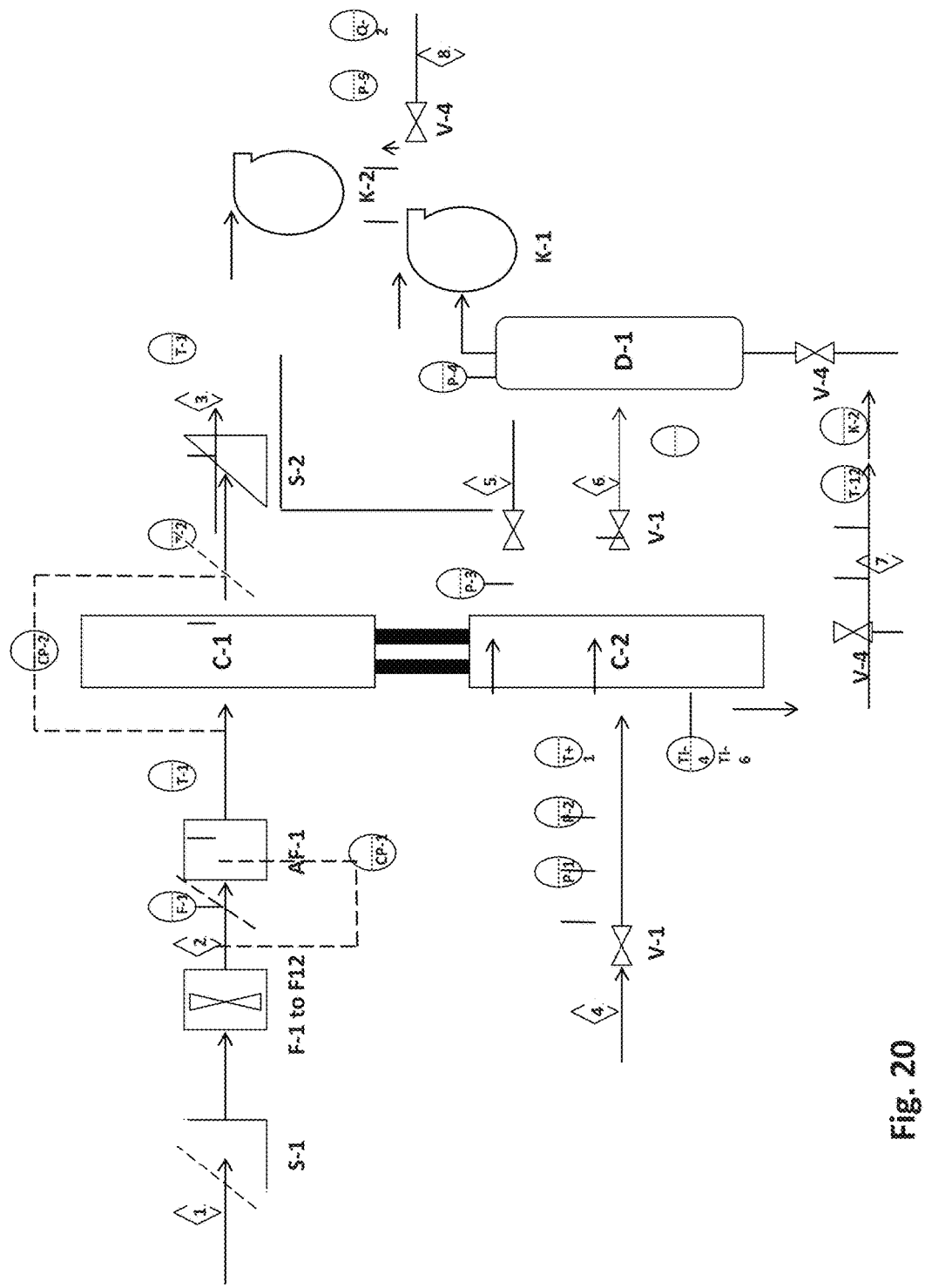
Figure 22:
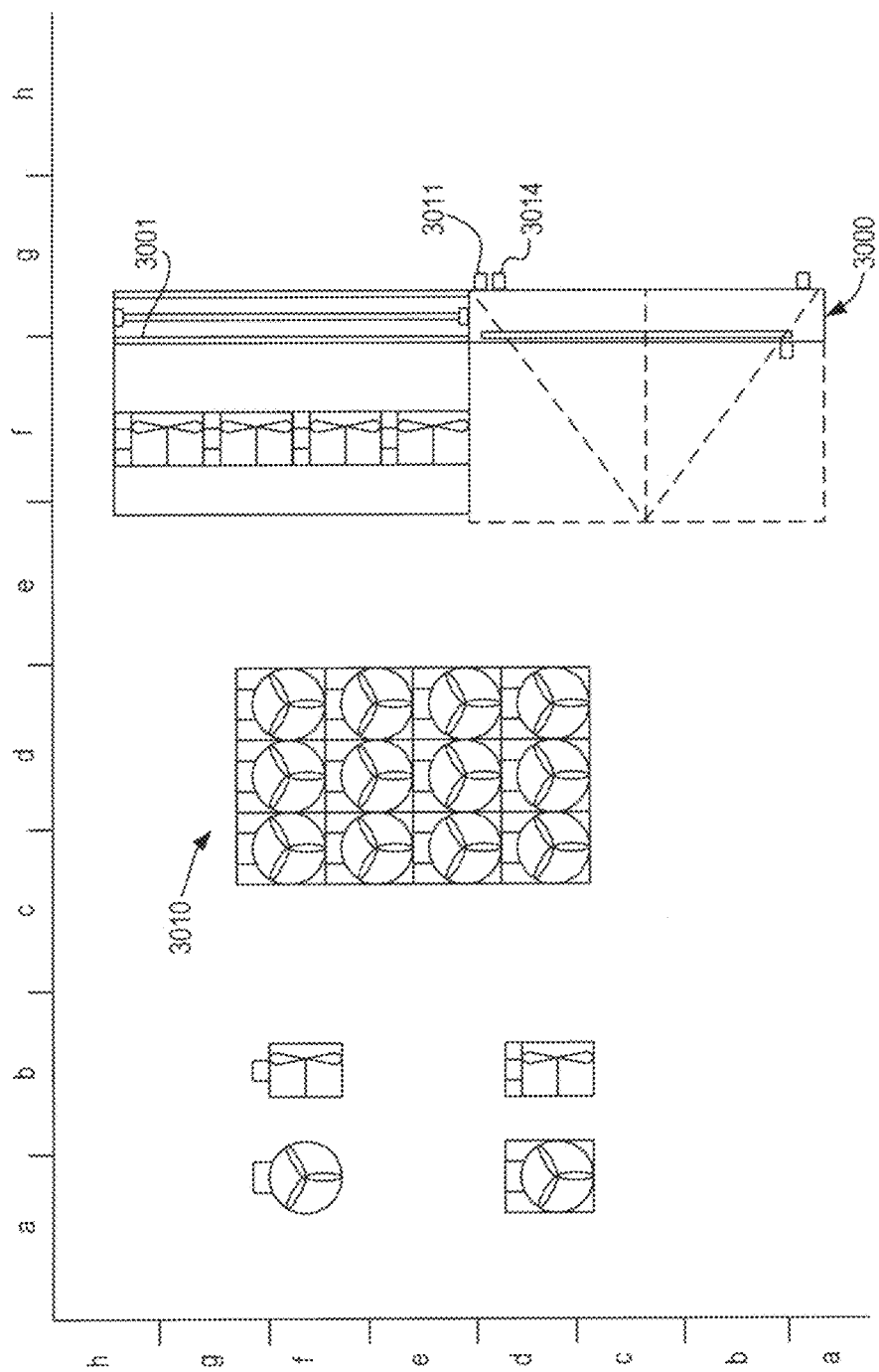
Figure 23:
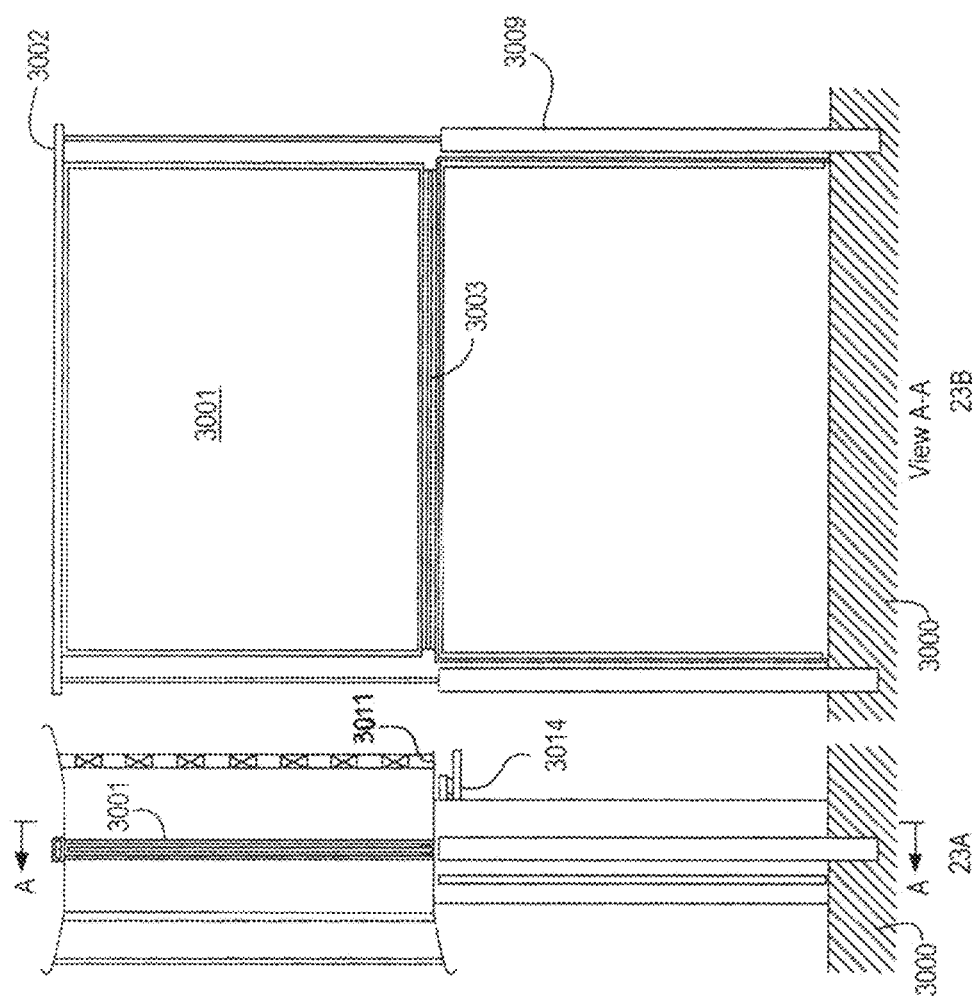
Figure 24:
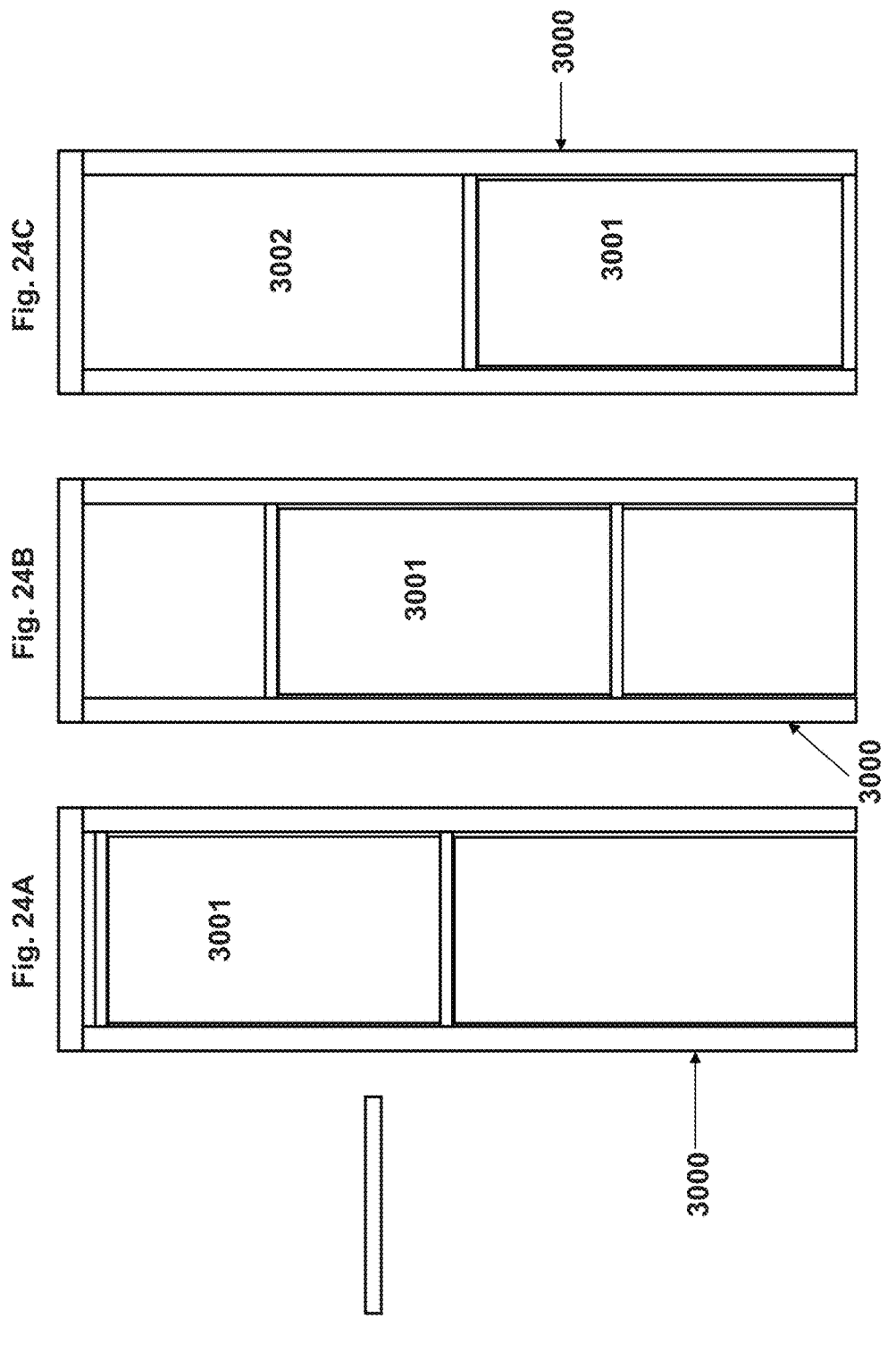

FIGS. 13A-C are schematic diagrams of a suitable porous substrate, showing the supported amine adsorbent in the pores of each substrate;

FIG. 14 shows a schematic of one example of experimental $CO_2$ removal apparatus;

FIG. 15 depicts a typical $CO_2$ desorption profile, in this case for the Class 1 adsorbent, PEI, on a particulate porous silica substrate;

FIG. 16, herein, is a generalized block diagram of a system for removing carbon dioxide from the atmosphere according to the present invention;

FIGS. 17A-B present generalized flow diagrams showing the successive steps in a preferred system according to this invention for removing carbon dioxide from the atmosphere drawing process heat from a carbon burning source, and obtaining a relatively low cost purified stream of $CO_2$;

FIGS. 18A-B present generalized flow diagrams showing the successive steps in a preferred system according to this invention for removing carbon dioxide from the atmosphere drawing process heat from a non-carbon burning energy source, and obtaining a relatively low cost purified stream of $CO_2$;

FIG. 19 presents a generalized flow diagram showing the successive steps in an alternative preferred system according to this invention for removing carbon dioxide from the atmosphere and obtaining a relatively low cost purified stream of $CO_2$;

FIG. 20 presents a more specific flow diagrams showing the successive steps in the preferred system according to this invention for removing carbon dioxide from the atmosphere and obtaining a relatively low cost purified stream of $CO_2$;

FIGS. 21A,B are diagrams showing the preferred chevron shaped formation of the multiple monolith modules of the present invention for the capturing of one Million Tons of $CO_2$ from the atmosphere;

FIG. 22 is a schematic illustration of a preferred version of a formation of multiple fans for providing the flow of air through the chevron-shaped formation of $CO_2$ capture modules when there is no wind;

FIG. 23 is a schematic illustration of a preferred elevator system for moving primary and the $CO_2$ stripping station; and FIGS. 24A-C are schematic illustrations showing the elevator structure moving the sorbent structure between the two stations.

Figure 25:
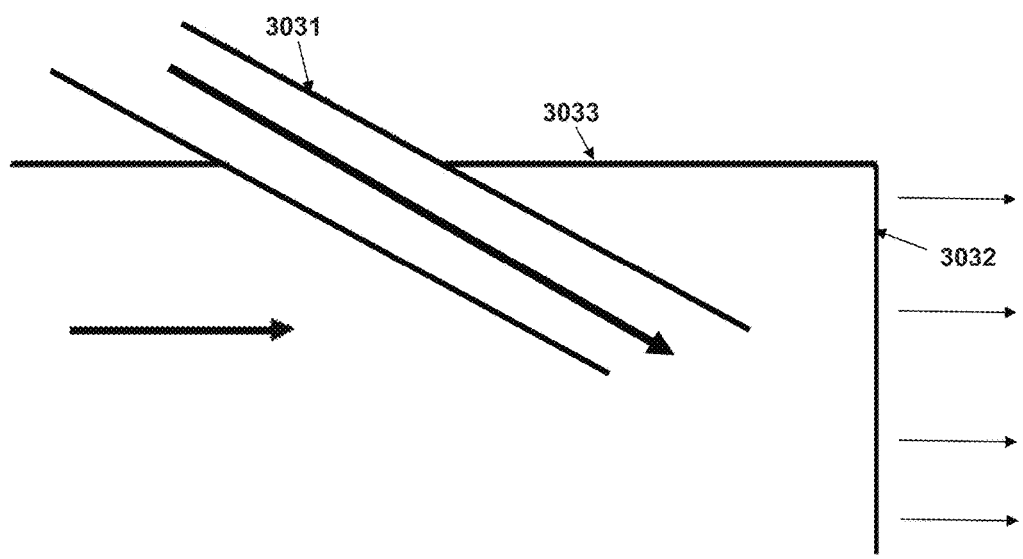
Figures 26A, 26B:
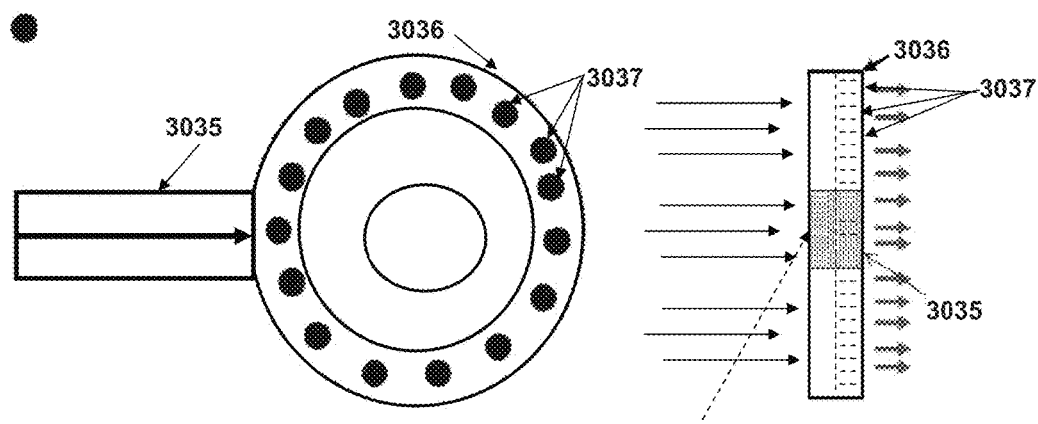

FIGS. 25, 26A and 26B are schematic illustrations showing alternative means to inject a small proportion of hot effluent gases into the incoming air to the $CO_2$ capturing stage.

Figure 27:
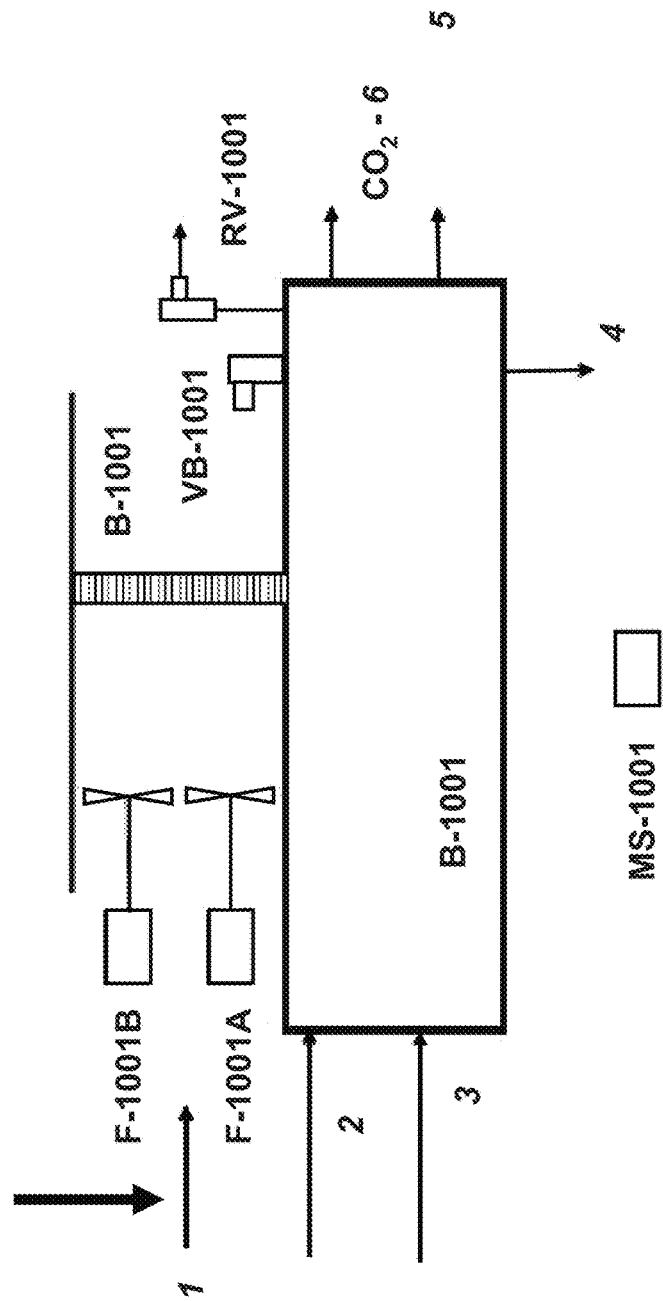

FIG. 27 represents the change in energy usage and temperature of the adsorbent with varying initial $CO_2$ content in the incoming gas.

Figure 28:
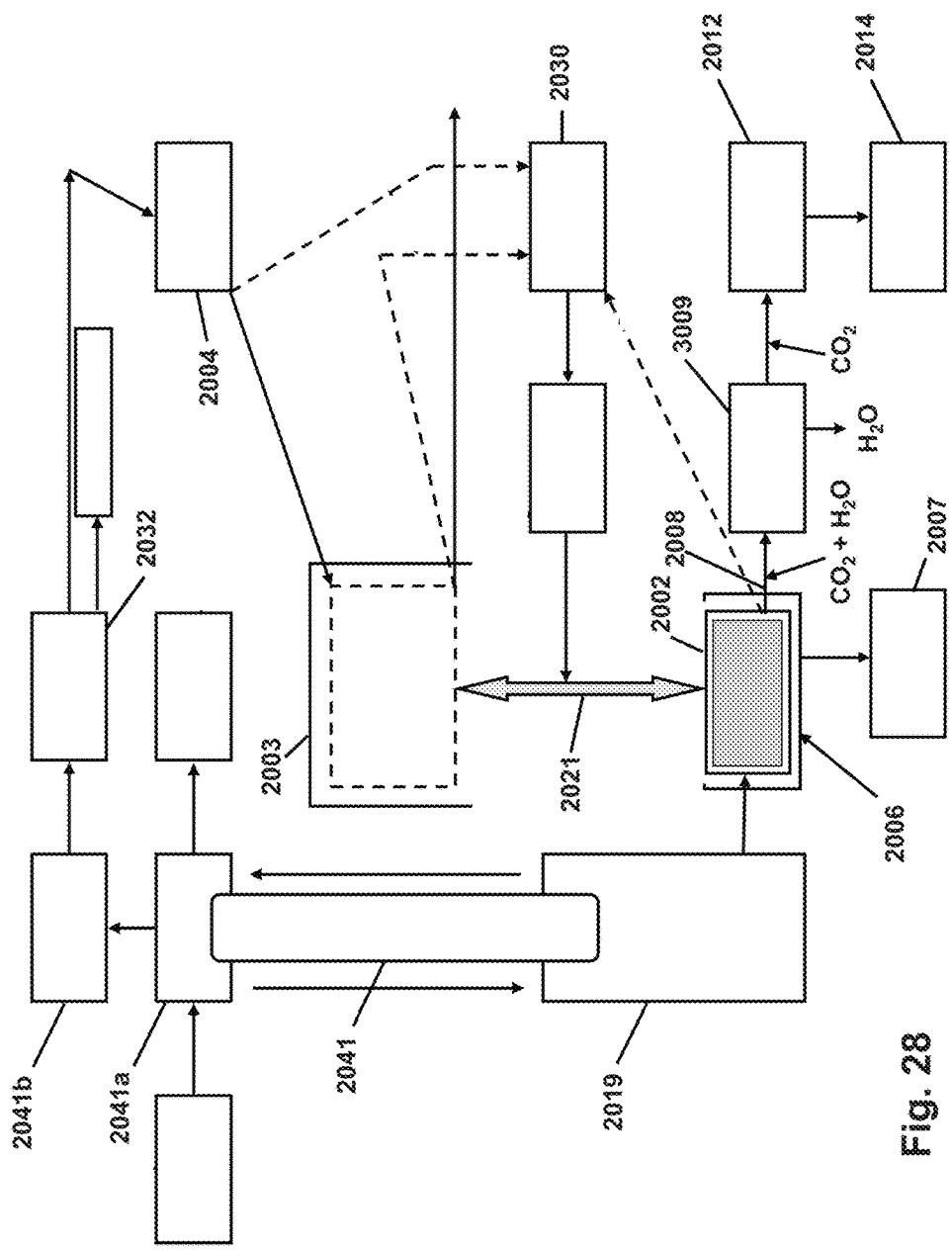

FIG. 28 represents a flow diagram of the two-stage $CO_2$ removal process embodiment of this invention.

DETAILED DESCRIPTION

Background Description of the System and Method Concepts of application Ser. No. 12/124,864

Initially, it is believed useful to describe the method and system of U.S. application Ser. No. 12/124,864, to provide background for the additional ways the present invention further develops those principles. FIGS. 1-9 illustrate the system and method of U.S. application Ser. No. 12/124,864. FIG. 1 is a generalized block diagram of a system, generally designated by reference number 1, for removing carbon dioxide from an atmosphere according to an exemplary embodiment of the present invention. The system 1 includes an air extraction system 40 and a collection system 50 that isolates the removed carbon dioxide to a location for at least one of sequestration, storage and generation of a renewable carbon fuel or the generation of a non-fuel product such as fertilizer and construction materials (or to be used in green houses or to enhance the rate of microbial production of biofuels). The air extraction system 40 preferably, incorporates any known or later-discovered $CO_2$ extraction method, including methods which use a medium (also referred to as a sorbent) to absorb and/or bind (adsorb) $CO_2$, from the atmospheric air, entering at 2001, by exposing the medium to chemical, electrical and/or physical interaction with the $CO_2$ in the captured air. The medium may be liquid, gaseous or solid, or a combination of liquid, gaseous and solid substances, where in the case of solids, the substance is preferably porous. The medium is preferably recyclable so that after the $CO_2$ is captured by the medium and separated from the medium for sequestration, the medium can be reused for absorption/binding, of additional $CO_2$. As shown in FIG. 1, the separation of the $CO_2$ from the medium, and the sequestration of the $CO_2$, entering via 2002, performed by the sequestration system 50, may be made more efficient by the addition of heat, via line 2000, to the air extraction system 40. In the present invention, the heat is process heat generated e.g. by a solar energy generator, such as a solar collector, to be described in further detail below. In other embodiments, process heat may be provided by other types of energy sources, such as, for example, fossil fuel, geothermal, nuclear, biomass, and other renewable energy sources. The term "process heat" as used herein refers to the lower temperature heat remaining after the higher temperature heat has been used to generate electricity. More generally, the term "process heat" refers to any low temperature heat remaining after a primary process or that is added by the process itself, such as, for example, exothermic carbonation reactions in which carbon dioxide is stored as a mineral or in fact when it binds to the medium and is captured. Moreover, "process heat" may be provided from the use of sources of energy to produce products other than power or electrical generation. For example, primary processing such as chemical processing, production of cement, steel or aluminum, production of energy products like coal to liquid energy products, refining, may use heat to drive the primary processing, and the unused heat remaining after the primary processing or created during the primary processing would be the process heat of such processing, and can be used in the system or method of the present invention. A particularly preferred way of providing process heat is by a co-generation process, in which a primary process (e.g. for generating electricity) provides a source of process heat (either directly in the form of steam, or in a form that can be used to heat a body of liquid to produce steam) and that process heat is further used in the manner described herein to remove $CO_2$ from a substrate and regenerate the sorbent carried by the substrate.

Applicants' preferred concept of extracting carbon dioxide from the atmosphere and using process heat to separate carbon dioxide from the collection medium is a significant way of addressing the global warming problem, and goes against the conventional wisdom in the art (and is counter-intuitive to those in the art). Specifically, the use of process heat to solve the global warming problem by extracting carbon dioxide ($CO_2$) from the low concentration ambient air is very attractive compared to both the conventional approach of extracting $CO_2$ from high concentration flue gas sources and other schemes known in the art for extracting $CO_2$ from the ambient atmosphere. In the former case it goes directly against conventional wisdom that 300 times lower concentration of the $CO_2$ in ambient atmosphere would expect it to be 300 times more expensive since separation costs are thought to generally scale inversely with the concentration. Thus most efforts have been directed at extracting $CO_2$ from the flue gas emissions of power plants (e.g. clean coal) and experts have publicly claimed that the use of ambient air as opposed to flue gas makes no sense. However, the large infinite size of the ambient air source compared to the finite flue gas source and sources generally is one feature that enables applicants' approach to be effective in spite of conventional wisdom and practice. In the flue gas case the emissions containing the $CO_2$ are at a higher temperature (65-70 degrees centigrade) and therefore sorption medium regeneration uses higher temperature heat which is more costly than is needed for the cool ambient air (approximately 25-30° C.). There are other benefits of applicants' approach including the ability to use very thin separation devices that also provide further process improvements. Thus, it could be less costly to remove $CO_2$ by piping the process heat to a global thermostat facility that operates on the principles of applicants' invention, rather than cleaning up directly its flue emissions. In addition, the applicants' approach would produce negative carbon, actually reducing the amount of $CO_2$ in the atmosphere, while cleaning up the flue gas would only prevent the $CO_2$ content in the air from increasing.

Further analysis shows that one cannot solve the global warming problem in a timely manner to reduce the great risk it poses by simply cleaning up large stationary fossil fuel sources like coal plants or for that matter by conservation or use of renewables. One needs to actually be able, as is the case in this invention, to extract $CO_2$ from the atmosphere thus reducing the ambient concentration ("negative carbon") and reducing the threat of global warming. Other published schemes for extracting $CO_2$ from the ambient atmosphere have used higher temperature heat generally and not process heat specifically and therefore have not been seriously considered because of their high energy costs.

FIG. 2 is a block diagram of a system, generally designated by reference number 2, for removing carbon dioxide from an atmosphere according to an exemplary embodiment of the present invention. The system 2 includes a solar collector 10, an optional supplemental energy source 20, a power generator 30, an air extraction system 42 and a collection system 50. Each of these components of the system 1 is explained in detail below.

The solar collector 10 is not a feature of this invention and is well-known to the art. For example, concentrating solar power parabolic mirrors, and concentrating solar power towers. As is known in the art, the solar collector 10 converts solar energy to thermal energy, which may be used to heat a working fluid to drive the power generator 30, via line 20031. Residual thermal energy (i.e., process heat) may be used to drive the air extraction system 42, via line 20032, and/or the collection system 50, via line 20033. For example, any process heat left over after the primary use of the solar heat can be used to improve the efficiency of chemical and/or physical reactions used in the air extraction system 42 to absorb $CO_2$ from the air and/or to drive off the $CO_2$ from the medium.

The power generator 30 may be, for example, a thermal power electric generator that converts the thermal energy provided by the solar collector to electricity. Addition, the thermal energy provided by the solar collector 10 can be supplemented by energy generated by the supplemental energy source 20.

Moreover, as described above, "process heat" may be provided from the use of sources of energy to produce products other than power or electrical generation. For example, in a co-generation system, primary processing such as chemical processing, production of cement, steel or aluminum, refining, production of energy products like coal and liquid energy products, may use heat to drive the primary processing, and the unused heat remaining after the primary processing or created during the primary processing would be the process heat of such processing, and can be used in a system or method according to the principles of the present invention.

Figure 3:
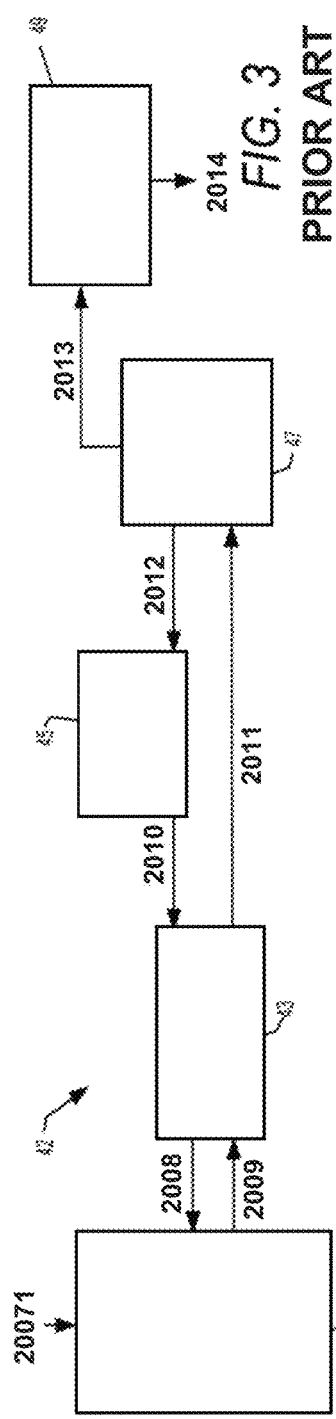

FIG. 3 is a block diagram of the air extractor system 42 useable with the system 2 according to an exemplary embodiment of the present invention. The air extractor system 42 includes an air contactor 41, a causticizer 43, a slaker 45, a calciner 47 and a capture unit 49. The air contactor 41 may use a sorbent material to selectively capture $CO_2$ from the air, and may be composed of a sorbent material which readily absorbs/binds $CO_2$ from the air may be an amine that can operate (e.g. capture $CO_2$, and be processed to collect the $CO_2$ and regenerate the sorbent) at relatively low temperature (e.g. below about 120° C.) or sodium hydroxide (NaOH) which would operate at significantly higher temperature. As known in the art, amine-enriched solid sorbents may be used to absorb/bind $CO_2$. Preferably, the sorbent material is regenerated and the capture method requires less than about 100-120° C. heat to regenerate the sorbent material. Thus, the preferred sorbent material is an amine.

The capture unit 49 may also compress the captured $CO_2$ to liquid form so that the $CO_2$ can be more easily sequestered.

The collection system 50, receiving $CO_2$ through line 2014, isolates the removed carbon dioxide to a location for at least one of sequestration, storage and generation of a renewable carbon fuel or the generation of a non-fuel product such as fertilizer and construction materials. The collection system 50 may use any known or future-discovered carbon, sequestration and/or storing techniques, such as, for example, injection into geologic formations or mineral sequestration. In the case of injection, the captured $CO_2$ may be sequestered in geologic formations such as, for example, oil and gas reservoirs, unmineable coal seams and deep saline reservoirs. In this regard, in many cases, injection of $CO_2$ into a geologic formation may enhance the recovery of hydrocarbons, providing the value-added byproducts that can offset the cost of $CO_2$ capture and collection. For example, injection of $CO_2$ into an oil or natural gas reservoir pushes out the product in a process known as enhanced oil recovery. The captured $CO_2$ may be sequestered underground, and according to at least one embodiment of the invention at a remote site upwind from the other components of the system 2 so that any leakage from the site is re-captured by the system 2.

Among the various classes of solid $CO_2$ adsorbents, supported amities have many promising features, such as operation at low temperatures (ambient—120° C.). In addition, they have strong $CO_2$ sorbent interactions (50-105 kJ/mol), acting as unique, low temperature chemisorbants [4]. In contrast, most other low temperature adsorbents such as zeolites, carbons and (some) MOFs rely on weaker, physisorption interactions, making water, a common component in flue gas, out-compete $CO_2$ for adsorption sites in many cases. Indeed, there are over 70 publications in the open literature that explore the $CO_2$-adsorption properties of supported amine adsorbents.

Supported amine $CO_2$ sorbents are most effectively regenerated in a temperature swing process, as significant energy is necessary to break the amine-$CO_2$ bonds. As noted above, this has most often been achieved in literature reports by providing two driving forces for desorption, (i) a partial pressure driving force by passing a $CO_2$-free, inert gas flow over the sample, and (ii) a heat input, usually in the form of a thermally heated reactor. Two more practical approaches to achieve sorbent regeneration are (i) heating the sorbent in a pure, heated $CO_2$ stream and (ii) steam stripping. In the former case, the only driving force for desorption is thermal, and the significant gas phase $CO_2$ pressure severely limits how much $CO_2$ will desorb. It has been shown that such an approach can also lead to significant deactivation of the amines via urea formation, Drage, T. C., et al, *Thermal stability of polyethyleneimine based carbon dioxide adsorbents and its influence on selection of regeneration strategies*. Microporous Mesoporous Mat., 2008. 116: p. 504-512. Nonetheless, this approach could be useful because it generates a pure $CO_2$ stream for sequestration or other uses.

It is now seen that the second approach, steam stripping, is potentially much more promising in the context of low temperature $CO_2$ capture from the atmosphere. Steam stripping provides both (i) a thermal driving force for desorption and (ii) a partial pressure driving force, as in the case of inert gas temperature swing. More importantly, the product stream, containing only $CO_2$ and water, can be easily purified by compression, removing the water as a liquid to produce a highly concentrated $CO_2$ gas stream, suitable for sequestration or other use. Furthermore, low grade, low cost steam (saturated, 105° C.—effectively low value, waste heat from most processes) can be sufficient to remove $CO_2$ from the solid sorbent. It can now be demonstrated for the first time that steam-stripping is a generally useful approach for regenerating various $CO_2$-saturated supported amine adsorbents in a practical way.

There are three classes of useful supported amine sorbents. Class 1 adsorbents are based on porous supports impregnated with monomeric or polymeric amines (Figure X). The amine species are thus physically loaded onto or into the support. This class of sorbents was pioneered by Song and is described in the technical literature, for example in Xu, X. C., et al., *Preparation and characterization of novel CO2 "molecular basket" adsorbents based on polymer-modified mesoporous molecular sieve MCM-41*. Microporous Mesoporous Mat., 2003. 62(1-2): p. 29-45 and Xu, X. C., of al., *Influence of moisture on CO2 separation from gas mixture by a nanoporous adsorbent based on polyethylenimine-modified molecular sieve MCM-41*. Ind. Eng. Chem. Res., 2005. 44(21): p. 8113-8119 and Xu, X. C., et al., *Novel polyethylenimine-modified mesoporous molecular sieve of MCM-41 type as high-capacity adsorbent for CO2 capture*. Energy Fuels, 2002. 16(6): p. 1463-1469. Class 2 adsorbents are based on amines that are covalently linked to the solid support. This has most often been achieved by binding amines to oxides via the use of silane chemistry or via preparation of polymeric supports with amine-containing side chains. Class 3 adsorbents are based on porous supports upon which aminopolymers are polymerized in-situ, starting from an amine-containing monomer. This Class 3 type was described for use as adsorbents for $CO_2$ capture by Hicks, J. C., et al., *Designing adsorbents for CO2 capture from flue gas-hyperbranched aminosilicas capable, of capturing CO2 reversibly*. J. Am. Chem. Soc., 2008. 130(10): p. 2902-2903. and by Drese, J. H., et al., *Synthesis-Structure-Property Relationships for Hyperbranched Aminosilica CO2 Adsorbents*. Adv. Funct. Mater., 2009. 19(23): p. 3821-3832. Representative examples of each of these adsorbent classes were prepared for $CO_2$ capture and steam-regeneration studies.

The Class 1 adsorbent contained low molecular weight Polyethylene Imine ("PEI"), on a commercial, porous particulate silica support, from PQ Corporation. The PEI loading was 35% by weight, as measured by thermogravimetric analysis (TGA). The Class 2 adsorbent was obtained by grafting 3-aminopropyltrimethoxysilane, in a Toluene carrier, to another fraction of the same silica support (PQ-Mono). The organic loading, as determined by TGA, was 13% by weight. The Class 3 adsorbent was obtained via the hyperbranching, in-situ polymerization of aziridine on a mesocellular silica foam support, in a Toluene carrier, yielding an organic loading of 19%. See FIG. 13 for schematic diagrams of the porous substrate with the supported amine adsorbent, in the pores of each substrate, respectively, I, II and III. Useful porous silica supports are also commercially available in monolithic, but thin, structures form, from Corning, for example.

The three supported amine adsorbents were subjected to cyclic adsorption and desorption tests using $CO_2$ diluted in nitrogen as the test gas, followed by regeneration of the sorbents by contacting the supported adsorbents with a 103° C. saturated steam flow of 1.2 g/min for 25 minutes in the jacketed reactor vessel. The $CO_2$-steam mixture produced was subsequently carried to a Horiba IR-based $CO_2$ detector by a nitrogen purge. FIG. 14 shows a schematic of this experimental apparatus. FIG. 15 depicts a typical $CO_2$ desorption profile, in this case for the Class 1 adsorbent, PEI on a particulate PQ Corporation porous silica substrate. The adsorbents were exposed to a water-saturated, $CO_2$-containing feed stream until adsorbent saturation occurred. Subsequently, the jacket around the reactor was filled with propylene glycol-water solution at 105° C. to limit steam condensation on the walls and then saturated steam (at about 103° C.) was introduced into the reactor from the autoclave so as to pass through the supported adsorbent to strip the $CO_2$. The steam effluent showed a very sharp increase in the $CO_2$ concentration, with the $CO_2$ concentration in the effluent dropping back to essentially zero within 10 minutes. As can be seen by the desorption trace in FIG. 15, the vast majority (66%) of the $CO_2$ was removed in the first 3 minutes at a sample temperature of 104° C. These data clearly show that low temperature steam-stripping is effective for regenerating these supported amine adsorbents.

The data in Table 1, below, show that all three classes of adsorbents show some level of stability in the cyclic adsorption/regeneration tests using steam-stripping. Interestingly, the Class 1 adsorbent appeared to be quite stable under the steam-stripping conditions used here. In other work, higher temperature inert gas temperature swing desorption, stability was less than what would be desired during multiple regeneration cycles with Class 1 adsorbents. It might be anticipated that these materials could be the least stable of the three classes of adsorbents under steam-stripping conditions, due to the lack of covalent bonds between the aminopolymer and the support and the measurable solubility of low molecular weight PEI in water. Assuming some steam would condense on the sorbent while transferring heat to the sample, one might infer that some PEI can be washed out of the sample, as was observed in some earlier cases. However, these data suggest that for at least the three cycles shown here, Class 1 samples can be quite stable.

TABLE 1

$CO_2$ capacity stability of various supported amine $CO_2$ adsorbents in multi-cycles using steam-stripping for sorbent regeneration.

| Sample | Capacity Cycle 1[a] | Capacity Cycle 2[a] | Capacity Cycle 3[a] |
|---|---|---|---|
| Class 1 | 100% | 103% | 98% |
| Class 2 | 100% | 94% | 83% |
| Class 3 | 100% | 115% | 103% |

[a]Capacities are normalized to the initial capacity found in the first experiment.

The Class 3 adsorbent also appears to be stable over three runs with the conditions used. The adsorption capacities in runs 2 and 3 that are larger than the initial run are suggestive of some polymer restructuring during the cycles. The Class 2 adsorbent appeared to lose some of its capacity over the three cycles. At first glance, this is surprising, as one might surmise that these samples should be the most robust, owing to the covalent Si—C bond connecting the amines to the oxide framework. Nonetheless, even this sample showed significant recyclability, and the slight decrease observed here should not be construed as indicative of the overall stability of this class of materials. In total, these data illustrate a simple but important point: for all the classes of supported amine $CO_2$ adsorbents, there is potential for development of materials that will be stable during regeneration via steam stripping.

The following procedures can be followed to provide amine sorbent supported on commercial particulate silica supplied by the PQ Corporation (PQ-9023) or on mesocellular foam. For the preparation of all the adsorbents, the silica substrate was first dried under vacuum at 100° C. for 24 hrs. to remove absorbed water on the surface before use. A commercial particulate silica supplied by the PQ Corporation (PQ-9023) and a lab-synthesized mesocellular foam were used as supports. The commercial silica is characterized by a surface area of 303 $m^2$/g, an average pore volume of 1.64 cc/g. and an average pore diameter of 60 nm. The mesocellular foam was prepared following a literature methodology, Wystrach, V. P., D. W. Kaiser, and F. C. Schaefer, *PREPARATION OF ETHYLENIMINE AND TRIETHYLENEMELAMINE*. J. Am. Chem. Soc., 1955. 77(22): p. 5915-5918. Specifically, in a typical synthesis, 16 g of Pluronic P123 EO-PO-EO triblock copolymer (Sigma-Aldrich) was used as template agent and dissolved in 260 g DI-water with 47.1 g concentrated HCl. Then 16 g of trimethylbenzene (TMB, 97%, Aldrich) was added at 40° C. and stirred for 2 hrs before 34.6 g tetraethyl orthosilicate (98%, Aldrich) was added to the solution. The solution was kept at 40° C. for 20 hrs before 184 mg $NH_4F$ (in 20 mL water) was added. The mixture is later aged at 100° C. for another 24 hrs. The resulting silica was filtered, washed with water, dried in oven, and calcined at 550° C. in air for 6 hr to remove the organic template before further use. The mesocellular foam silica is characterized by a surface area of 615 $m^2$/g, an average pore volume of 2.64 cc/g and average window and cell diameters of 12 nm and 50 nm.

For the preparation of the Class 1 adsorbent, 1.8 g low molecule-weight poly(ethylenimine) (PEI, MN~600, Mw~800, Aldrich) and 90 mL methanol (99.8%, Aldrich) were mixed first in a 150 mL flask for 1 hr. Subsequently, 3 g of amorphous particulate silica (PQ Corporation, PD-09023) was added and stirred for an additional 12 hrs. The methanol solvent was later removed by rotavap, and the resulting supported adsorbent ("PQ-PEI") was further dried under vacuum at 75° C. overnight before testing.

For preparation of the Class 2 adsorbent, 90 mL anhydrous toluene (99.5%, Aldrich) and 3 g of particulate silica (PQ Corporation) was mixed in a 150 mL pressure vessel for 1 hr, then 3 g of 3-aminopropyltrimethoxysilane (APTMS, Aldrich) was added into the mixture. The mixture was kept under vigorous stirring for 24 hr at room temperature. The resulting supported adsorbent (PQ-Mono) was recovered by filtration, washed with toluene and acetone, and then dried overnight, under vacuum, at 75° C.

For the Class 3 adsorbent, particulate mesocellular silica foam (MCF) was reacted with aziridine (a highly reactive but toxic material) in a similar manner as reported in the literature (Hicks, J. C., et al., *Designing adsorbents for CO2 capture from flue gas-hyperbranched aminosilicas capable, of capturing CO2 reversibly*. J. Am. Chem. Soc., 2008. 130(10): p. 2902-2903). For this synthesis, 3 g of MCF was dispersed in 90 mL toluene in a 150 mL pressure vessel and the mixture was stirred for 1 hr before adding 6 g aziridine (which was synthesized in accordance with the following procedure, Wystrach, V. P., D. W. Kaiser, and F. C. Schaefer, *PREPARATION OF ETHYLENIMINE AND TRIETHYLENEMELAMINE*. J. Am. Chem. Soc., 1955. 77(22): p. 5915-5918), immediately before use. After continuous stirring for 24 hr, the resulting supported adsorbent (MCF-HAS) was filtered, washed with toluene and ethanol, and dried overnight under vacuum at 75° C.

Steam-stripping and adsorption of $CO_2$ from the atmosphere was carried out over several cycles to test the durability of the different forms of sorbent used. In each case, in the apparatus of FIG. 14, the $CO_2$-containing gas stream (a mixture of $N_2$ and $CO_2$) was passed over 2 g of the supported sorbent at substantially ambient temperature, i.e., about 20° C., until adsorbent saturation is reached; and the adsorbent was subjected to steam stripping. Testing apparatus (FIG. 14) was designed and built to allow for the evaluation of steam-stripping sorbent regeneration over multiple cycles. Regeneration of the supported sorbents is carried out by contacting the supported saturated adsorbents with 103° C. saturated steam, flowing at 1.2 g/min for 25 minutes. The $CO_2$-steam mixture effluent is then carried to a Horiba IR-based $CO_2$ detector by a nitrogen purge [99], for quantification. It should be noted that this nitrogen purge facilitates quantification of the $CO_2$ and is not necessary in a practical device, thus a true concentration of $CO_2$ can be achieved by condensation of the water in the gas stream, achieving a concentrated $CO_2$ stream as a product.

In regards to mineral sequestration, $CO_2$ may be sequestered by a carbonation reaction with calcium and magnesium silicates, which occur naturally as mineral deposits. For example, as shown in reactions (1) and (2) below, $CO_2$ may be reacted with forsterite and serpentine, which produces solid calcium and magnesium carbonates in an exothermic reaction.

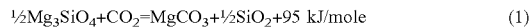

$$\tfrac{1}{2}Mg_3SiO_4+CO_2=MgCO_3+\tfrac{1}{2}SiO_2+95 \text{ kJ/mole} \qquad (1)$$

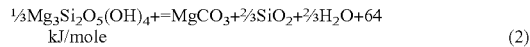

$$\tfrac{1}{3}Mg_3Si_2O_5(OH)_4+=MgCO_3+\tfrac{2}{3}SiO_2+\tfrac{2}{3}H_2O+64 \text{ kJ/mole} \qquad (2)$$

Both of these reactions are favored at low temperatures, which favor an amine as the sorbent. In this regard, both the air capture and air sequestration processes described herein may use electricity and/or thermal energy generated by the solar collector 10 (or other renewable energy source) to drive the necessary reactions and power the appropriate system components. In an exemplary embodiment of the present invention, a high temperature carrier may be heated up to a temperature in a range of about 400° C. to about 500° C. to generate steam to run a generator for electricity, and the lower temperature and pressure steam that exits from the electrical generating turbines can be used to drive off the $CO_2$ and regenerate the sorbent (e.g., an amine at low temperatures or NaOH at higher temperatures). The temperature of the high temperature heat, the generated electricity and the temperature of the lower temperature process heat remaining after electricity production can be adjusted to produce the mix of electricity production and $CO_2$ removal that is considered optimal for a given co-generation application. In addition, in exemplary embodiments, still lower temperature process heat that emerges out of the capture and sequestration steps may be used to cool equipment used in these steps.

Figure 4:
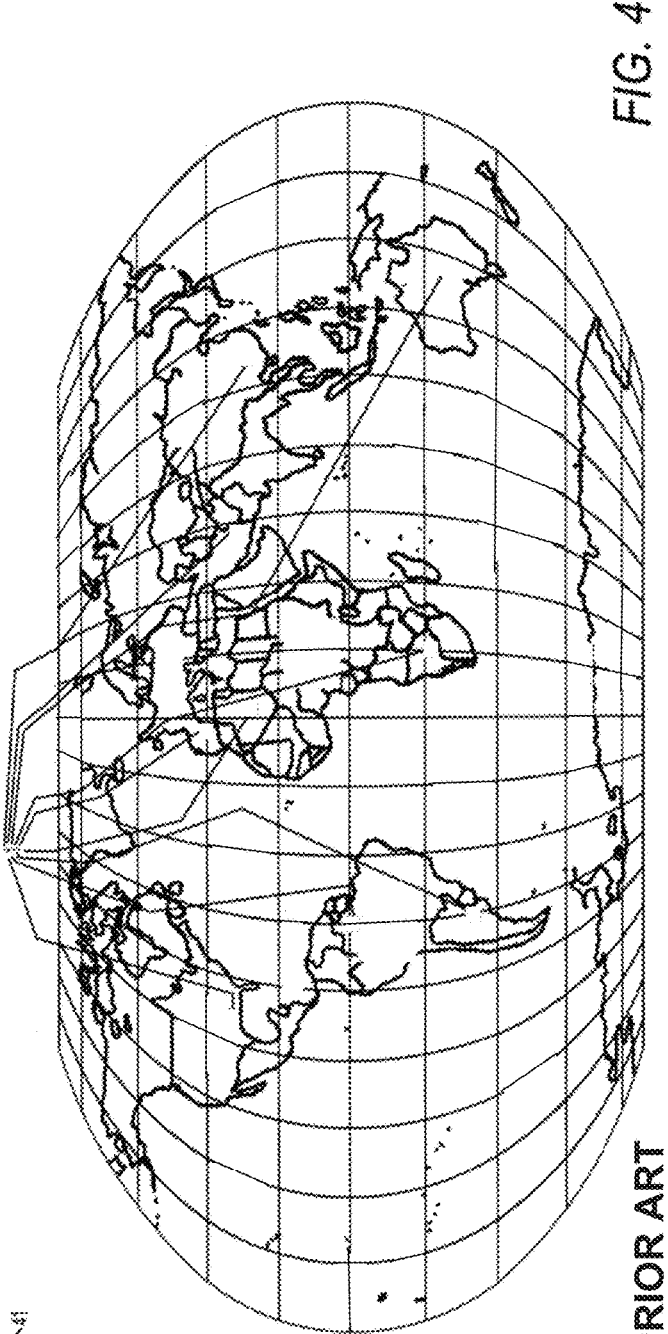

One or more systems for removing carbon dioxide from an atmosphere may be used as part of a global thermostat according to an exemplary embodiment of the present invention. By regulating the amount of carbon dioxide in the atmosphere and hence the greenhouse effect caused by carbon dioxide and other gas emissions, the system described herein may be used to alter the global average temperature. According to at least one exemplary embodiment of the present invention, several carbon dioxide capture and sequestration systems may be located at different locations across the globe so that operation of the multiple systems may be used to alter the $CO_2$ concentration in the atmosphere and thus change the greenhouse gas heating of the planet. Locations may be chosen so as to have the most effect on areas such as large industrial centers and highly populated cities, or natural point sources of $CO_2$ each of which could create locally higher concentrations of $CO_2$ that would enable more cost efficient capture. For example, as shown in FIG. 4, multiple systems 1 may be scattered across the globe, and international cooperation, including, for example, international funding and agreements, may be used to regulate the construction and control of the systems 1. In this regard, greenhouse gases concentration can be changed to alter the average global temperature of the planet to avoid cooling and warming periods, which can be destructive to human and ecological systems. During the past history of our planet, for example, there have been many periods of glaciation and rapid temperature swings that have caused destruction and even mass extinctions. Such temperature swings in the future could be a direct cause of massive damage and destabilization of human society from conflicts resulting from potential diminished resources. The global thermostat described herein may be the key to preventing such disasters in the decades to come.

Figure 5:
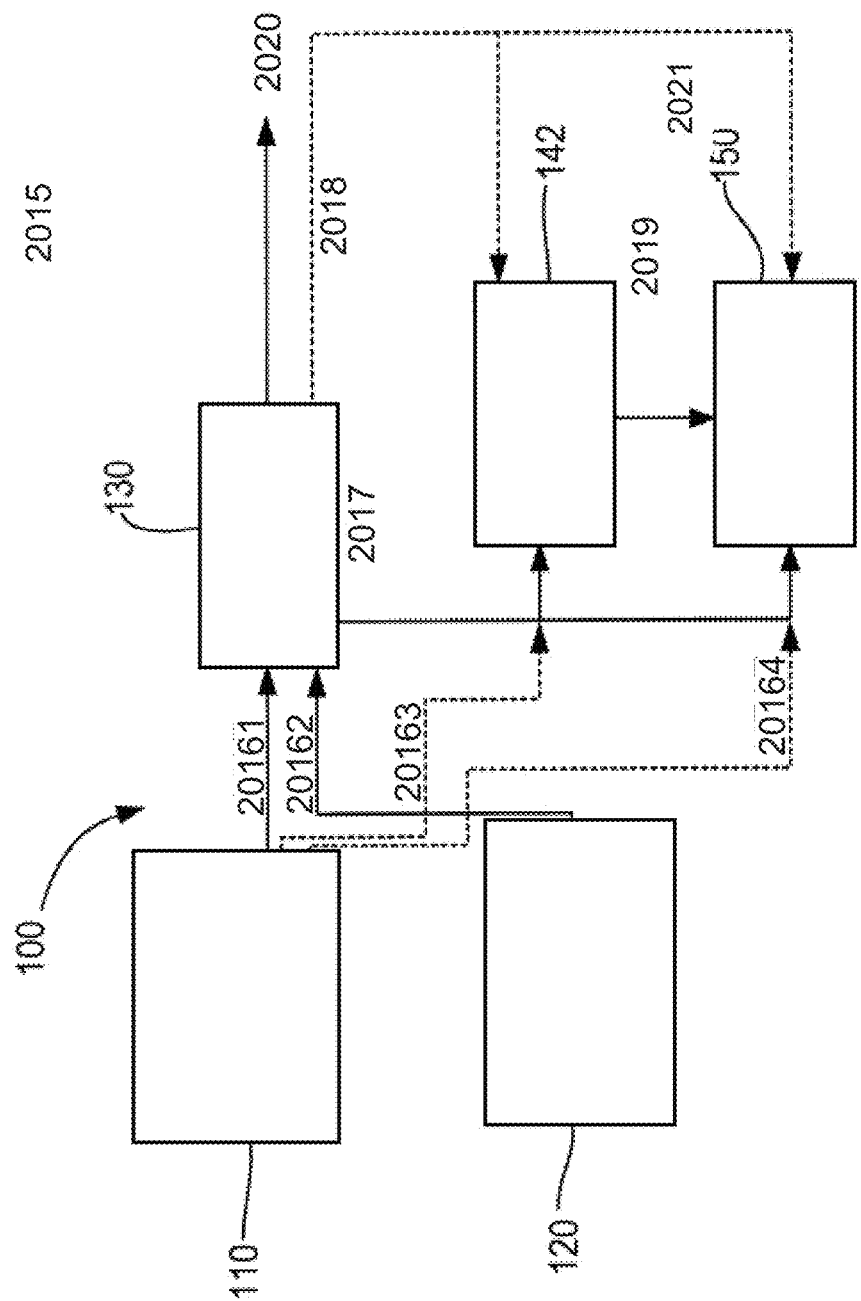

FIG. 5 is a block diagram of a system, generally designated by reference number 100, for removing carbon dioxide from an atmosphere according to another exemplary embodiment of the present invention. The system 100 includes a renewable energy source 110 (which provides Heat to the Power Generator, the Air Extraction System and the Collection System via lines 20161, 20163 and 20164, respectively, an optional supplemental energy source 120, which provides heat via line 20162 to a power generator 130, an air extraction system 142, sending carbon dioxide through line 2019 to a collection system 150. The present embodiment differs from the embodiment of FIG. 2 in that the renewable energy source 110 may be any known or future-discovered energy source besides solar, such as, for example, nuclear, geothermal, and biomass energy sources. Preferably, the renewal energy source produces thermal energy, which can be used to produce electricity and to improve the efficiency of the various chemical and/or physical reactions that take place within the air extraction system 142 and the collection system 150. In this regard, the air extraction system 142 and the collection system 150, via lines 20161, 20162, 20163 and 20164, respectively, and sending process heat via line 2017. May be the same as described with reference to the previous embodiment, or may include components according to any other known or future-discovered air extraction and collection systems. In addition, as shown in the global map of FIG. 4 with reference to the previous embodiment, a plurality of systems 100 can be strategically placed across the globe, and control of the systems 100 can be coordinated so as to collectively function as a global thermostat.

FIGS. 6-9 are schematic illustrations of several ways that carbon dioxide can be removed from an atmosphere, according to the principles of the present invention.

Figure 6:
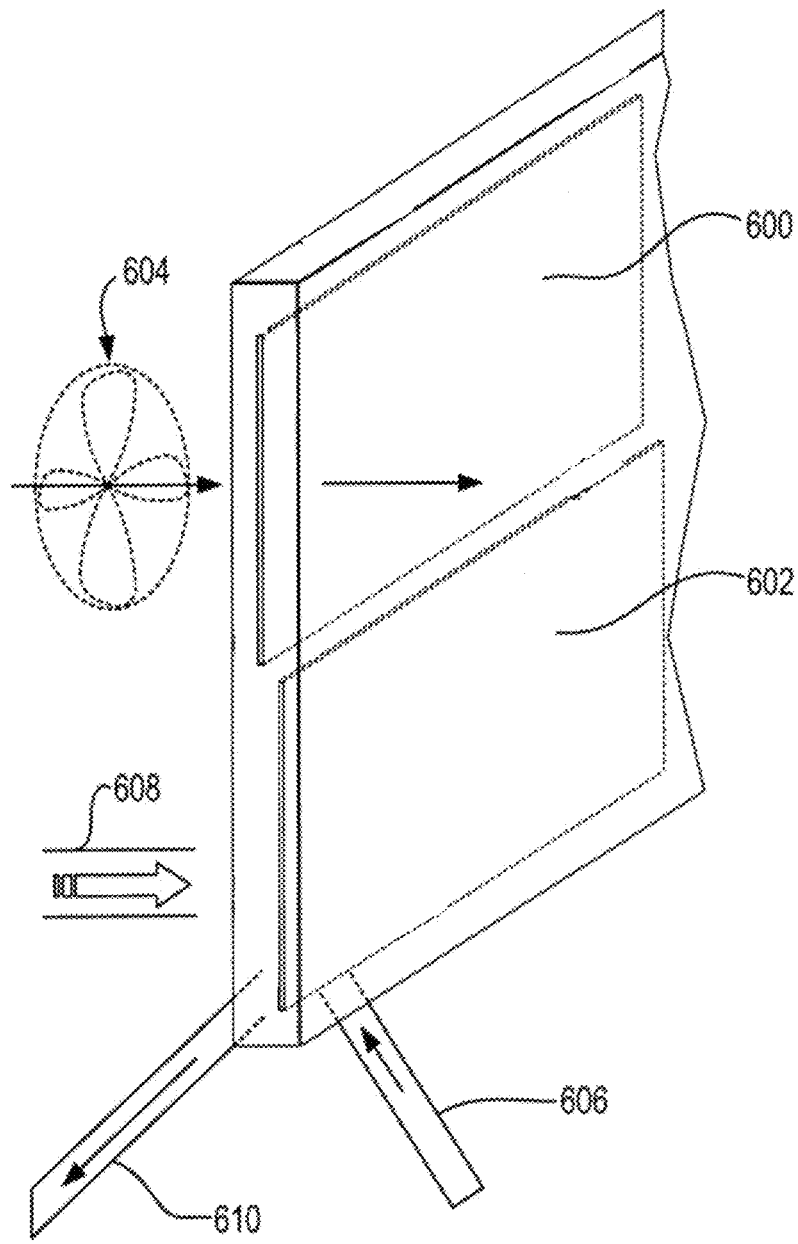

Specifically, in FIG. 6, a pair of substrates 600, 602 are illustrated, each of which has a medium (e.g. NAOH, an amine or other suitable sorbent) that can be brought into contact with an atmosphere to remove carbon dioxide from the atmosphere. The substrates 600, 602 are pancake shaped (in the sense that they are relatively large area compared to their thickness) oriented vertically, and can each be relatively large (in surface area) and relatively thin (e.g. on the order of a few millimeters, and preferably not thicker than a meter). Each substrate can move (e.g. by a pulley or hydraulic system, not shown) between an upper position in which carbon dioxide laden air is brought into contact with the medium carried by the substrate to remove carbon dioxide from the air, and a lower position in which process heat is directed at the substrate to remove carbon dioxide from the medium. The substrates 600, 602 are porous with large surface areas, so that air directed at a substrate can flow through the substrate. When a substrate is in an upper position (e.g. the position of substrate 600), carbon dioxide laden air is directed at the substrate (e.g. by a fan 604 shown in dashed lines), so that as the air flows through the substrate, the carbon dioxide contacts the medium and is substantially removed from the air. Thus, carbon dioxide laden air is directed at and through the substrate so that carbon dioxide comes into contact with the medium, carbon dioxide is substantially removed from the air by the medium, and air from which the carbon dioxide has been substantially removed is directed away from the substrate. When a substrate is moved to the lower position (e.g. the position of substrate 602), process heat is directed at the substrate (e.g. via a fluid conduit 606), and carbon dioxide is removed (drawn off) by a source of fluid that is directed at the substrate (in the direction shown by arrow 608) and a source of suction 610 by which carbon dioxide that has been removed from the medium is drawn away from the substrate. The substrates 600, 602 can alternatively move between the upper and lower positions, so that the substrate in the upper position is removing carbon dioxide from the air and carbon dioxide is being removed from the substrate in the lower position. It should be noted that rather than the fan, if there are strong winds available natural wind flows can be used to drive the air through the substrate. In addition, as described below, the fan can be replaced with a solar driven source (or by either wind or thermally-driven air currents), in which case the efficiency and cost reduction of extraction of carbon dioxide from atmospheric air can be further improved. Moreover, rather than switching the positions of the substrates, the means for generating the air flows, the flow of process heat, and the flow of carbon dioxide away from the substrate can be switched as carbon dioxide is captured from the air and then extracted from the medium, as will be readily apparent to those in the art.

Figure 7:
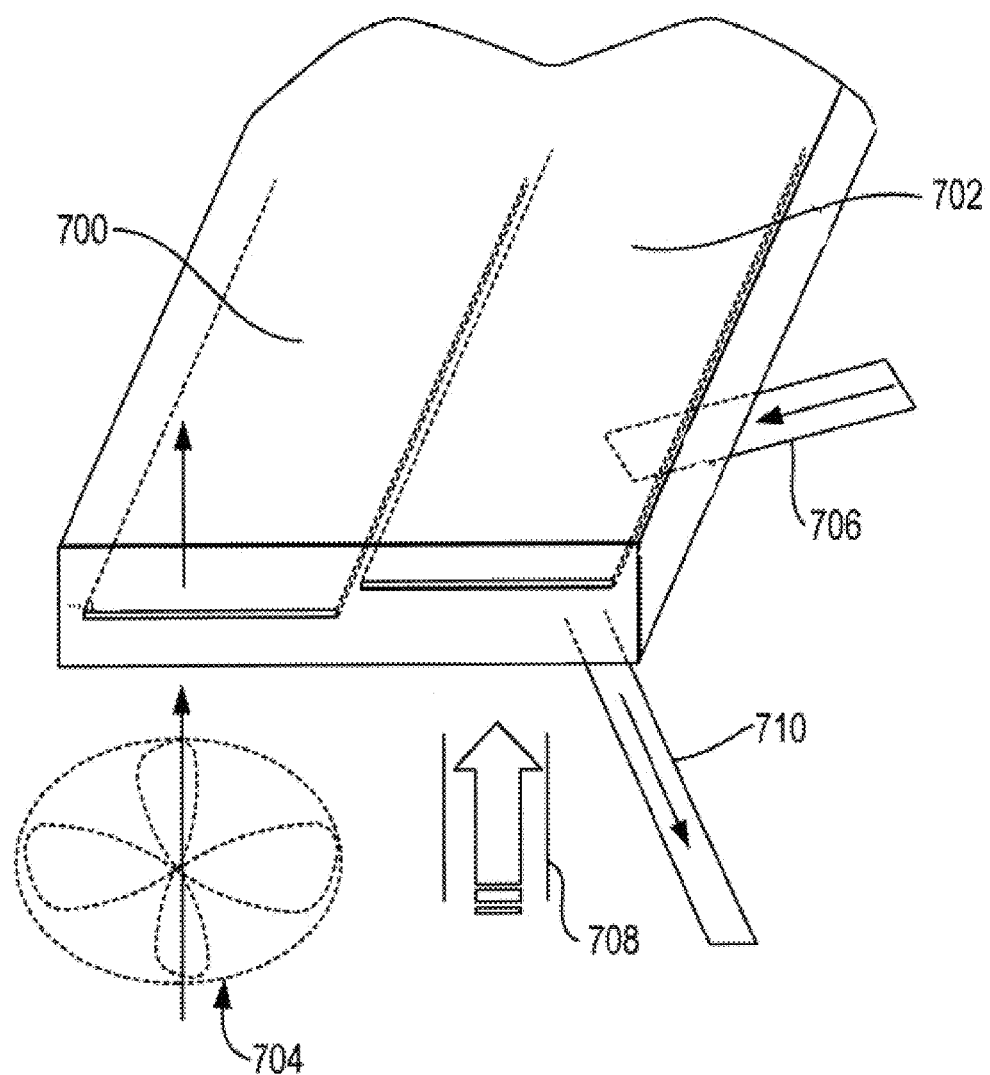

FIG. 7 is a schematic illustration of another version of a medium for removing carbon dioxide from an atmosphere and for removing carbon dioxide from the medium, according to the principles of the present invention. Specifically, in FIG. 7, a pair of substrates 700, 702 are illustrated, each of which can be the same medium as in FIG. 6, above, to remove carbon dioxide from the atmosphere. The substrates 700, 702 are oriented horizontally, and can each be relatively large (in surface area) and relatively thin (e.g. on the order of millimeters or centimeters, up to a meter). Each substrate can move horizontally (e.g. by a pulley system (not shown) between an air extraction position in which carbon dioxide laden air is brought into contact with the medium carried by the substrate to remove carbon dioxide from the air, and a carbon extraction position in which process heat is directed at the substrate to remove carbon dioxide from the medium. The substrates 700, 702 are porous, so that air directed at a substrate can flow through the substrate. When a substrate is in an air extraction position (e.g. the position of substrate 700), carbon dioxide laden air is directed at the substrate (e.g. by a fan 704 shown in dashed lines), so that as the air flows through the substrate, the carbon dioxide contacts the medium and is substantially removed from the air. Thus, carbon dioxide laden air is directed at and through the substrate so that carbon dioxide comes into contact with the medium, carbon dioxide is substantially removed from the air by the medium, and air from which the carbon dioxide has been substantially removed is directed away from the substrate. When a substrate is moved to the carbon extraction position (e.g. the position of substrate 702), process heat is directed at the substrate (e.g. via a fluid conduit 706), and carbon dioxide is removed (drawn off) by a source of fluid that is directed at the substrate (in the direction shown by arrow 708) and a source of suction 710 by which carbon dioxide that has been removed from the medium is drawn away from the substrate. The substrates 700, 702 can alternatively move between the air extraction and carbon extraction positions, so that the substrate in the air extraction position is removing carbon dioxide from the air and carbon dioxide is being removed from the substrate in the carbon extraction position. It should be noted that rather than the fan, if there are strong winds available natural wind flows can be used to drive the air through the substrate. In addition, as described below, the fan can be replaced with a solar driven source (or by either wind or thermally-driven air currents), in which case the efficiency and cost reduction of extraction of carbon dioxide from atmospheric air can be further improved. Moreover, rather than switching the positions of the substrates, the means for generating the air flows, the flow of process heat, and the flow of carbon dioxide away from the substrate can be switched as carbon dioxide is captured from the air and then extracted from the medium, as will be readily apparent to those in the art.

Figure 9:
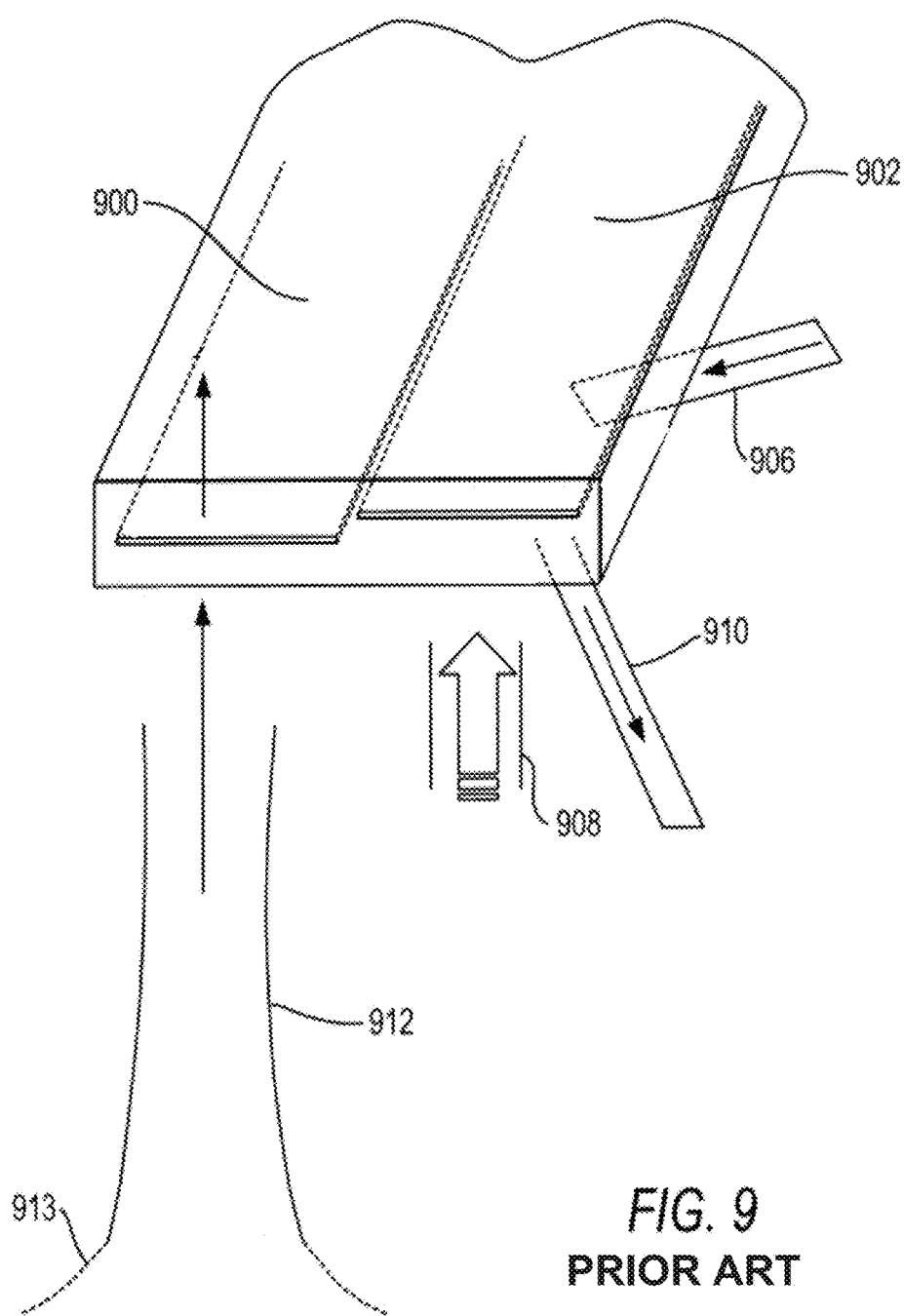

The version of the invention shown in FIG. 9 is generally similar to the horizontally oriented version of FIG. 7, but in the version of FIG. 9, rather than a fan being the source that moves the carbon laden air through the substrate in the air extraction position (e.g. substrate 900), there is a source of gas flow that is generated from a solar heating tower or chimney (shown schematically at 912 in FIG. 9). A solar chimney can be generated by heating an air mass with the sun. The solar chimney would have a "skirt" (shown in dashed lines 913 in FIG. 9) that enables the solar heated air to be concentrated in the chimney. Thus, a solar field with a solar chimney can be associated with a system and structure that removes carbon dioxide from the atmosphere and removes carbon dioxide from a medium in the manner shown and described in connection with FIG. 7. However, rather than a fan 704 as the primary driver of carbon dioxide laden air at the substrate, the carbon dioxide laden air is heated by solar energy and that air is allowed to rise in the solar funnel or tower 912. Because of the tendency for the hot air to rise, an upward draft is generated, that would carry with it carbon dioxide laden air, and the substrate 900 would be positioned in the way of that upward draft. Thus, the carbon dioxide laden air would be directed through the substrate 900 in the air extraction position, and carbon dioxide would be removed from the substrate 902 in the carbon extraction position in the same way as shown and described in connection with FIG. 7. By driving the extraction of carbon dioxide from air by solar energy, the costs of extraction are further reduced, and the overall operation is highly renewable. Of course, provision would need to be made for those periods when the sun didn't shine, and some form of driver similar to the fan 704 (FIG. 7) would be needed. But in any case, having periods in which, instead of the fan, replacing the fan with a solar driven source (or by either wind or thermally-driven air currents), the efficiency and cost reduction of extraction of carbon dioxide from atmospheric air can be further improved.

Figure 8:
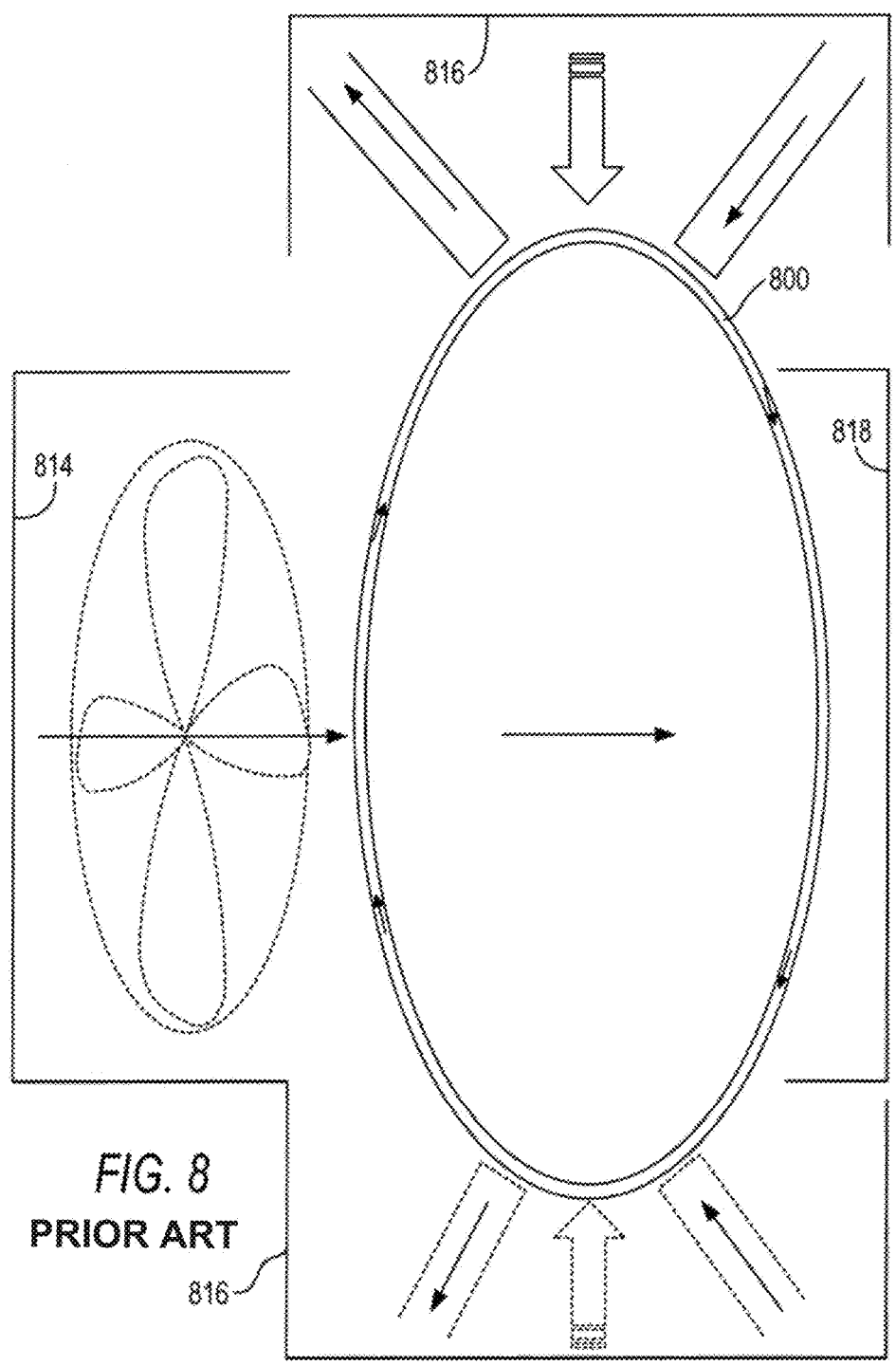

FIG. 8 is a schematic illustration of yet another version of a medium for removing carbon dioxide from an atmosphere and for removing carbon dioxide from the medium, according to the principles of the present invention. In FIG. 8, the medium from which carbon dioxide is removed from atmospheric air and from which carbon dioxide is removed from the medium is disposed on a continuously moving substrate composed, e.g., of pellets laden with the sorbent 800. The substrate moves through an air extraction zone 814, where carbon dioxide laden air is directed at and through the substrate (which is also porous as with the prior embodiments) so that carbon dioxide is removed from the air. The substrate 800 then moves to a carbon extraction zone 816, where process heat is directed at the substrate and carbon is drawn away from the substrate in the manner described above in connection with FIGS. 6, 7. Then, the substrate 800 moves to and through a heat exchange zone 818 where the temperature of the substrate is lowered (e.g. by the air that flowed through the substrate in the air extraction zone, and by any additional cooling device that may be useful in reducing the temperature of the substrate to a level that enables it to efficiently remove carbon dioxide from the air when the substrate moves back through the extraction zone 814. In addition, the system of FIG. 8 may have another carbon extraction zone 816, where process heat is directed at the substrate and carbon is drawn away from the substrate in the manner described above in connection with FIGS. 6, 7.

It should also be noted that in all of the versions of the invention described above, the removal of carbon dioxide from the air can be at least partially performed under non equilibrium conditions. Additionally, it should be noted that applicants' preferred concept for extracting carbon dioxide from the atmosphere comprises using a relatively thin, large surface area substrate with a medium (e.g. an amine) that removes carbon dioxide from the atmosphere and using process heat to remove carbon dioxide from the medium. Using a relatively large area substrate perpendicular to the direction of air flow is particularly useful, because of the relatively low concentration of carbon dioxide in the atmosphere (as opposed to the relatively high concentration that would normally be found, e.g. in flue gases).

New System, Components and Method Concepts for Removing Carbon Dioxide from Carbon Dioxide Laden Air, according to the Present Invention Sorbent Structure and General Operation of Sorbent.

FIG. 12 is a schematic illustration of a cellular, ceramic substrate structure, of a type produced by Corning under the trademark Celcor®, that can be used in a sorbent structure, in accordance with the principles of the present invention. The sorbent (e.g. an amine) is carried by (e.g. coated or otherwise immobilized on) the inside of one or more of the Celcor®, cellular ceramic substrates, which provides a high surface area and low pressure drop, as $CO_2$ laden air flows through the substrate. The sorbent structure can comprise, e.g., a plurality of the Celcor®, cellular, ceramic substrates or a single substrate, having the type of pancake shape described above in connection with FIG. 6 (i.e. surface area much greater than thickness), and the $CO_2$ laden air is directed through the cells of the sorbent structure. It is also contemplated that the sorbent structure can be formed by embedding the sorbent material in the Celcor® cellular, ceramic structure to form a monolithic sorbent structure.

In addition, it should be noted that the substrate, while preferably ceramic, an inorganic material, can be an organic material.

$CO_2$ laden air is passed through the sorbent structure, which is preferably pancake shaped, and the sorbent structure binds the $CO_2$ until the sorbent structure reaches a specified saturation level, or the $CO_2$ level at the exit of the sorbent structure reaches a specified value denoting that $CO_2$ breakthrough has started ($CO_2$ breakthrough means that the sorbent structure is saturated enough with $CO_2$ that a significant amount of additional $CO_2$ is not being captured by the sorbent structure). Systems for measuring $CO_2$ concentration are well-known.

When it is desired to remove and collect $CO_2$ from the sorbent structure (and regenerate the sorbent structure), in a manner described further below in connection with FIGS. 10a-h, the sorbent structure is removed from the carbon dioxide laden air stream and isolated from the air stream and from other sources of air ingress. Steam is then passed through the sorbent structure. The steam will initially condense and transfer its latent heat of condensation to the sorbent structure. Eventually the sorbent structure will reach saturation temperature and the steam will pass through the sorbent structure without condensing. As the condensate and then the steam pass through and heat the sorbent structure the $CO_2$ that was captured by the sorbent structure will be liberated from the sorbent structure producing more condensed water in providing the needed heat of reaction to liberate the $CO_2$ from the sorbent structure and be pushed out of the sorbent structure by the steam or extracted by a fan/pump. Thus, the steam that is passed through the sorbent structure and releases the $CO_2$ from the sorbent, and for energy efficiency cost reasons one would want to minimize the amount of steam used and that is mixed in with the $CO_2$. Thus, whatever is (or can be) condensed upon exiting the regeneration chamber and the condensate can be added to that generated in the regeneration chamber, and recycled to be heat and converted back into steam for use. This technique is referred to as "steam stripping" and is also described further below.

Vertical Elevator Concept of FIGS. 10a-10f, and 10h

FIGS. 10a, 10b-1, 2 are schematic illustrations of structure and method concepts that further develop the principles by which carbon dioxide can be removed from $CO_2$ laden air, according to the principles of the present invention. FIGS. 10c-h. FIGS. 10a and 10b-1, 2 differ in that in FIG. 10a the Absorption Time is significantly greater than Regeneration Time, but in FIG. 10b-1, 2, Absorption Time approximately equal to Regeneration Time.

Specifically, in FIG. 10a, a rectangular carbon dioxide capture structure 1000 is illustrated, which has a sorbent structure, as described herein, that can be brought into contact with $CO_2$ laden air to remove carbon dioxide from the $CO_2$ laden air. The rectangular carbon dioxide capture medium is similar to the pancake shaped substrates of FIG. 6, above. The improved carbon dioxide capture structure 1000 comprises a top member 1002 that is preferably a solid metal plate, and a sorbent structure 1004 depending from the top member 1002, and held in place by only vertical bars (for support) elsewhere, so that the sorbent medium is open to the atmosphere on remaining four (4) sides. The support is preferably formed of stainless steel. When located in a stream of $CO_2$ laden air, the sorbent structure 1004 is open to $CO_2$ laden air stream on the large area faces through which the air is directed by the fan or prevailing wind 2049 and carries the sorbent that binds to carbon dioxide flowing through the sorbent structure, to capture carbon dioxide from a flow of carbon dioxide laden air that is directed through the sorbent structure. The sorbent structure 1004 provides a high surface area and low pressure drop, as $CO_2$ laden air flows through the sorbent structure 1004.

The carbon dioxide capture structure 1000 is supported for vertical movement by an elevator structure, shown and described in overview in connection with FIGS. 10*a* and 10*b*-1, 2, and whose details are further described and shown in connection with FIGS. 10*c*-*f* and 10*h*. As shown in FIG. 10*a*, a hydraulic cylinder 1006 is connected via a piston and rods 2034, 2059 with the top plate 1002 and the piston is moveable in a structural frame 1008 that protects the hydraulic cylinder from the ambient environment. The hydraulic cylinder 1006 can selectively move the carbon dioxide capture structure 1000 between a carbon dioxide capture position that is in line with a flow of carbon dioxide laden air 2024, 2049, and a regeneration position described further below. In the carbon dioxide capture position, a flow of carbon dioxide laden air (labeled "fresh air inlet" in FIG. 10*a*) is drawn through the carbon dioxide capture structure 1000 (e.g. by means of an induced draft created by a fan 1010 driven by a motor 1012). The carbon dioxide laden air flows through the sorbent support substrate 1004 where the sorbent binds the carbon dioxide, to remove the carbon dioxide from the air, so that the air that exits the carbon dioxide capture structure 1000 is substantially depleted of carbon dioxide (preferably about 95% depleted of carbon dioxide).

The carbon dioxide capture structure 1000 can be selectively moved to a regeneration position (by the hydraulic cylinder 1006 or by a pulley system that would perform the analogous function), where carbon dioxide is separated from the sorbent structure 1004, to enable the carbon dioxide to be collected and sequestered, and to enable the sorbent structure to be regenerated, so that the sorbent structure can then be moved back to a position where it is in line with a flow of carbon dioxide laden air, to remove additional carbon dioxide from the air. A regeneration box 1014 is located below the carbon dioxide capture structure 1000. The regeneration box 1014 is preferably solid metal plate on 5 sides, and is open on top, so that when the carbon dioxide capture structure 1000 is lowered into the box 1014, the top plate 1002 will close the top of the regeneration box 1014, creating a substantially air-tight mechanical seal with the top of the $CO_2$ Regeneration Box.

The regeneration box 1014 is well insulated for heat conservation purposes and can be selectively heated by a flow of process heat (preferably from a co-generation system and process, as described further herein). As the regeneration box 1014 is heated (preferably by the steam stripping process described herein), the carbon dioxide is separated from the sorbent structure, and is drawn off so that the carbon dioxide can be sequestered. As the carbon dioxide is separated from the sorbent structure, and drawn from the regeneration box 1014, the sorbent structure is regenerated, so that the carbon dioxide capture structure 1000 can be moved to the position in which it is in line with a flow of carbon dioxide laden air, to remove carbon dioxide from the carbon dioxide laden air.

FIG. 10*b*-1, 2 schematically illustrates an alternative to the structure and technique of FIG. 10*a*, in that a pair of carbon dioxide capture structures 1000 are provided, each of which is configured in accordance with the carbon dioxide capture structure of FIG. 10*a*, and each of which is moved by a hydraulic cylinder 1002 between a carbon capture position in which the carbon capture structure is in line with a flow of carbon laden air, and a regeneration position in which the carbon dioxide capture structure is lowered into a regeneration box 1014 that is configured like, and operates in a similar manner to, the regeneration box 1014 of FIG. 10*a*. The only essential different between the carbon capture structure and technique of FIGS. 10*b*-1, 2 and 10*b*-1, 2, is that in FIG. 10*b*-1, 2, one carbon dioxide capture structure can always be in line with a flow of carbon dioxide laden air while the other carbon dioxide capture structure is being regenerated in the manner described above in connection with FIG. 10*a*. Thus, in FIG. 10*b*-1, 2 (and in a manner similar to that shown in FIG. 6), when a first carbon dioxide capture structure 1000 is in an upper position (e.g. the upper position shown in FIG. 10*b*-1, 2), carbon dioxide laden air is directed through a sorbent structure, so that the sorbent structure binds carbon dioxide in the carbon dioxide laden air. When the first carbon dioxide capture structure 1000 is moved to the lower position and into the regeneration box 1014, process heat is directed at the substrate, and carbon dioxide is removed (drawn off) the sorbent support structure (again preferably by the "steam stripping" process described herein). The pair of carbon dioxide capture structures 1000 can alternatively move between the upper and lower positions, so that the carbon dioxide capture structure in the upper position is removing carbon dioxide from the carbon dioxide laden air and carbon dioxide is being removed from the sorbent structure that is in the lower position.

While FIGS. 10*a* and 10*b*-1, 2 each shows a single sorbent structure for removing carbon dioxide from carbon dioxide laden air and for regenerating a carbon dioxide sorbent structure (such sorbent structure sometimes referred to herein as a Unit, in practice a global thermostat system would have a number of Units, each of which is configured and operates in accordance with the structures and techniques described above, as will be clear to those in the art. Moreover, 10*h* shows and describes the elevator structure in additional detail, and as shown in FIGS. 10*c*, *d*, *e* and *f*, the elevator structure can comprise, e.g., pairs of hydraulic cylinders that are located such that they do not interfere with the flow of carbon dioxide laden air through the sorbent structure.

Moreover, the following additional features of the structures and techniques of FIGS. 10*a* and 10*b*-1, 2 should also be noted.

a. Piping, valves, etc. for the Low Level Process Heat Source/Supply Header 2029 (typically Low Pressure Steam), which will most likely be a horizontal pipe rack run located underneath the horizontal row of identical Global Thermostat (GT) Units, running parallel with the "Dimension W" 2044 shown in FIGS. 10*a*, 10*b*-1, 2. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.

b. Piping, valves, etc. for the Low Level Process Heat Return Header 2027 (typically Low Pressure Steam Condensate), which will most likely be a horizontal pipe rack run located underneath the horizontal row of identical Global Thermostat (GT) Units, running parallel with the "Dimension W" shown in FIGS. 10*a*, 10*b*-1, 2. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.
  c. Piping, valves, etc. for the optional Cooling Water Supply (CWS) Header 2030, which will most likely be a horizontal pipe rack run located underneath the horizontal row of identical Global Thermostat (GT) Units, running parallel with the "Dimension W" shown in FIGS. 10*a*, 10*b*-1, 2. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.
  d. Piping, valves, etc. for the optional Cooling Water Return (CWR) Header 2028, which will most likely be a horizontal pipe rack run located underneath the horizontal row of identical Global Thermostat (GT) Units, running parallel with the "Dimension W" shown in FIGS. 10*a*, 10*b*-1, 2. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.
  e. Piping, valves, etc. for the $CO_2$ (>95.00 mole %) to $CO_2$ Product Storage Header 2026, which will most likely be a horizontal pipe rack run located underneath the horizontal row of identical Global Thermostat (GT) Units, running parallel with the "Dimension W" shown in FIGS. 10*a*, 10*b*-1, 2. If the number of Global Thermostat (GT) Units is also expanded vertically upward, by building a structure with additional platform levels at the appropriate elevations, there will also be a vertical header, or vertical pipe rack run, located at the very end of the horizontal row of identical GT Units, adjacent to the structure containing the additional platform levels at the appropriate elevations.
  f. The $CO_2$ Receiving/Storage Vessel 2026, and any and all equipment required to connect to, or tie-in to, a high pressure $CO_2$ disposal pipeline.
  g. Supply and Return tie-ins (piping, valves, etc.) 2029 to the Low Level Process Heat Source at the existing industrial facility (Power Plant, Chemical Plant, or Refinery, etc.), which would most likely be ordinary low pressure steam supply/low pressure steam condensate return 2027.
  h. Supply and Return tie-ins (piping, valves, etc.) to the Low Level Cooling Source at the existing industrial facility (Power Plant, Chemical Plant, or Refinery, etc.), which would most likely be ordinary or common cooling water supply (CWS)/cooling water return (CWR) 2030/2028.
  i. All instrumentation, all electrical facilities (such as substations, wiring, etc.), all general utility connections (such as instrument air, potable water, etc.), all safety and shutdown systems, etc. This would also include a Control House, with a typical Computer Data Logger/Computer Control System.
  j. All of the block valves shown in FIGS. 10*a*, 10*b*-1, 2 will be specified to be either "minimal leakage" or TSO (tight shut-off) block valves, whichever is most practical or most feasible.
  k. All of the block valves shown FIGS. 10*a*, 10*b*-1, 2 will be fully automated block valves (either motorized, hydraulically, or pneumatically operated). All of these block valves will be interlocked together by a timer/sequencer system that is computer controlled. The Hydraulic Fluid Pump(s) and the $CO_2$ Product/Recycle Gas Blower(s) will also be connected to, and interlocked by, the timer/sequencer system that is computer controlled.
  l. While the preferred sorbent structure described herein comprises a sorbent material (i.e. an amine) that is carried by (e.g. coated or otherwise immobilized on) the inside of Celcor® cellular substrate, it is contemplated that the sorbent structure can also be formed by embedding the sorbent material in the Celcor® cellular structure to form a monolithic sorbent structure,
  m. It is recognized that it may be important to remove oxygen from the environment about the hot sorbent structure, both before and after regeneration of the sorbent structure, to avoid oxygen contamination of the sorbent structure (which would result from oxygen poisoning the sorbent structure by oxidizing the sorbent structure). The manner in which removal of oxygen can be handled is described below in connection with a technique referred to as "steam stripping with purge gas".

Steam Stripping

There are 2 techniques that are contemplated for the steam stripping process. One technique is referred to as "steam stripping with steam only". The other technique is referred to as "steam stripping with purge gas". Both techniques utilize system components and process steps that are schematically shown in FIG. 10*g*.

The technique referred to as "steam stripping with steam only" works in the following way:
  a. Air is passed through the channels in the sorbent structure and the $CO_2$ is removed from the air by the sorbent structure until the sorbent structure reaches a specified saturation level or the $CO_2$ level at the exit of the sorbent structure reaches a specified value denoting that $CO_2$ breakthrough has started, or for a specified time period determined by testing.
  b. The sorbent structure is removed from the air stream and isolated from the air flow and from air ingress and $CO_2$ migration to the outside air, when placed in its $CO_2$ removal position 2105.
  c. Low pressure steam 2100 is passed through the channels in the sorbent structure 2105. The steam will initially condense and transfer its latent heat of condensation to the sorbent structure in the front part of the sorbent structure. The heat of condensation raises the temperature of the sorbent structure and provides energy to drive the $CO_2$ desorption process from the sorbent structure. Eventually the front part of the sorbent structure will reach saturation temperature and the liberated $CO_2$ will be pushed out by the steam or extracted by a fan. This process will move deeper into the sorbent structure from the front part of the sorbent structure where the steam enters until the $CO_2$ is liberated (note the fraction released will depend upon the sorbent structure and temperature of the steam used). Only an adequate amount of steam will be provided to achieve desorption of the $CO_2$ from the sorbent structure so as to minimize the steam used and minimize the amount of steam mixed in with the liberated $CO_2$). As the condensate and then the steam pass through the sorbent structure and heat the sorbent, the $CO_2$ will be liberated from the sorbent structure and be transferred into the steam and condensate. The condensate will have a limited ability to "hold" the $CO_2$ and once saturated the "sour" water will not hold any more $CO_2$ and the $CO_2$ will remain in the vapor phase as it is pushed out by the steam or extracted with a fan. Once the steam has passed through the sorbent structure it has to be condensed to liberate the $CO_2$. This is achieved in the condenser 2106 which uses cooling water 2108 to remove the heat. The collected stream will have some steam mixed in that will be minimized to the extent possible, and that steam has to be condensed to separate it from the $CO_2$. Alternatively, the steam could be condensed, using heat loss to the atmosphere, in an uninsulated pipe or a finned pipe. This heat is a loss to the system although an alternative would be to use the air exiting the sorbent structure in the adsorption step (Step 1 above) to condense the steam. This would raise the temperature of the air at the exit of the sorbent structure and provide an additional driving force to move the air through the sorbent structure and reduce the energy requirements.

d. Once the sorbent structure has had the $CO_2$ removed then the sorbent structure is raised up back into the air stream. The air will cool the sorbent structure and remove any remaining moisture. The sorbent structure will then remove the $CO_2$ until the specified breakthrough occurs (see Step 1) and the sorbent structure is then lowered into the regeneration position and the process repeated.

e. The condensate from the desorption process (removing the $CO_2$ from the sorbent structure) contains $CO_2$ at saturation levels. This condensate 2109 will be close to saturation temperature (as only sufficient steam is added to the system to achieve $CO_2$ removal) and is recycled to a boiler where low pressure steam from a facility (petrochemical plant or utility power plant) used to regenerate the steam 2098 used for heating the sorbent structure. The re-use of the $CO_2$ saturated steam eliminates the requirement to treat large quantities of acidic water.

The technique referred to as "steam stripping with purge gas" works in the following way:

a. Air is passed through the channels in the sorbent structure and the $CO_2$ is removed from the air by the sorbent structure until the sorbent structure reaches a specified saturation level or the $CO_2$ level at the exit of the sorbent structure reaches a specified value denoting that $CO_2$ breakthrough has started, or for a specified time period determined by testing.

b. The sorbent structure is removed from the air stream and isolated from the air flow and from air ingress and $CO_2$ migration to the outside air.

c. In order to remove oxygen from the channels in the sorbent structure a purge of inert gas is passed through the sorbent structure for a short time period.

d. Low pressure steam is passed through the channels in the sorbent structure. The steam will initially condense and transfer its latent heat of condensation to the sorbent structure in the front part of the sorbent structure. The heat of condensation raises the temperature of the sorbent structure and provides energy to drive the $CO_2$ desorption process from the sorbent structure. Eventually the front part of the sorbent structure will reach saturation temperature and the liberated $CO_2$ will be pushed out by the steam or extracted by a fan. This process will move deeper into the sorbent structure from the front part of the sorbent structure where the steam enters until the $CO_2$ is liberated (note the fraction released will depend upon the sorbent structure and temperature steam used). Only an adequate amount of steam will be provided to achieve desorption of the $CO_2$ from the sorbent structure so as to minimize the steam used and minimize the amount of steam mixed in with the liberated $CO_2$). As the condensate and then the steam pass through the sorbent structure and heat the sorbent the $CO_2$ will be liberated from the sorbent structure and be transferred into the steam and condensate. The condensate will have a limited ability to "hold" the $CO_2$ and once saturated the "sour" water will not hold any more $CO_2$ and the $CO_2$ will remain in the vapor phase as it is pushed out by the steam or extracted with a fan. Once the steam has passed through the sorbent structure it has to be condensed to liberate the $CO_2$. This is achieved in the condenser 2106 which uses cooling water to remove the heat. The collected stream will have some steam mixed in that will be minimized to the extent possible, and that steam has to be condensed to separate it from the $CO_2$. Alternatively, the steam could be condensed, using heat loss to the atmosphere, in an uninsulated pipe or a finned pipe. This heat is a loss to the system although an alternative would be to use the air exiting the sorbent structure in the adsorption step (Step 1 above) to condense the steam. This would raise the temperature of the air at the exit of the sorbent structure and provide an additional driving force to move the air through the sorbent structure and reduce the energy requirements.

e. In order to cool the sorbent structure before it is replaced in the air stream an inert gas is passed through the sorbent structure until it is cooled to a specified temperature so that damage to the sorbent structure will not occur when it is placed back into the air stream.

f. Once the sorbent has had the $CO_2$ removed and the sorbent structure cooled then the sorbent structure is raised up back into the air stream. The air will continue to cool the sorbent structure and remove any remaining moisture. The sorbent structure will then remove the $CO_2$ until the specified breakthrough occurs (see Step 1) and the sorbent structure is then lowered into the regeneration position and the process repeated.

g. The condensate from the desorption process (removing the $CO_2$ from the sorbent structure) contains $CO_2$ at saturation levels. This condensate will be close to saturation temperature (as only sufficient steam is added to the system to achieve $CO_2$ removal) and is recycled to a boiler 2100 where low pressure steam from a facility (petrochemical plant or utility power plant) is used to regenerate the steam used for heating the sorbent structure. The re-use of the $CO_2$ saturated steam eliminates the requirement to treat large quantities of acidic water.

It should be noted that in each of the steam stripping techniques described above, there are two closed steam loops connected by a heat exchanger. One steam loop supplies the process heat and returns to the boiler hot condensate that results from heating the loop that does the steam stripping. The other steam loop is the steam loop that does the steam stripping and regeneration of the sorbent structure.

Steam stripping, as described above, would be performed in the foregoing manner while the sorbent structure is disposed in the regeneration box 1014 shown and described in connection with FIGS. 10*a*, 10*b*-1, 2. Once the sorbent structure has had the CO$_2$ removed then the sorbent structure is raised from the regeneration box 1014 back into the carbon dioxide laden air stream, as also shown and described in connection with FIGS. 10a, 10b-1, 2. The carbon dioxide laden air stream will cool the sorbent structure and remove any remaining moisture. The sorbent structure will then remove the CO$_2$ until the specified breakthrough occurs and the sorbent structure is then lowered into the regeneration position in regeneration box 1014.

Sorbent Coated Pellet Structure and Concept of FIGS. 11a, 11b

FIGS. 11a, and 11b show 2 examples of another structure and technique for removing carbon dioxide from a flow of carbon dioxide laden air, and regenerate a sorbent used to absorb or bind to the carbon dioxide, in accordance with the principles of the present invention.

In the structures and techniques of FIGS. 11a and 11b, particles, preferably of pellet size, flow by gravity into a pellet feed source/storage bin 1100. The pellets are coated with the sorbent (e.g. an amine) that absorbs or binds carbon dioxide in a flow of carbon dioxide laden air that flows through the pellets. The pellets can be selectively fed through a valve structure 1102 into an air contacting vessel 1104, and a flow of carbon dioxide laden air is directed through the vessel 1104, so that the sorbent absorbs or binds the carbon dioxide and removes the carbon dioxide from the air. A regeneration bin 1106 is provided below the air contacting vessel 1104. The pellets can be selectively directed into the regeneration bin 1106, where process heat is directed at the pellets, to remove carbon dioxide from the sorbent and regenerate the sorbent. The pellets with the regenerated sorbent are then directed to a vertical lifting structure 1108, where they are redirected to a location that enables them to flow into the feed source/storage bin 1100 continue the carbon dioxide removal process. The vertical lifting structure 1108 can comprise, e.g. an air blown structure, an elevator, a screw conveyer, etc., that directs the pellets back to the location that enables them to restart the carbon dioxide removal process. The difference between the systems and techniques of FIGS. 11a and 11b is that in the system and technique of FIG. 11a, the carbon dioxide laden air flows downward through a mass of pellets contained in the air contacting vessel 1104, whereas in the system and technique of FIG. 11b, the carbon dioxide laden air flows horizontally through the pellets are then are flowing into the air contacting vessel 1104.

The structure and techniques of FIGS. 11a, 11b are useful in removing carbon dioxide from carbon dioxide laden air, and may also be useful in removing carbon dioxide from flue gases that emanate from a source that would otherwise direct carbon dioxide into the atmosphere. Specifically, the structure and techniques of FIGS. 11a and 11b can be used to provide sorbent coated pellets directly in the path of flue gases that emanate from a source and would otherwise be directed into the atmosphere. The sorbent coated pellets can be used to remove carbon dioxide from the flue gases, and the sorbent can then be treated with process heat, to remove the carbon dioxide from the pellets (so that it can be drawn off and sequestered), and to regenerate the sorbent on the pellets (so that it can continued to be used to remove carbon dioxide from the flue gases)

It should also be noted that while the structures of FIGS. 11a, 11b are vertically oriented, it may be desirable that certain structures (e.g. the particle beds) be tilted (to facilitate water that condenses from steam during regeneration to drop to the bottom of the particle bed and not block the particle beds), or even oriented horizontally (also to deal with the condensed water issue).

Summary of the Further Embodiments of the Present Invention

The present invention further teaches systems, components and methods capable of capturing carbon dioxide from ambient air alone, or from a mixture of ambient air and a relatively small percentage of flue-originating gases. The term "ambient air", as used in this specification, means and includes unenclosed air under the conditions and concentrations of materials present in the atmosphere at a particular location.

The further improvement of the present invention provides a system and method for removing carbon dioxide from the ambient atmosphere by directing the CO$_2$-laden ambient air through a porous sorbent structure that selectively removably binds (captures) CO$_2$, preferably under ambient conditions, and removing (stripping) CO$_2$ from the sorbent structure (and thereby effectively regenerating the sorbent structure) by using process heat, preferably in the form of low temperature steam, at a temperature preferably of not greater than 120° C. to heat the sorbent structure and to strip off the CO$_2$ from the sorbent structure, and most preferably using steam as the heat carrier. The sorbent structure is preferably a porous solid substrate holding on its surfaces amine binding sites for CO$_2$.

According to the present invention, air, alone or mixed in an air/flue "blender" is conducted to and into contact with a sorbent, the sorbent is preferably alternately moved between carbon dioxide capture and regeneration positions. After the step of carbon dioxide capture, the sorbent is moved to a "stripping" regeneration position, where steam co-generated by means of the process heat is used to "strip" the carbon dioxide from the sorbent, whereupon the capturing and regeneration cycles are repeated.

The unexpected advantage of capturing CO$_2$ at ambient temperatures is made possible by the unexpected effectiveness of steam stripping the CO$_2$ from the sorbent structure using process heat, specifically using steam at atmospheric pressure. Further the reason that such low temperature steam may be used is the mechanism of the steam. As the steam front proceeds into and through the sorbent structure, it gradually heats the structure as the steam condenses. Behind the steam front one will have a low partial pressure of CO$_2$, as a result of the presence of steam, which will encourage more CO$_2$ to be stripped off. Thus, the steam is functioning behind the steam front as a sweep, or purge, gas. That is, in front the steam is driving off the CO$_2$ by heat, and behind by partial pressure dilution.

In accordance with one embodiment of this invention, the CO$_2$-capturing sorbent structure preferably comprises a monolith with (highly) porous walls (skeleton) that contains amine binding sites which selectively bind to CO$_2$. In another embodiment, the monolith has porous walls (substrate) and upon the surfaces, or in the pores, of which is deposited an amine group-containing material which selectively binds to the CO$_2$. In another embodiment, the monolithic highly porous skeleton has deposited on its surfaces a coating of a highly porous substrate formed of a material that selectively supports the amine-group containing material.

In yet another embodiment of this invention, the amine-group containing material is carried by a substrate, in the form of relatively small solid particles, including as both a stationary and a moving bed.

In yet another preferred embodiment, the substrate itself is formed of a polymerized amine-containing skeleton. Most preferably, under conditions met in most countries, the amine sorbent is a polymer having only primary amine groups, i.e., the nitrogen atom is connected to two hydrogen atoms. However, where ambient conditions are at an extremely low temperature, e.g., less than 0° C., as may be found in most parts of Alaska, or Northern Scandinavia or Asia, it is believed that weaker binding secondary and tertiary amines can be effective, as they are for high concentration flue gas.

The present invention is designed to capture carbon dioxide from the atmosphere under ambient conditions. Ambient conditions include substantially atmospheric pressure and temperatures in the range of from about –(minus) 20° C. to about 35° C. It will be appreciated that ambient air has no fixed $CO_2$ concentration.

The captured $CO_2$ is preferably stripped from the sorbent using process heat in the form of saturated steam, thus regenerating the sorbent. The saturated steam is preferably at a pressure of substantially at or near atmospheric pressure and a temperature of close to 100° C., i.e., up to about 130° C., with 105-120° C. being a preferred range. It should also be noted that the temperature of the incoming steam should be superheated at the pressure it is fed to the present process, i.e., at a higher temperature than would be the equilibrium temperature at the pressure of the sorbent structure, in the regeneration chamber. After the $CO_2$ is stripped from the sorbent, it can then be readily separated from the steam by the condensation of the steam and removal of the $CO_2$. The condensed, still hot water, and any steam is recycled to the process steam generator to save the sensible heat energy. The $CO_2$ lean air is exhausted back to the outside (ambient) air.

Moreover, in yet another of its aspects, this invention is preferably carried out immediately adjacent to a carbon fuel-using industrial site, burning a carbon-containing fuel to provide heat and power to the site, and wherein a small percentage, preferably not more than about 5% by volume, and most preferably between about 1 and 3% by volume, of tgas from the fuel burning, is mixed with the air before it is directed over the surfaces of the sorbent.

In yet another embodiment, up to about 25% by volume of an effluent gas can be added to the air. As before, it is important that the mixing was limited to a $CO_2$ concentration at which the rate of $CO_2$ capture was not high enough that the exothermic heat released during adsorption would raise the temperature of the monolith loaded with the sorbent to the point that its effectiveness for capturing $CO_2$ was diminished. It must be noted that the term "effluent" gas can include a true flue gas, i.e., from the combustion of hydrocarbon, such as fossil, fuels. However, the effluent gas can also be the effluent from a hydrocarbon fuel generation process, such as the IGCC process of coal gasification, or more broadly any exhaust from a power generation system based upon the combustion of a hydrocarbon or any process operated at a high temperature created by the oxidation of a hydrocarbon.

The fraction of the $CO_2$ captured depends upon the temperature in a way given by the Langmuir isotherm, which for the available primary amine sorbent is exponential with temperature because of its high heat of reaction, i.e., about 84 kj/mole. A temperature increase from 25° C. to 35° C. reduces the percent of amine sites that can capture $CO_2$ in equilibrium by about $e^{-1}$. Of course, in cold climates this will be a less serious constraint. For example, if the ambient temperature is 15° C., a rise of 10° C. would yield the same performance as the 25° C. case. The Langmuir isotherm for a primary amine is close to optimal at about 15° C. in terms of the fraction of amine sites in equilibrium and the sensible heat needed to collect $CO_2$, and regenerate the sorbent effectively at about 100° C. A conceptual design is shown, where the effluent gas is mixed with the air through a carburetor type of apparatus, and the temperature rise is analyzed, in FIG. 27.

By combining with a CCS process effluent, many of the problems associated with directly mixing the effluent gas are avoided or at least minimized, especially at proportions greater than 5%. Such problems with direct injection of effluent gas include the high temperature of the effluent gas, which creates several problems: The amount of effluent gas to be added to air is relatively small (not more than 25% by weight). The air stream and the effluent gas stream are both at low pressure and so there is, effectively, no energy in these streams that can be used for mixing without increasing the pressure drop. The air stream could vary in temperature (depending upon the location of the plant) between –30° F. to +110° F. The high temperature has an effect upon the volumetric flow and the power required for the fan. A low air temperature could impact the process as effluent gas contains a significant amount of water and has a dew point range between 120° F. and 145° F., depending upon the type of fuel, excess air rates, moisture content of the combustion air, impurities, etc. Thus, if the effluent gas is not mixed well with the air or the effluent gas ducting is contacted by cold ambient air, condensation may occur. Effluent gas condensate is corrosive and its presence may result in damage to piping, ducting or equipment unless suitable materials of construction are used.

In addition, effluent gas can contain solid particles (even downstream of filters or bag houses) that could, over time, block the small passages proposed for the substrate. Thus particular care must be taken to understand the potential for such blockage by particulates during normal operation. Finally, other contaminants such as sulfur oxides, in the flue gas that could deactivate the sorbent, in addition to being corrosive to the equipment Most of these problems are avoided when the system of this invention, including the use of a carburetor as described herein, by integrating this system into a flue gas scrubbing process, such as the well-known CCS process, such that the effluent gas from the flue gas CCS process is used in the system and process of this invention.

Combining this process with the CCS process, also improves overall costs. As is well known, the incremental cost per tonne of $CO_2$ removal increases as one increases the percent $CO_2$ removed, and becomes very costly as one goes from 90% to 95% removal rate. As one reduces the percent captured below a certain level, it also becomes more costly, either because the penalty for the $CO_2$ not captured increases in situations where $CO_2$ emissions are regulated and/or that the source remains a significant $CO_2$ emitter reducing the value of the whole process. For these reasons the target for the effluent gas from the CCS process is usually 90% removal. On the other hand, costs of the present invention go down as the percent of $CO_2$ in the process stream increases through the addition of the effluent gas to the air, as long as the concentration of $CO_2$ remains below that where the temperature rise from the exothermic capture decreases the effectiveness of the sorbent.

When this process is integrated with a CCS process, such that the carburetor system used to mix the air with the effluent of the CCS process, instead of directly with the flue gas itself. There is an optimum point, from a cost per tonne $CO_2$, for the CCS stage. For example, if the CCS process removes only 80% of the $CO_2$ from the flue gas, and passes the effluent from the CCS stage to the present air capture step, mixing the remaining $CO_2$ (if 10% $CO_2$ in the flue gas, at an 80% removal, leaves 2% in the effluent from the CCS stage). In that case, if one mixed the 2% $CO_2$ stream into the air input to the present invention, for every 1% of that effluent stream mixed into the air one would increase the $CO_2$ concentration input into the system of this invention by about 50%. The associated temperature rises can be determined for this embodiment, with the temperature rise depending on the rate of $CO_2$ adsorption and thus the incident concentration of $CO_2$ in the mixed process stream initially contacting the sorbent.

As another example, if one mixed in 5% effluent, costs would be reduced by a factor of 3; the concentration would be 3 times higher in the mixed stream than in the air alone, over a stand-alone air capture process. The temperature rise for that case is close to the 1% methane case for mixing the full effluent gas stream version of the carburetor, or about 3.5 degrees C. Most importantly, even if the air capture only removed 70% of the $CO_2$ in the mixed stream, the combined processes (i.e., the CCS and the present process) would remove over 100% of the $CO_2$ emitted by the power plant. The combined result would be to produce carbon dioxide free power, or other processes that used fossil fuel as the energy source. The combined cost would be less than the cost of attempting to do it all in one stage, by optimizing the portions of $CO_2$ removed at each stage.

Besides achieving direct benefits from reducing the cost per tonne of $CO_2$ collected, by optimizing the cost of each of the CCS process and the $CO_2$ process of the present invention, there are also other benefits from such process integration. They include that the exhaust stream from the initial flue gas processing is clean of particulates and other impurities, removing that problem/cost of cleaning the flue gas prior to carrying out the present invention, further optimizing efficiency and lowering the cost of energy. There are many different precombustion and post combustion $CO_2$ removal processes being pursued and new ones could well emerge in the future. The details of the amount mixed and possible additional processing of the exhaust from the first flue gas processing stage will vary in detail but the basic concept remains the same: cleaning and partially removing the $CO_2$ from the flue gas, or more broadly "effluent" and then completing the $CO_2$ removal in the process of the present invention mixed with a larger quantity of air.

Detailed Description of the Further Embodiments of this Invention

Referring to the generalized block diagram of the process of the present invention shown in FIG. 16, Stage 1 provides for moving a flowing mass of ambient air having the usual relatively low concentration of $CO_2$ in the atmosphere, with a relatively low pressure drop (in the range of 100-1000) pascals. The flow of $CO_2$ containing air from Stage 1, is passed, in Stage 2, through a large area bed, or beds, of sorbent for the $CO_2$, the bed having a high porosity and on the walls defining the pores a highly active $CO_2$ adsorbent, i.e., where the adsorption results in a relatively high Heat of Reaction.

Such a highly active $CO_2$ sorbent is preferably a primary amine group-containing material, which may also have some secondary amine groups present. The primary amine groups are generally more effective at usual ambient temperatures in the range of from about 10-25° C. By utilizing all primary amine groups, especially in the form of polymers, one can maximize the loading. The relatively low concentration of $CO_2$ in the air (as opposed to effluent gases), requires a strong sorbent. Primary amines have a heat of reaction of 84 Kj/mole of $CO_2$ that indicates stronger bonds, while the secondary amines only have a heat of reaction of 73 Kj/mole. Note that at lower temperature −10 to +10° C. secondary amines could also be effective.

More generally, it should be noted that, broadly, the present invention is based not only on the effectiveness of the primary amines under ambient conditions, but also on the recognition that removing $CO_2$ from air under ambient conditions is practical, as long as the stripping of the $CO_2$ from the sorbent is equally practical at relatively low temperatures. Thus this invention contemplates the use of other sorbents having the desirable properties of the primary amines with respect to the air capture of $CO_2$, such sorbents would be used in the invention of the process described in this application.

The primary amines work effectively at air capture (from atmospheric air) concentrations under ambient conditions. The loading of $CO_2$ depends strongly upon the ratio of the heat of reaction/K (boltzmann constant) T (temperature); the heat of reaction difference between primary and secondary amines, as shown above, can cause a factor of about 100 times difference in loading, following the well-known langmuir isotherm equation. The amine groups are preferably supported upon a highly porous skeleton, which has a high affinity to the amines or upon which, or in which, the amines can be deposited.

Alternatively, the amine groups may be part of a polymer that itself forms the highly porous skeleton structure. A highly porous alumina structure is very effective when used as the skeleton to support the amines. This ceramic skeleton has a pore volume and surface to achieve high loadings of amines in mmoles of amine nitrogen sites per gram of porous material substrate. A preferred such skeleton support material has 230 cells per cubic inch with a thickness of six inches. Another structure that can be used is based upon a silica porous material known as cordierite and is manufactured and sold by Corning under the trademark CELCOR. CELCOR product is made with straight macro channels extending through the monolith, and the interior walls of the channels are coated with a coating of porous material, such as alumina, into the pores of which the amine can be attached or deposited (and which preferably is adherent to the amine compounds).

The cost of the process can be reduced by making the monolith thinner, by increasing the density of primary amine groups per volume and thus requiring less monolith volume to achieve an adsorption time larger than the time to move the bed between adsorption and regeneration and to carry out the steam stripping. This can be achieved by utilizing a monolith contactor skeleton that is made out of a primary amine-based polymer itself, but is also at least partially achieved by forming the structure of the monolith of alumina. Although alumina does not form as structurally durable a structure as does cordierite, for the conditions met at the ambient temperature of the air capture or the relatively low temperatures at which the $CO_2$ adsorbed on the amines at ambient temperatures can be stripped off, the structural strength of alumina is adequate.

The foregoing modifications are important for air capture because they minimize the cost of making the structure as well as the amount of energy needed to heat the amine support structure up to the stripping temperature.

It is also useful to provide relatively thin contactors, with high loading capacity for $CO_2$ with rapid cycling between adsorption and regeneration. This would use the tandem two bed version with one adsorbing and the other regenerating. Utilizing flat pancake-like beds, having a length, in the direction of the air flow, in the range of not greater than about 20 inches, to about 0.03 inch, or even thinner, is preferred. The more preferred range of thickness is from not greater than about 8 inches, and most preferably not thicker than about 3 inches.

When using the alumina coated CELCOR cordierite, or any monolith structure provided with channels passing the full thickness of the monolith, the length of the contactor in the direction of air flow, for a fixed pressure drop and fixed laminar air flow, and with a fixed void fraction, scales like the area of the individual square_channel openings in the CELCOR monolith; and the cycle time, as determined by the sorbent becoming_saturated with $CO_2$ or to some fixed level of $CO_2$ sorption, scales with the same factor. The void fraction is the ratio of open input area to total input area of the front face of the monolith, facing the air flow. Preferably, the void fraction of the monolith is between 0.7 and 0.9, i.e., between 70% and 90% open channels.

Thus as one decreases the size of the individual monolith openings for a fixed void fraction, the channel length, i.e., thickness of the monolith structure for a fixed pressure drop, will decrease proportional to the area of that opening, while the adsorption time to reach a fixed level of adsorption, or to reach saturation, will decrease proportionally at the same rate that the length decreases. Since the cost will decrease as the length decreases (the shorter the device, the lower the cost, roughly proportional to length), limited by the extra cost that may result as one shortens the cycle time and the cost to make thinner walled monoliths. How far one can go in reducing the length will also be limited by the loading of sorbent, e.g., the number of amine groups that one can place in the pores of the walls, per unit volume of the monolith walls, the higher the loading, the shorter one can make the length of the monolith, for a fixed cycle time.

The above parameters assume that a certain constant loading (of sorbent groups, e.g., primary amine groups) is achieved. In addition, the velocity of the air coming in was assumed constant in the comments above. It must be understood that the pressure drop per tonne of $CO_2$ capture increases as the velocity of the air flow increases, which increases the cost of the electricity to move the air, to the extent natural forces, such as the wind, are not sufficient to achieve the desired airflow. The cost of the whole process other than the electricity cost decreases as the airflow velocity increases. Thus, the air velocity choice is a compromise between capital cost, which is reduced as the airflow velocity increases, and operating costs, that increase as the airflow velocity increases. It is preferred to operate with an incoming airflow in the range of 2-4 m/sec. The relative costs will vary depending upon the local conditions at each plant site, e.g. is there a dependable prevailing wind present or not and the local cost of electricity.

It has further been found that the $CO_2$ capture time can be several times longer than the $CO_2$ stripping time. Thus, a capital cost savings is possible by using only a single bed with the adsorption time ten times longer than the moving time plus the steam stripping time. The steam stripping time can be shortened by increasing the rate of steam flow during regeneration. Alternatively, one can use the tandem bed embodiment which can strip two or more sorbent beds using the same stripping chamber. This would further improve the capital cost savings by shortening the flow length of the each of the two beds. Operating with 2 sorption beds each sorbent bed could have its thickness reduced by a large factor, e.g., 10 times or more. Specifically, two or more thin sorbent material structures could be moved between an air capture position and the stripping chamber. This would allow for the stripping of one bed, including cooling it back down to the ambient temperature from the stripping temperature, while the other, regenerated, bed is facing fresh airflow.

In the limit of thin contactors, the ceramic monolith could be replaced by a flexible thin sheet, or fabric, type of contactor, where the sheet, e.g., a fabric, is covered with the sorbent and is flexible, so one could move it continuously on rollers rather than intermittently in an elevator. Such a flexible sheet could, in the limit, become a continuous process where the sorbent carrying sheet is continuously moved between the adsorption and regeneration stages on a set of rollers, provided that a seal could be effectively formed between the capture and stripping stages of the process. In the limit, as one shortens the length, other embodiments become possible. For example, such other embodiment might include a thin flexible contactor, for example formed from a thin sheet or a fabric. The flexible contactor can continuously move between the adsorption position and the regeneration position, e.g., on some continuous roller-type device. That would be theoretically similar to the tandem version of the elevator embodiment described here in detail, in that while one part of the contactor was moving into the adsorption chamber, another part would be moving into the regeneration chamber. This essentially converts the batch elevator design to a continuous moving process. This design depends upon reliable seals that can separate the adsorption chamber from the regeneration chamber while the flexible contactor is moving between the chambers.

The following computational model provides a useful procedure for optimizing the efficiency of the $CO_2$ capture process and system of the present invention. This model is based upon the following Key Process Performance Parameters Key Process Performance Parameters:

Csh=Specific heat of the support skeleton material, in joules/kg deg K d=Average pore size of skeleton HRs=Heat of reaction of the sorbent(amine), in joules/mole of $CO_2$ L=Loading, moles of $CO_2$/kg of sorbent structure;

Ld/a=actual loading, in kg of $CO_2$ per square meter of monolith air input area into the 230 cell Corning monolith Ns=Density of $CO_2$ adsorption sites on the porous surfaces, in number of sites per square meter of pore surface.

In general, as one increases the loading one also wants high amine efficiency as defined by the fraction of amine sites present that are available to bind the $CO_2$. This is the reason for preferring primary amines and also for adjusting the loading so as to minimize pore blockage. Experimental results indicate that the optimum loading that balances amine efficiency with increased loading is between 40-60% by volume organic amine content relative to the porous substrate/skeleton to which it is attached or into whose pores it is deposited.

Pcm=Density of the skeleton material (e.g. silica or alumina), in kg/cubic meter PORc=Porosity, PUR=Ratio of $CO_2$ released to trapped air, purity of $CO_2$, RH=heat of reaction; Ratio of sensible heat to heat of reaction RH during regeneration SH/RH.

Savc=Surface area per volume of the skeleton, in 1/meters squared of surface/meters cubed SH=sensible heat TA=Time to fill to saturation with $CO_2$, time for adsorption, TS=Time to regenerate using steam stripping,
w=skeleton pore wall thickness Important design parameters to be considered in the design of this process.

The porous structure is specified by the average pore/channel size d, and wall thickness of w. The porosity PORc is the ratio of the open wall area to the total surface area perpendicular to the direction of air flow. In this model that is equal to the ratio of the average open channel area to the total average area. For this approximation, the tortuous nature of the curves in the channels of the walls of the porous medium is neglected. Thus, $PORc=d^2/(d+w)^2$. The surface area per volume is given by $Savc=4\ d/(d+w)^2=4\ PORc/d$. The pressure drop is dependent upon the size of the openings in the channel, the void fraction of the monolith, length and velocity of air flow.

Sorbent Structure and General Operation of Sorbent

FIG. 12 is a schematic illustration of a cellular, ceramic substrate structure, of a type produced by Corning under the trademark CELCOR®, that can be used in a sorbent structure, in accordance with the principles of the present invention. The sorbent (e.g. an amine) is carried by (e.g. coated or otherwise immobilized on) the inside of one or more of the CELCOR®, cellular ceramic substrates, which provides a high surface area and low pressure drop, as $CO_2$ laden air flows through the substrate. The sorbent structure can comprise, e.g., a plurality of the CELCOR® cellular, ceramic substrates, stacked as bricks, or a single substrate, having the type of pancake shape described above in connection with FIG. 6 (i.e. front surface area much greater than thickness), and the $CO_2$ laden air is directed through the cells of the sorbent structure. It is also contemplated that the sorbent structure can be formed by embedding the sorbent material in the, e.g., alumina, coating on the walls of the CELCOR® cellular, ceramic structure to form a monolithic sorbent structure.

It is also noted that an even more preferred structure is formed of bricks of porous alumina, in place of the silica of cordierite. Although the alumina structure is not physically and/or thermally as robust as the silica structure, the less rigorous conditions met in this ambient temperature capture process, and relatively low temperature stripping process, allow the use of the less robust structure.

In addition, it should be noted that the substrate, in addition to a ceramic structure, an inorganic material, the sorbent structure can be an organic material such as is formed from a polymerized polyamine by crosslinking the amine polymer to form a solid polymer. The solid polymer should be capable of being extruded at low enough temperature that the polymer does not volatilize, nor be softened at the temperature of the stripping steam, i.e., at up to 120° C., used for regeneration of the sorbent.

The binding sites in the porous structure are determined by the amount and dispersion of the amines throughout the porous structure. There are three generally known classes of supported amine sorbents which have been used for the present situation. The presently preferred Class 1 adsorbents are based on porous supports impregnated with monomeric or polymeric amines (FIG. 12). The amine species are thus physically loaded onto or into the pores of the support structure. This class of sorbents is described in the technical literature, for example in Xu, X. C., et al., *Preparation and characterization of novel $CO_2$ "molecular basket" adsorbents based on polymer-modified mesoporous molecular sieve MCM-41*. Microporous Mesoporous Mat., 2003. 62(1-2): p. 29-45 and Xu, X. C., et al., *Influence of moisture on $CO_2$ separation from gas mixture by a nanoporous adsorbent based on polyethylenimine-modified molecular sieve MCM-41*. Ind. Eng. Chem. Res., 2005. 44(21): p. 8113-8119 and Xu, X. C., et al., *Novel polyethylenimine-modified mesoporous molecular sieve of MCM-41 type as high-capacity adsorbent for $CO_2$ capture*. Energy Fuels, 2002. 16(6): p. 1463-1469. Class 2 adsorbents are based on amines that are covalently linked to the solid support. Methods of forming such Class 2 adsorbents in the porous structure of the present invention are known to the art. This has most often been achieved by binding amines to the ceramic monolith porous walls, e.g., silica oxides or alumina oxides, via the use of silane chemistry, or via preparation of polymeric supports with amine-containing side chains.

Class 3 adsorbents are based on porous supports upon which aminopolymers are polymerized in-situ, starting from an amine-containing monomer. This Class 3 type was described for use as adsorbents for $CO_2$ capture by Hicks, J. C., et al., *Designing adsorbents for $CO_2$ capture from effluent gas-hyperbranched aminosilicas capable, of capturing $CO_2$ reversibly*. J. Am. Chem. Soc., 2008. 130(10): p. 2902-2903 and by Drese, J. H., et al., *Synthesis-Structure-Properly Relationships for Hyperbranched Aminosilica $CO_2$ Adsorbents*. Adv. Funct. Mater., 2009. 19(23): p. 3821-3832. Each of these adsorbent classes can be used for $CO_2$ capture and steam-regeneration studies.

A highly preferred sorbent structure is one in which the primary amine is incorporated into the monolith structure itself requiring only one step to make it. Such a specific embodiment can be made from plastic/polymers, which can survive because of the mild conditions utilized in the system of the present invention. The monolith can be a composite include inorganic non polymeric materials—such a composite would have properties in terms of strength, porosity, stability that could be useful.

The following procedures can be followed to provide amine sorbent supported on commercial particulate silica supplied by the PQ Corporation (PQ-9023) or on mesocellular foam. For the preparation of all the adsorbents, the silica substrate was first dried under vacuum at 100° C. for 24 hrs. to remove absorbed water on the surface before use. A commercial particulate silica supplied by the PQ Corporation (PQ-9023) and a lab-synthesized mesocellular foam were used as supports. The commercial silica is characterized by a surface area of 303 $m^2/g$, an average pore volume of 1.64 cc/g and an average pore diameter of 60 nm. The mesocellular foam was prepared following a literature methodology, Wystrach, V. P., D. W. Kaiser, and F. C. Schaefer, *PREPARATION OF ETHYLENIMINE AND TRIETHYLENEMELAMINE* J. Am. Chem. Soc., 1955. 77(22): p. 5915-5918. Specifically, in a typical synthesis, 16 g of Pluronic P123 EO-PO-EO triblock copolymer (Sigma-Aldrich) was used as template agent and dissolved in 260 g DI-water with 47.1 g concentrated HCl. Then 16 g of trimethylbenzene (TMB, 97%, Aldrich) was added at 40° C. and stirred for 2 hrs before 34.6 g tetraethyl orthosilicate (98%, Aldrich) was added to the solution. The solution was kept at 40° C. for 20 hrs before 184 mg $NH_4F$ (in 20 mL water) was added. The mixture is later aged at 100° C. for another 24 hrs. The resulting silica was filtered, washed with water, dried in oven, and calcined at 550° C. in air for 6 hr to remove the organic template before further use. The mesocellular foam silica is characterized by a surface area of 615 $m^2/g$, an average pore volume of 2.64 cc/g and average window and cell diameters of 12 nm and 50 nm.

Generally, for a Class 1 sorbent, the amine compound may be applied to the porous substrate structure by physical impregnation from the liquid or vapor phases. The amine compound can diffuse into the pores of the substrate structure. In this embodiment the pore volume becomes the critical parameter determining loading and pores 5-15 nm being preferable but the conclusion of wanting as thin walls as possible and thus as high a porosity as possible that is also physically strong enough so that the monolith is structurally strong. As an example of the preparation of the Class 1 adsorbent, 18 kg low molecule-weight poly(ethylenimine) (PET, MN~600, Mw~800, Aldrich) and 90 L methanol (99.8%, Aldrich) were mixed first for 1 hr. Subsequently, 30 kg of amorphous particulate silica (PQ Corporation, PD-09023) [or a suitable substrate (175 in$^2$) of the CELCOR® monolith] was added and the liquid stirred for an additional 12 hrs. The methanol solvent was later removed by rotavap, and the resulting supported adsorbent ("PQ-PET") was further dried under vacuum at 75° C. overnight before using.

For preparation of the Class 2 adsorbent, 90 L anhydrous toluene (99.5%, Aldrich) and 3 kg of particulate silica (PQ Corporation), or a suitable monolith substrate (e.g., a brick of the CELCOR® monolith having a front surface area of 36 in$^2$, and a pore surface area of 175 in$^2$) was mixed in a pressure vessel for 1 hr, then 30 kg of 3-aminopropyltrimethoxysilane (APTMS, Aldrich) was added into the mixture. The mixture was kept under vigorous stirring for 24 hrs at room temperature. The resulting supported adsorbent (PQ-Mono) was recovered by filtration, washed with toluene and acetone, and then dried overnight, under vacuum, at 75° C.

For the Class 3 adsorbent, particulate mesocellular silica foam (MCF) [[or a suitable substrate (175 in$^2$) of the CELCOR® monolith]] is reacted with aziridine (a highly reactive but toxic material) in a similar manner as reported in the literature (Hicks, J. C., et al., *Designing adsorbents for CO$_2$ capture from effluent gas-hyperbranched aminosilicas capable, of capturing CO$_2$ reversibly*. J. Am. Chem. Soc., 2008. 130(10): p. 2902-2903). For this synthesis, 30 kg of MCF is dispersed in 90 L toluene in a suitable pressure vessel and the mixture is stirred for 1 hr before adding 60 kg aziridine (which was synthesized in accordance with the following procedure, Wystrach, V. P., Kaiser, and F. C. Schaefer, *PREPARATION OF ETHYLENIMINE AND TRIETHYLENEMELAMINE*. J. Am. Chem. Soc., 1955. 77(22): p. 5915-5918), immediately before use. After continuous stirring for 24 hr, the resulting supported adsorbent (MCF-HAS) is filtered, washed with toluene and ethanol, and dried overnight under vacuum at 75° C.

CO$_2$ laden air is passed through the sorbent structure, which is preferably pancake shaped, i.e., the dimension in the direction of the air flow is as much as two orders of magnitude smaller than the other two dimensions defining the surfaces facing in the path of the air flow, and the amine sites on the sorbent structure binds the CO$_2$ until the sorbent structure reaches a specified saturation level, or the CO$_2$ level at the exit of the sorbent structure reaches a specified value denoting that CO$_2$ breakthrough has started (CO$_2$ breakthrough means that the sorbent structure is saturated enough with CO$_2$ that a significant amount of additional CO$_2$ is not being captured by the sorbent structure).

When it is desired to remove and collect CO$_2$ from the sorbent structure (and to regenerate the sorbent structure), in a manner described further below in connection with FIGS. 10a-h, the sorbent structure is removed from the carbon dioxide laden air stream and isolated from the air stream and from other sources of air ingress. Steam is then passed through the sorbent structure. The steam will initially condense and transfer its latent heat of condensation to the sorbent structure, as it passes from and through the front part of the sorbent structure until the entire sorbent structure will reach saturation temperature, thereafter as the steam contacts the heated sorbent it will further condense so that for each approximately two (2) moles of steam will condense to liberate sufficient latent heat to provide the heat of reaction needed to liberate one (1) mole of the CO$_2$ from the primary amine sorbent. As the condensate and then the steam pass through and heat the sorbent structure, the CO$_2$ that was previously captured by the sorbent structure will be liberated from the sorbent structure, producing more condensed water in providing the needed heat of reaction to liberate the CO$_2$ from the sorbent structure and be pushed out of the sorbent structure by the steam or extracted by an exhaust fan/pump. This technique is referred to as "steam stripping" and is also described further below. The steam is passed through the sorbent structure to cause the release of the CO$_2$ from the sorbent; for energy efficiency cost reasons one would want to minimize the amount of steam used and that is mixed in with the CO$_2$ effluent. Thus, whatever is (or can be) condensed, upon exiting the regeneration chamber, the condensate can be added to that generated in the regeneration chamber, and recycled to be heated and converted back into steam for further use.

The stripping process usually will be terminated at the onset of steam breakthrough, when the amount of uncondensed steam emerging from the backend of the sorbent structure becomes large compared to the newly liberated CO$_2$. The exact conditions for terminating the injection of new steam will be determined by balancing the increased fraction of CO$_2$ removed with the increased cost of energy as the steam process becomes less efficient in terms of the ratio of CO$_2$ liberated per energy of steam used. That energy needs to be replaced when the steam and condensate are reheated for the next stripping cycle. The exact specification will vary with the effectiveness of heat recovery and the cost of the process heat used in a particular application.

The System In designing the structure of the system incorporating the present invention to be commercialized, the following design parameters should be considered. If Ns is the number of CO$_2$ binding sites per square meter of pore surface, Av is Avogadro's number, and if the density of the material of the skeletal structure is Pcm, the porous skeleton will have a density Pc given by Pc=(1-PORc) Pcm; then the loading L in moles per kilogram of sorbent structure is given by $$L=Ns\ Savc/Av\ Pc=4\ Ns\ PORc/Av\ d\ Pcm(1\text{-}PORc)$$

If one solves the above expression for PORc, one finds $$L=(4\ Ns/Av\ Pcm)\ (1/(2w+w2/d))$$

Since it is desirable to maximize the loading of CO$_2$ adsorbed by the structure, the polyamine sorbents provide the desired high Ns. In any case the above analysis makes clear that it is preferred to have as thin walls as possible, between the pores/channels in the porous support. The loading in moles/kg is to first order, independent of the size of the pores, with the decrease in Savc, as the porosity is increased by making the pore size larger, cancelled to first order by the decrease in the density of the porous support, Pcm.

One can insert the values for Av and for Pcm of 2,500 Kg/m3 (note: averaging the difference in the values for quartz and fused silica) and convert Ns to Nsn which is the number of attachment sites per square nanometer, where w and d are in nanometers, to find: L=1.33(Nsn/w(1+w/2d) moles/kg, of the skeleton structure. For Nsn=5 sites per square nanometer and w=2 nanometers and d=5 nanometers, a porosity of about 0.5 results in a surface area per gram of 400 mm$^2$ and L=2.5 moles/kg. of the skeleton structure.

The actual loading capacity of $CO_2$, as kg/m$^3$ of air input, Ld/a, where the thickness of the support wall is Wc and the length (in the direction of airflow) of the monolith is Lm is given by Ld/a=L(0.044)(Pcm(1-PORc)) Savm Wc Lm, which substituting for L, Ld/a=(Ns Savc/Av Pcm(1-PORc)) (0.044)(Pcm(1-PORc)) Savm Wc Lm;

Ld/a=Ns(0.044)/Av) (Savc Savm Wc Lm), Substituting for Savc,

Ld/a=Ns(0.044)/Av) (Savm Wc Lm) $(4/d(1+w/d)^2)$.

In one example, using the Corning 230 cell CELCOR monolith, the pore flow length Lm is 0.146 meter, the surface area per volume of the monolith Savm is about 2000 m2/m3 and the pore wall thickness of the monolith Wm is 0.265 mm., determined from Ld/a=L (0.044 kg/mole) (Pc Savm 0.146 Wm), for an amount of $CO_2$ in kg/m2 area of air input. A general design criteria is to make L and Ld/a as large as possible, constrained by the pressure drop constraint, i.e., limited by the force of the wind and/or fan array, which is met in the first embodiment of the present invention using modeling results for the Savm of the 230 cell Corning monolith, and the pore length, in the direction of air flow, of 0.146 m and input air flow velocity of 0.5 m/sec.

The walls of the monolith should have the desired PORc, and number of attachment sites to provide a high Nsn. Wm is determined based upon optimizing (minimizing) the pressure drop/Savm, which in turn will be constrained by a limit of how small one can make Wm to have acceptable loading, based upon other constraints (see below). It should be noted that L increases as w decreases, and d increases, but Ld/a decreases, with increasing pore size for a fixed w, because as the porosity increases Pc decreases. In general terms, the optimal design has the smallest w possible, and a porosity that balances the impact of the pore size on the performance parameters described below. It must be remembered that the amine compound may be impregnated as a liquid in the pores of the monolith as well as, or in lieu of, being supported on the walls of the pore structure.

Air capture following the present invention, is a relatively mild condition. This feature of the present invention allows the use of a much less robust structure for the monolith. In particular, this permits the use of relatively thin walls made out of material with high porosity on to which sorbent is deposited; one such material is alumina. This will save in cost, using materials that are generally less robust and therefore less costly to manufacture.

Performance Parameters.

Ratio of SH/RH. As indicated above, for the present invention, the ratio of sensible heat of the sorbent support structure (SH) to heat of reaction of the sorbent (HRs) that is lost, during regeneration, is a key performance factor (a main reason for needing high loading in this case). It depends on the loading L, namely SH/HR=Csh·ΔT/L·HRs·WC, where Csh is the specific heat of the substrate in joules per kg per degree Kelvin, HRs is the heat of reaction of adsorption, per mol of $CO_2$, in joules per mole of $CO_2$, and WC is the working capacity of the bed in the process used (e.g. the fraction of the loading that is captured each cycle).

Assuming (conservatively) a Csh of about 1 kj/kg degree K for the solid substrate, a ΔT of 80° C., and HRs=84 kj/mole (about 35 KT), for a primary amine, and WC=½, SH/HR=1.9/L. The process needs the high HRs of the primary amine to achieve good loading of the Ns sites, at ambient 25° C. temperature, and for the low partial pressure of $CO_2$ in air. By using primary amines only, the fraction of sites that bind $CO_2$ would increase at ambient temperatures and ambient concentrations of $CO_2$, and be very comparable to the results for the high concentrations of $CO_2$ in high temperature effluent gas (45-65 C). It was this surprising result that makes it possible to use primary airlines for effective air capture of $CO_2$. The prior art believed that successful air capture required the use of the much more strongly binding/higher heat of reaction (2-4 times that of primary amines) sodium hydroxide, as the sorbent. This approach was much less economical, as much higher temperatures were required to regenerate the sodium hydroxide, resulting in the need for higher amounts of costly energy.

The general design criteria for the present invention is for SH/HR to be as small as possible and for the recovery of SH to be as high as possible. But in any event, SH/HR should be less than or equal to one, and most preferably between ½ and 1. It is important to note that this requirement only depends upon the specific loading, in moles/kg of the structure, and thus again to first order, only depends upon increasing Nsn/w, for the case of surface attachment. However, there is a second order dependence that decreases the SHAH ratio as the pore size is decreased.

TA—The Adsorption Time—The time to complete adsorption, TA, has been modeled for the six inch thick (in direction of air flow) 230 cells/cubic inch Corning CELCOR monolith. Using those results one can determine TA from the following relationship, where the left side is the amount of $CO_2$ that enters the device and is captured, and the right hand side is the fraction of the input $CO_2$ that is both captured by the amine and collected during steam stripping: P $CO_2$ Vin FC TA=La/d FS WC, where P $CO_2$ is the density of $CO_2$ in air=7.6×10$^{-4}$ kg/m3, Vin is the velocity of the input air, FC=fraction captured, FS=fraction of bed saturation that is achieved, and WC=fraction of $CO_2$ captured that is collected.

Thus, $TA=La/d\ FS\ WC/P\ CO_2 \cdot Vin\ FC = Ns(0.044)/Av)(Savm\ Wc\ Lm)(4/d(1+w/d)^2)FS \cdot WC/P\ CO_2 \cdot Vin\ FC$ At very low temperature locations, it may be possible to use secondary amines as well, and in fact one can tune the system of the present invention by varying the ratio of primary and secondary amines, in order to limit the heat output. Generally, increasing WC or L, increases the energy efficiency of the process, and reduces the costs of providing external heating.

Thus, as mentioned earlier, SH/HR varies as 1/w(1+w/2d), and the adsorption time TA varies as $1/d(1+w/d)^2$, so that both improve as w gets smaller; but as d gets smaller, SH/HR. falls but TA improves, i.e., is reduced. For estimating TA, use the same values as used for estimating L, i.e., 2 nm for w and 5 nm for d, which gives a porosity of 0.5 for the skeleton structure. In the case of physical impregnation, higher porosities are desirable, only constrained by the need for structural stability of the monolith.

PUR—The Purity of the Collected $CO_2$—As a final performance factor, the purity of the $CO_2$ that is collected is significant in those situations where the stripped $CO_2$ is intended to be compressed for pipeline shipment, to be used for either enhanced oil recovery or for sequestration. The primary concern is about trapped air and not water vapor, which is easily removed in the initial stages of compression if the $CO_2$ is to be pipelined. For other uses where the carbon dioxide is not compressed significantly, such as a feed for algae or input to other processes, the presence of air is often not an issue. The purity of the $CO_2$ is primarily affected by the amount of air trapped in the capture system when it is subjected to the steam stripping. Therefore, this requires providing for the removal of such trapped air before commencing the stripping of the $CO_2$, e.g., introducing the stripping steam. Removing any trapped air is also desirable as the oxygen in the air can cause deactivation of the sorbent when the system is heated to the stripping temperature, especially in the presence of steam.

Oxygen can be readily removed by pumping out the air from the support structure, to form at least a partial vacuum, before it is heated to the stripping temperature. As an unexpected advantage, when using primary amine groups as the sorbent, reducing the pressure in the structure will not immediately result in the correlative loss of any sorbed $CO_2$, when the sorbent is at the relatively most ambient temperatures, when the partial pressure is reduced by pumping. The $CO_2$ is not spontaneously released from the amine at such low temperatures. Such release, as has been shown experimentally, requires a stripping temperature of at least 90° C.

This process can be carried out where the initial capture phase results in substantial saturation of the $CO_2$ on the sorbent, or until it results in only, e.g., about 60-80% of saturation by the $CO_2$. This will substantially reduce the capture cycling time to an extent proportionally as much as 40%, so that the ongoing cycling of the process results in a greater extraction of $CO_2$ per unit time. Generally, sorption slows as the sorbent closely approaches saturation.

Details of preferred embodiments of this invention are given in the context of the following specific examples of $CO_2$ capture and stripping systems, with reference to the attached drawings.

FIGS. 17A-B and 18A-B are schematic illustrations of several ways that carbon dioxide can be removed from an atmosphere, according to the principles of the present invention.

When a sorbent structure, such as a substrate carrying a primary amine sorbent, is in the $CO_2$ capture position (e.g. the position of substrate 600, in FIG. 6, or in FIGS. 17A and 18A), carbon dioxide laden air is directed at the substrate (e.g. by a single large fan 604, shown in dashed lines, in FIG. 6, or by a plurality of smaller fans 2004, as shown in FIGS. 22-23), so that as the air flows through the substrate and into contact with the sorbent, the carbon dioxide contacts the sorption medium on the surfaces of the substrate, and is substantially removed from the air. Thus, carbon dioxide laden air is directed at and through the substrate so that carbon dioxide in the air comes into contact with the medium, carbon dioxide is substantially removed from the air by the medium, and the $CO_2$-lean or leaner air from which the carbon dioxide has been substantially removed, is directed away from the substrate, back into the atmosphere.

In the embodiments of the above figures, the substrates are moved between the $CO_2$ capturing zone and the $CO_2$ stripping/regeneration chamber 2006. When a substrate is moved to the $CO_2$ stripping chamber 2006, i.e., the lower position as shown in FIGS. 6, 17B and 18B the substrate is at substantially ambient temperature, the heat of reaction of the sorption activity having been removed by the convective effect of the blown mass or air from which the $CO_2$ was removed, which is far greater than the amount of $CO_2$.

Any trapped air in the substrate 2002 and chamber 2006 can be pumped out, e.g., by an air evacuation pump 2023, or even by an exhaust fan, to form a partial vacuum in the chamber 2006. Next, process heat, e.g., in the form of saturated steam from the Steam co-generator 2019, is directed at and through the $CO_2$-laden substrate 602, 2002 in the stripping chamber 2006.

Carbon dioxide is removed from the sorbent (stripped off) by the flow of relatively hot superheated steam; the incoming steam is at a temperature of not greater than 130° C., and preferably not greater than 120° C., and most preferably not greater than 110° C. The vapor, comprising primarily carbon dioxide and some saturated steam, flows out of the stripping chamber 2006, through exhaust conduit 2008 into a separator, where any steam present is condensed. The liquid condensed water is separated from the gaseous stripped $CO_2$. Some of the steam that is condensed in the sorbent structure itself during the stripping process either will be collected in a drain at the bottom of the regeneration chamber (e.g., by tipping the structure slightly off level) or will be evaporated upon pumping out, and reducing the pressure in, the regeneration chamber following the completion of the steam stripping process. That evaporation of the condensed steam will cool down the sorbent structure before it is put back in contact with the air to capture more $CO_2$ (this also will mitigate the tendency of oxygen to deactivate the sorbent by oxidizing it). Some of the water left in the porous structure can also be removed by the effect of passing the air through the device in the adsorption step (this will depend upon the ambient humidity). It has been shown experimentally, however, that the effectiveness of capture increases in the presence of moisture. This is well known to the art and results from the fact that dry sorbent must use two amine sites to bind $CO_2$ to the sorbent when dry, 50% amine efficiency, to only one amine binding site per $CO_2$ captured in the presence of high humidity, 100% potential amine efficiency. The potential amine efficiency may still be limited by pore blockage and the practical decision of how much of the bed is to be saturated with $CO_2$ before one terminates the adsorption process and moves the sorbent structure to the regeneration step.

The stripped $CO_2$ from the regenerated sorbent is in turn pumped into a storage reservoir where it is maintained at slightly elevated pressure for immediate use, e.g., to provide $CO_2$-rich atmosphere to enhance algae growth, or the carbon dioxide gas can be compressed to higher pressures, by means of compressor 2014, for long term storage or to be pipelined to a distant final use, e.g., sequestration or treating of oil wells or natural gas wells to improve production. During any initial compression phase, the $CO_2$ is further purified by the condensation of any remaining steam, which water condensate is in turn removed, by known means.

The substrates 602, 2002, are alternatively moved between, e.g., upper and lower positions, by means of an elevator system of, e.g., pulleys or hydraulic lifts. It is recognized that the faster the cycling time the lower the overall cost to obtain an annual production of captured $CO_2$. It has been found that the time required for the stripping step, including the moving of the bed, the initial pumping out of the air, the steam stripping time, and the cooling period, and the time to move back to the adsorption stage, can be several times less than the time of the $CO_2$ capture step enabling a one bed embodiment with a high percentage of the time (90%) with the bed in the adsorption mode. Alternatively, one can go to very short times limited by the moving plus steam stripping time and then use the embodiment where two or more sorbent structures are stripped in one stripping chamber, successively.

When commercially siting these $CO_2$-extraction facilities, it is anticipated that one option includes their being scaled to a capacity to remove on the order of One Million (1,000,000) metric Tonnes of $CO_2$ per year from the atmosphere. Such a facility will utilize at least approximately 500 such reciprocally moving substrate modules, where each module will have major rectangular surfaces extending perpendicular to the flow of air with an area of as much as about 50 square meters, and a thickness, in the direction of flow, of most preferably not greater than about six (6) inches, but usually less, e.g., as low as 0.06 ins (1.5 mm). Each monolith module is preferably formed from brick-shaped monolith elements, each the desired thickness of the module, but having a face surface of about 6 ins. by 6 ins., so that each module may be formed of about 2000 such bricks, stacked together.

Figure 21B:
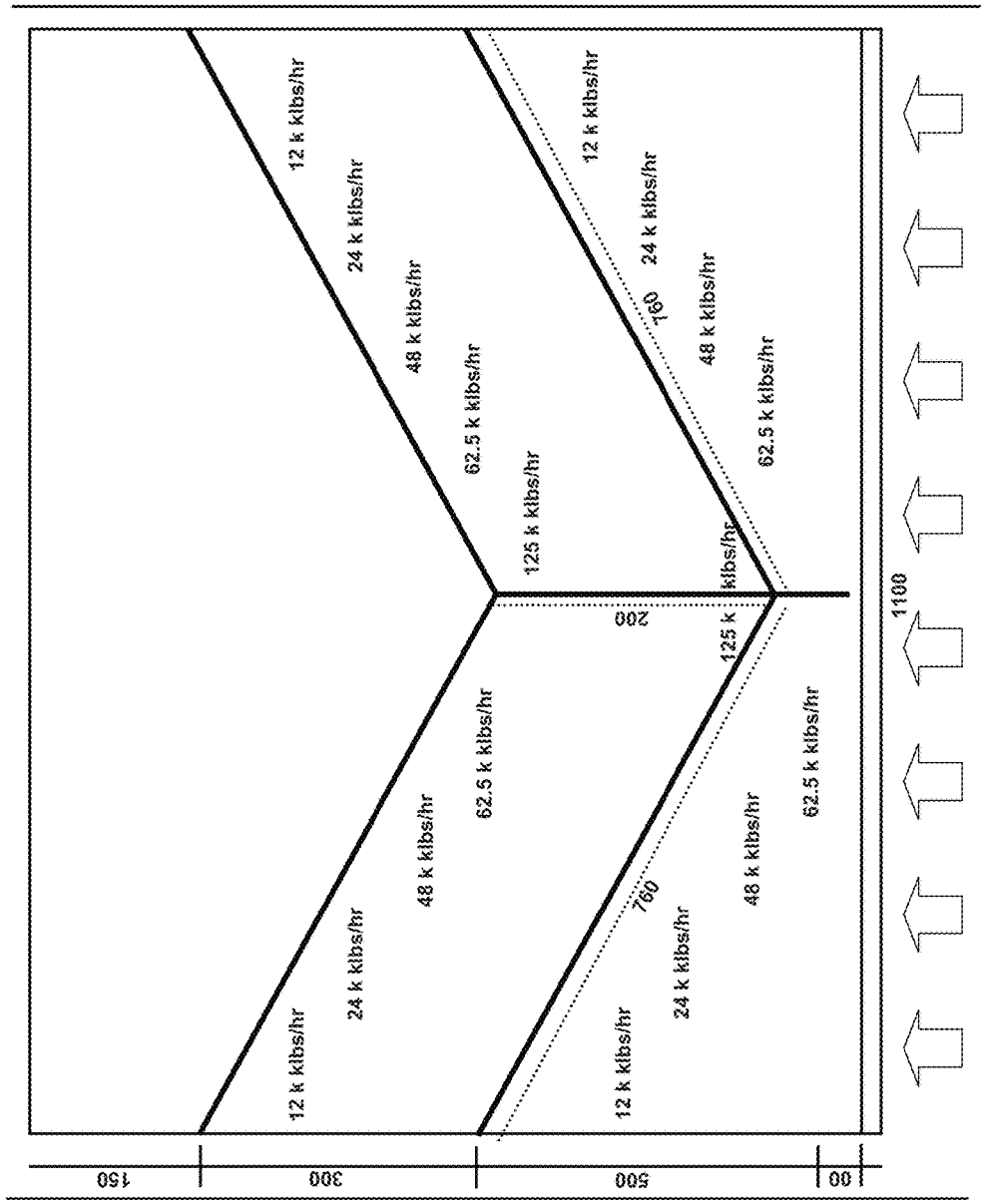

These arrays of modules are preferably arranged in the chevron pattern shown in FIGS. 21A-B, where the point of the chevron preferably faces towards the prevailing wind and the modules are arranged along the arms of the chevron so that they are all exposed to the prevailing wind, and/or to their fans, or other means of providing a flow of air described herein. The spacing between the chevron rows is determined by the rate at which the low $CO_2$ air ejected from the first row is effectively mixed with the ambient air so that the air entering the second row will be close to the concentration of the ambient air. In general, calculations suggest that this will be on the order of 100 meters. However, certain conditions could reduce the distance, for example, elevating the adsorption chamber off of the ground, or the presence of prevailing winds or unusually beneficial terrain will all increase mixing, and thus shorten the necessary, separation distance.

In the blended approach, in which small percentages by volume of effluent gas are mixed into the air, one embodiment could be to have the first row be ambient air only and then taking the depleted air and mixing the effluent gas into the depleted air for input to the second row. For cases where one has only a limited amount of effluent gas to mix into the air and where it is desired to remove considerably more total $CO_2$ than is being emitted in the effluent gas, one can adjust the relative amounts of air and flue mixing, by both adjusting the percentage of flue mixed in with the air and/or by dividing the units and varying mixtures of flue and air streams in different units, including some that are pure air capture. Thus, using the air/flue blender, one can generally adjust fraction of the total amount of $CO_2$ collected that is above that emitted in the flue to any level desired.

The sorbent medium preferably has primarily primary amine groups as the active capture sites for $CO_2$ but may include some secondary amine groups. Examples of such suitable adsorbing compounds which are supportable on the structures of this invention include polyethyleneimines, hyperbranched aminopolymers and propylethylenediamine, all as discussed above under Classes 1, 2 and 3.

As a means to further improve the efficiency of the method and system of the present invention, it can be useful to add a small proportion of effluent gas, from a hydrocarbon-fueled energy source used for the primary process adjacent the $CO_2$ capturing plant, as shown in FIGS. 17A and 19. As schematically shown in the figures herewith, effluent gas from the primary process is initially passed through a pre-treatment stage 2032 and treated to remove any solid or liquid impurities and any gaseous materials that may interfere with the effectiveness of the sorbents, such as sulfur-oxygen compounds. Preferably not more than 5% by volume of the treated effluent gas is then blended in a gas blender 2004 to be mixed with the incoming Ambient Air, before it is passed to the sorbent structure 2003 for $CO_2$ capture. The amount of effluent gas added is more preferably not more than 3% by volume and most preferably not more than 2% by volume. The small amount of the treated effluent gas added should not have a significant effect on the temperature of the incoming air flow to the sorbent structure 2003, but should result in a relatively substantial increase in $CO_2$ concentration in the incoming air, thus rendering the capture of the $CO_2$, more efficient. Using theoretical calculations, it can be shown that increasing the effective $CO_2$ concentration of the mixture by the addition of effluent gas in the proportion of 3%, increases the concentration of $CO_2$ in the air by a factor of five to ten times; however, it remains over 30 times less $CO_2$ concentration than the effluent gas. However, above that concentration from the small addition of effluent gas, the temperature rise from the sorption heat of reaction becomes significant, reducing the efficiency of $CO_2$ capture from ambient air, such that designs for effluent gas need to be utilized. Thus, limiting the amount of effluent gas added, is a way to avoid the cost associated with providing the cooling needed to prevent overheating.

It should be noted that the preferred siting for such a $CO_2$-extraction facility, in addition to being adjacent a source of suitable process heat, should be in an area having regular wind flow patterns. In this manner, if there are strong winds available, natural wind flows can be used to drive the air through the substrate, without requiring additional power to drive the fans. As a result of naturally occurring winds, the energy of the fans can be at least partially replaced, by prevailing winds, or by a solar driven source (which can, e.g., provide thermally-driven air currents), which will further improve the energy-efficiency and cost reduction of extraction of carbon dioxide from atmospheric air.

Moreover, as an alternative to moving the substrates carrying sorbent between capture and regeneration (stripping) chamber locations, by providing suitable valve and piping arrangements, with proper sensors and control elements, the sorbent structure modules can remain substantially in one location and the flows to and through and away from the sorbent can be controlled, as is schematically shown in FIG. 19, herein. In the automated system of FIG. 19, means for generating the air flows, the flow of process heat, and the flow of carbon dioxide away from the substrate, can be switched using valves, as carbon dioxide is captured from the air and then extracted from the medium, as will be readily apparent to those in the art.

The substrates 2002 and 3001 (in FIGS. 17-18 and 22-24, herewith) are porous, so that air directed at a substrate can flow through the substrate. When a substrate is in an air extraction position (e.g. the position of substrate 2002, in FIG. 17A), carbon dioxide laden air is directed at the substrate (e.g. by a fan 704 shown in dashed lines), so that as the air flows through the substrate, the carbon dioxide contacts the medium and is substantially removed from the air. Thus, carbon dioxide laden air is directed at and through the substrate so that carbon dioxide comes into contact with the medium, carbon dioxide is substantially removed from the air by the medium, and air from which the carbon dioxide has been substantially removed is directed away from the substrate. When a substrate is moved to the carbon extraction position (e.g. the position of the substrate labeled 2006), process heat, in the form of saturated steam, is directed at the substrate (e.g. 2005, in FIG. 17B), and carbon dioxide is removed, together with any remaining steam (in the direction shown by arrow 708, in FIG. 7) by a source of suction located in conduit 710 (FIG. 7) and in, or adjacent to, Separator 2009 (in FIG. 17A), by which carbon dioxide that has been removed from the medium is drawn away from the substrate.

Rather than moving the substrates between two physical locations, the conduits for generating the air flows, the flow of process heat, and the flow of carbon dioxide, to and away from the substrate can be switched, as carbon dioxide is captured from the air and then extracted from the medium, as will be readily apparent to those in the art.

It should also be noted that in all of the versions of the invention described above, the removal of carbon dioxide from the air can be carried out so that the $CO_2$-extraction stage does not fully saturate the amine groups, i.e., the sorption medium does not reach equilibrium conditions. This results in a shorter cycle time, and because of the slower adsorption rate occurring as the amine approaches its equilibrium saturation point, over an extended period of operation of the process, using the shorter cycle times may result in greater effective $CO_2$-extraction from the atmosphere.

Vertical Elevator Concept of FIGS. 10a-10f, and 10h and 22f, 23a,b and 24a-c These figures show schematic illustrations of the elevator and chamber structures, designs that further enhance the system with which carbon dioxide can be captured from $CO_2$ laden air and then stripped using process heat steam, according to the principles of the present invention. Furthermore, by operating the elevator vertically, when the regeneration stage is the lower portion, the weight of the array, which is supported from the upper surface, makes the box self sealing.

Specifically, in these drawings, a rectangular carbon dioxide capture structure 1000, 3000 is illustrated, which has a sorbent structure 3001, as described herein, that can be moved between a position where it is brought into contact with $CO_2$ laden air, to capture carbon dioxide from the air. The rectangular sorbent structure 3001 has a relatively large area perpendicular to the air flow compared to its thickness, and is oriented vertically in relation to a substantially horizontal flow of $CO_2$ laden air. The carbon dioxide sorbent capture structure 3001 comprises a solid, nonporous top member 1002, 3002, that is preferably a solid metal plate; the sorbent structure 3001 being supported between the top and bottom members 3002, 3003. The bottom member is also a solid, plate 3003, that is preferably a solid metal plate, as it assists in the pushing out of air from the stripping/regeneration chamber. When located in a stream of $CO_2$ laden air, the sorbent structure 3001 is exposed to the $CO_2$-laden air stream which passes through its large area faces, directed by an array of exhaust fans 3010, or by a prevailing wind; the sorbent captures the carbon dioxide from the air flowing through the sorbent structure. The highly porous sorbent structure 3001, 1004 provides a high surface area and low pressure drop.

When the sorbent has captured the desired amount of carbon dioxide from the air, the air flow can, if desired, be closed off. While the air is flowing through the sorbent, the effluent air from the sorbent structure 3001, is substantially depleted of carbon dioxide (preferably about 95% depleted of carbon dioxide). It is understood that under certain situations the relative vertical positions of the capture and stripping chambers can be reversed, though it is generally preferable having the capture unit on top, because of greater mixing higher off of the ground.

In the regeneration position, the sorbent structure 3001 is then heated by a flow of process heat (preferably from a co-generation system and process, as described further herein). As described above, the process heat is preferably converted via a heat exchanger to saturated steam, which is admitted into the lower sealed chamber after the air is exhausted, to strip the $CO_2$ from the sorbent, as described above, by the combined effect of the heat and the steam. As the regeneration box 1014 is heated (preferably by the "steam stripping process described herein), the carbon dioxide is separated from the sorbent structure, and is drawn off together with any uncondensed steam, to a separation chamber, where any remaining liquid water is removed, permitting more steam to condense, as it cools. The purified carbon dioxide can then be used or pressurized and sequestered, as desired. After the carbon dioxide is stripped from the sorbent structure 3001, and withdrawn from the sealed chamber, the thus regenerated sorbent structure is moved upwardly back to the $CO_2$-capture position, as shown by the series of drawings of FIGS. 23A-C, and schematically in FIGS. 17A-B and 18A-B.

FIG. 10b-1, 2 schematically illustrates an alternative to the structure and technique of FIG. 10a. The pair of carbon dioxide capture structures 1000 can alternatively move between the upper and lower positions, so that the carbon dioxide capture structure in the upper position is removing carbon dioxide from the carbon dioxide laden air and carbon dioxide is being removed from the sorbent structure that is in the lower regeneration or stripping position. The two sorbent structures also can act as counterweights for each other as they move up and down.

Steam Stripping a. There are two techniques that are contemplated for the steam stripping process. The preferred technique is referred to as "steam stripping with steam only".

b. It should be noted that an additional step of evaporative cooling of the sorbent bed before raising it back to the adsorption position will reduce the risk of degradation when the oxygen in the air would contact the sorbent at an elevated temperature. This is achieved by using a sufficiently strong exhaust pump from the stripping chamber so that at least some of the condensed steam is vaporized, at the lower resulting pressure, thus removing its latent heat with the resulting cooling of the sorbent monolith.

Steam stripping, as described above, would be performed in the foregoing manner in connection with FIGS. 17-23, herewith.

Sorbent Characteristics

In general, the sorbent that forms the sorbent structure is characterized by its ability to adsorb (capture) $CO_2$ at low (ambient) temperature and concentration and regenerate at higher temperature (of process heat steam) and high concentration (because $CO_2$ that is captured by the sorbent structure would have a high $CO_2$ concentration as the stripping occurs). The concentration of $CO_2$ in $CO_2$-laden air is on the order of 300 times smaller than the concentration of $CO_2$ in effluent gases (a major contributor to the presence of $CO_2$ in the atmosphere). The $CO_2$ can be captured from a stream of $CO_2$ laden air at ambient temperature (e.g. about 20 degrees C in many climates); and the temperature of the steam used in the steam stripping process described above is at a temperature of about 100-120 degrees C., based on the Langmuir isotherm or Langmuir adsorption equation (which is known to those in the art). The temperature of the sorbent structure during air capture should not be too high, but preferably should remain at the lower ambient temperature when the $CO_2$ is captured. Otherwise, the $CO_2$ loading capable of being achieved by the sorbent will be reduced by the increased temperature as, for example, described in the well-known Langmuir Isotherm Equation. Thus, while the sorbent material is preferably an amine, the specific amine material or other suitable sorbent may vary for different climates to optimize the net $CO_2$ that is collected during each cycle of capture and regeneration in which the system and process of the present invention will be used.

Co-Generation and Process Heat

As explained above, according to the present invention, process heat is used to provide the steam that is used in the "steam stripping" process and system described herein, to remove $CO_2$ from the sorbent structure and regenerate the sorbent structure. It is also preferred that the process heat is provided by a co-generation process and system, where a primary process (e.g., a petrochemical plant, a utility facility, etc.) produces steam that is provided directly to the system of the present invention and used to remove the $CO_2$ from the sorbent structure and regenerate the sorbent structure.

Industrial plants such as power stations and petrochemical plants generate large amounts of steam. The higher the pressure at which the steam is generated the higher the thermal efficiency that can be achieved and the use of co-generation systems (where gas turbines generate electricity and the hot gases from the turbine are used to generate more steam) also improves the overall thermal efficiency of a $CO_2$, capture system and process, according to the principles of the present invention.

There are many different designs of steam systems within the petrochemical industry due to the different mix of electric and turbine drivers for pumps and compressors, the temperature required for column reboilers and preheating duties, etc. These affect both the amount of steam generated and also the number of pressure levels at which the steam is supplied to the process. Given these qualifications a "typical" petrochemical steam system design includes steam that is generated at very high pressure (VHP) by the large boilers and co-generation facilities. This VHP steam is passed to and through turbines which are used to drive motors or compressors and result in exhaust steam at lower pressures. The next levels of steam are HP and MP which are provided from the extraction turbines or by direct let-down from the VHP steam main. The final steam level is LP and is provided by the exit steam from the turbines and by direct let-down. Each steam level provides steam to different users and any excess steam is passed down to the next steam level. Thus the LP steam receives all the steam that cannot be used usefully at the higher steam levels. It is important to recognize that in a petrochemical facility the steam system must be flexible as different sections of the process may be off-line or starting-up, shutting down or be at lower than design rates at different times. This is different from a utility power plant where the steam only has to provide one function—generating electricity.

The value of steam depends upon the pressure level. The base cost of the VHP steam is fixed by the capital and operating costs of generation. Therefore, as the steam is reduced in pressure after passing through and powering the turbines, it becomes less effective for generating additional electricity, and the value of the steam is reduced.

In the case of the proposed use of the superheated steam, at ambient pressure, to release the $CO_2$ from the sorbent structure, the following advantages appear to exist for a typical large petrochemical facility:
  a. At a proposed steam level for the present invention (2-10 psig) the cost of the required steam will be very low for a typical facility, although this will vary between facilities depending upon the amount of LP steam that is available.
  b. In comparison with a conventional amine system in an effluent gas capture system, that requires stripping steam at approximately 60 psig, the cost of steam used in the present invention is significantly lower. In addition, it is much more likely that there will not be an adequate supply of 60 psig available and that additional VHP steam would have to be generated. This would raise the cost of the 60 psig steam as it would either have to be charged at the full cost of VHP steam or additional turbines would have to be installed to recover power, but this would involve significant capital costs.

In most power plants a steam supply is extracted from the low pressure turbine to heat the feed water to the system. This extracted steam would be suitable for use in the proposed process of this invention to remove $CO_2$ from the sorbent structure, as it is provided in the co-generation of electricity and industrial heat. In the cogeneration of electricity and $CO_2$, as described in this embodiment of the present invention, it is possible to use very low pressure (2 lbs above atmosphere pressure and temperature around 105° C.) and can return the condensate to heat the boiler since the process heat being used is only the latent heat of the steam, so that substantially 100° C. condensate is returned to the boiler. While cogeneration of electricity and industrial heat reduces the electricity produced, it does raise the overall thermal efficiency of using the heat generated to useful energy from 35-40% to 85-95%. It is thus favored when there are nearby uses for the low temperature and pressure steam (usually 120° C., 2 lbs above atmosphere steam). In the cogeneration of electricity and $CO_2$ capture, one can site the facility close enough to use the low temperature and pressure steam; and by being able to use even lower pressure and temperature steam and recirculating the hot condensate in the process heat steam loop back to heat the boiler, one can minimize the impact on electricity generation and thus the cost of the steam.

Additional Comment Regarding Mixing of Ambient Air and Effluent Gas

In addition to the capability of the present invention to capture carbon dioxide from ambient air alone, without capturing carbon dioxide from effluent gases, the principles of the present invention can be applied in a new and useful way to enhance and make more efficient the removal of $CO_2$ from a combination of $CO_2$ laden air and effluent gas (e.g. from a fossil fuel plant). A relatively large volume ratio (e.g. 97-99%) of $CO_2$ laden air is mixed with a relatively small volume of effluent gases (preferably not more than about 3% effluent gas, and more preferably not more than 2% effluent gas). Effluent gas contains a relatively high concentration of $CO_2$; therefore, to produce a fluid stream in which the $CO_2$ in the effluent gas adds sufficient $CO_2$ to the air to make the cost of removal of $CO_2$ from the combined gases more advantageous, and also provides benefits in that the $CO_2$ laden air cools the effluent gases. Application of the principles of the invention to produce such a mixed gas stream is believed to make the process of the present invention described above particularly efficient. The $CO_2$ in the relatively large volume of mixed $CO_2$ laden air is still relatively low concentration $CO_2$, in accordance with a basic concept of this invention's paradigm; the small volume amount of effluent gas increases the concentration of $CO_2$ in the fluid stream, and makes the applicant's process even more cost efficient in the manner in which it removes $CO_2$ from an ambient fluid stream. At the same time, the high volume of ambient air cools the effluent gases so that the combined gases enable the sorbent temperature to remain in a temperature range in which the process of this invention is most efficient when using the amine as the sorbent.

Examples of useful methods of admixing the effluent gas with the air is shown in FIGS. 25 and 26. In FIG. 25, a jet of effluent gas 3031 is injected into a flow of ambient air, to form a mixture before passing to the array of fans as shown in FIG. 22. In FIG. 26, a particular design is presented where effluent gas is injected through a centrally located pipe 3035 into an air stream passing from a concentric ring header, which defines multiple orifices, located circumferentially around the central effluent gas inlet. Again, the mixture is passed through the fans for additional mixing before entering the sorbent. In this case, of course, the fans are not acting as exhaust fans drawing the air through the sorbent structure.

In Summary

Accordingly, with the structure and technique of FIGS. 10a-10h, and FIGS. 17-23, carbon dioxide laden air is directed through the vertically oriented carbon dioxide capture structure 1000, 2002 that has sorbent capable of adsorbing, or binding, carbon dioxide, to remove carbon dioxide from the air. When carbon capture is completed, the vertically oriented carbon dioxide capture structure is lowered into a regeneration enclosure 1014, 2006, where process heat is directed at the carbon dioxide capture structure, to separate carbon dioxide from the sorbent, and regenerate the sorbent. The carbon dioxide capture structure 1000, 2002 is selectively raised out of the regeneration enclosure to a position that, after the structure cools down to near ambient, is in the flow of carbon dioxide laden air, so that the regenerated sorbent can continue to be used to adsorb or capture carbon dioxide, from the flow of carbon dioxide laden air. In addition, the present invention can be carried out using the structure and technique of FIGS. 11a, 11b, where a flow of sorbent-carrying porous particles is selectively fed into a carbon dioxide removal chamber 1104; air is directed through the particles in the carbon dioxide capture chamber, so that carbon dioxide is absorbed or captured by the sorbent. After the carbon dioxide capture is completed, the particles are directed to a carbon dioxide stripping/regeneration chamber 1106, where process heat is used to separate carbon dioxide from the sorbent, and regenerate the sorbent carried by the particles. The particles with the regenerated sorbent are then directed back to a particle feed source, so that the particles with the regenerated sorbent can be reused to adsorb or capture carbon dioxide from the air.

Still further, the principles of the present invention can be followed in a method of capturing $CO_2$, wherein a small amount (by volume) of effluent gas is added to the flow of $CO_2$ laden air. The concentration of $CO_2$ in the air is significantly increased, in comparison to the $CO_2$ concentration in the flow of unmixed $CO_2$ laden air, and the fluid flow is passed through a sorbent structure that captures the $CO_2$ in the air.

With the foregoing disclosure in mind, it is believed that various other ways of removing carbon dioxide from a fluid, in accordance with the principles of this application, will become apparent to those skilled in the art, including the use of many conventional steps and components that are or shall become well-known and would be useful in carrying out the present invention without themselves being a part of the invention. The scope of this invention is in accordance with the scope of the invention as claimed in the following claims.

What is claimed is:

1. A method capable of capturing carbon dioxide from ambient air under ambient conditions, the method comprising the steps of:
   providing energy to a primary production process which produces a primary product with co-generated usable process heat, applying the co-generated process heat from said primary process to generate process heat steam superheated at ambient pressure,
   alternately repeatedly exposing a sorbent to capturing and stripping/regeneration system stages, the stages comprising:
   initially admixing a minor quantity of treated effluent gases with a substantially larger quantity of ambient air flow to form an ambient air-effluent gas mixture containing a minor quantity of the effluent gases;
   during the capture stage, exposing said sorbent to a flow of the ambient air-effluent gas mixture, so as to enable said sorbent to capture carbon dioxide from said ambient air and form $CO_2$-laden sorbent, and
   during the stripping/regeneration phase, in a sealed regeneration chamber containing the $CO_2$-laden sorbent, withdrawing air or any other gas entering the sealed regeneration chamber with the $CO_2$-laden sorbent to form at least a partial vacuum, passing the process heat steam into the sealed regeneration chamber and exposing said $CO_2$-laden sorbent to said process heat steam, so as to cause the stripping of such captured carbon dioxide from the sorbent, resulting in a regenerated sorbent, and forming a carbon dioxide/water exiting mixture.

2. The method of claim 1 for capturing carbon dioxide from ambient air, wherein the ambient air -effluent gas blend contains no more than 25% pre-treated effluent gas, and the method further comprising:
   separating water from the carbon dioxide/water exiting mixture to provide a more concentrated carbon dioxide gas and exhausting the $CO_2$ from the regeneration chamber;
   cooling the sorbent structure within the regeneration chamber; and
   moving the cooled sorbent structure from the regeneration chamber to a position where it is again contacted with the air-effluent gas blend; and
   alternately moving the sorbent structure between the $CO_2$-rich gas adsorbing position and the regeneration chamber to cyclically adsorb $CO_2$ and regenerate the sorbent.

3. The method of claim 2 for capturing carbon dioxide from ambient air, wherein the ambient air-effluent gas blend contains no more than 5% pre-treated effluent gas.

4. The method of claims 2, further comprising the step of sensing carbon dioxide concentrations entering and exiting the capture position.

5. A method capable of capturing carbon dioxide from ambient air under ambient conditions, the method comprising the steps of:
   providing energy to a primary production process which produces a primary product with co-generated usable process heat, applying the co-generated process heat from said primary process to generate process heat steam superheated at ambient pressure,
   utilizing a plurality of parallel combined stages, alternately repeatedly exposing a sorbent in each of the parallel combined stages, to parallel capturing and stripping/regeneration system stages, each of the parallel stages comprising:
   initially admixing a minor quantity of treated effluent gases with a substantially larger quantity of ambient air flow to form an ambient air-effluent gas mixture containing a minor quantity of the effluent gases;
   during each of the parallel capture stages, exposing said sorbent to a flow of the ambient air-effluent gas mixture, so as to enable said sorbent to capture carbon dioxide from said ambient air and form $CO_2$-laden sorbent, and during each of the parallel stripping/regeneration phases, in parallel sealed regeneration chambers containing the $CO_2$-laden sorbent, withdrawing air or any other gas entering the sealed regeneration chamber with the $CO_2$-laden sorbent to form at least a partial vacuum, passing the process heat steam into the sealed regeneration chamber and exposing said $CO_2$-laden sorbent to said process heat steam, so as to cause the stripping of such captured carbon dioxide from the sorbent, resulting in a regenerated sorbent, and forming a carbon dioxide/water exiting mixture from each of the parallel sealed regeneration chambers.

6. The method of claim 5, further comprising the step of sensing carbon dioxide concentration within said regeneration chamber.

7. The method of claim 5 for capturing carbon dioxide from ambient air and effluent gas, wherein the sorbent is part of a sorbent structure comprising an amine that binds to $CO_2$, carried by a substrate, which can be in the form of solid particles or a monolithic structure.

* * * * *